United States Patent
Nakade et al.

(10) Patent No.: US 11,869,225 B2
(45) Date of Patent: Jan. 9, 2024

(54) THREE-DIMENSIONAL AUTHENTICATION DEVICE, THREE-DIMENSIONAL AUTHENTICATION SYSTEM, PORTABLE INFORMATION TERMINAL, AND THREE-DIMENSIONAL AUTHENTICATION METHOD

(71) Applicant: MAXELL, LTD., Kyoto (JP)

(72) Inventors: Mayumi Nakade, Kyoto (JP); Ikuya Arai, Kyoto (JP); Osamu Kawamae, Kyoto (JP)

(73) Assignee: MAXELL, LTD., Kyoto (JP)

( * ) Notice: Subject to any disclaimer, the term of this patent is extended or adjusted under 35 U.S.C. 154(b) by 2 days.

(21) Appl. No.: 17/622,719

(22) PCT Filed: Jun. 28, 2019

(86) PCT No.: PCT/JP2019/025937
§ 371 (c)(1),
(2) Date: Dec. 24, 2021

(87) PCT Pub. No.: WO2020/261565
PCT Pub. Date: Dec. 30, 2020

(65) Prior Publication Data
US 2022/0245915 A1 Aug. 4, 2022

(51) Int. Cl.
*G06V 20/64* (2022.01)
*G06V 10/145* (2022.01)
(Continued)

(52) U.S. Cl.
CPC .............. *G06V 10/145* (2022.01); *G06T 7/20* (2013.01); *G06T 7/571* (2017.01); *G06V 10/147* (2022.01);
(Continued)

(58) Field of Classification Search
CPC .... G06V 10/145; G06V 40/145; G06V 40/67; G06V 20/64; G06V 40/172;
(Continued)

(56) References Cited

U.S. PATENT DOCUMENTS

| 2014/0185885 A1* | 7/2014 | Yamada | G06V 40/40 382/115 |
| 2019/0244011 A1* | 8/2019 | Liu | G06F 18/214 |

(Continued)

FOREIGN PATENT DOCUMENTS

| JP | 2001-338295 A | 12/2001 |
| JP | 2004-126738 A | 4/2004 |

(Continued)

OTHER PUBLICATIONS

International Search Report of PCT/JP2019/025937 dated Sep. 24, 2019.

*Primary Examiner* — Syed Haider
(74) *Attorney, Agent, or Firm* — Mattingly & Malur, PC

(57) ABSTRACT

An imaging device and an authentication controller are provided. The imaging device includes a modulator that includes a first pattern and that modulates light intensity with the first pattern, an image sensor that converts a light beam transmitted through the modulator into imaging data and outputs the imaging data, an image processing unit that performs, to the imaging data, a reconstruction process in which an image of the subject is reconstructed based on the cross-correlation operation between the imaging data and the pattern data having a second pattern and acquires an image, and a distance measurement unit that repeats the reconstruction process to the imaging data while changing a focus distance and acquires a focus distance having a highest contrast in a measurement region as a distance. The authentication controller performs image authentication and dis- (Continued)

tance authentication using image data and distance data acquired by the imaging device.

14 Claims, 37 Drawing Sheets

(51) Int. Cl.
| | | |
|---|---|---|
| G06T 7/571 | (2017.01) | |
| G06V 40/145 | (2022.01) | |
| G06V 40/60 | (2022.01) | |
| G06V 40/16 | (2022.01) | |
| G06V 10/147 | (2022.01) | |
| G06V 40/50 | (2022.01) | |
| G06T 7/20 | (2017.01) | |
| H04N 23/67 | (2023.01) | |

(52) U.S. Cl.
CPC ............ *G06V 20/64* (2022.01); *G06V 40/145* (2022.01); *G06V 40/172* (2022.01); *G06V 40/50* (2022.01); *G06V 40/67* (2022.01); *H04N 23/673* (2023.01); *G06T 2207/30201* (2013.01)

(58) Field of Classification Search
CPC ...... G06V 10/147; G06V 40/50; G06T 7/571; G06T 7/70; G06T 2207/30201; G06T 7/20; H04N 23/673
See application file for complete search history.

(56) References Cited

U.S. PATENT DOCUMENTS

| | | | |
|---|---|---|---|
| 2019/0339485 A1* | 11/2019 | Nakamura | ............ G02B 5/1814 |
| 2020/0026906 A1* | 1/2020 | Ajiki | ......................... G01C 3/06 |
| 2021/0042401 A1* | 2/2021 | Nagai | ...................... G06T 7/521 |

FOREIGN PATENT DOCUMENTS

| | | | |
|---|---|---|---|
| JP | 2007-026330 A | | 2/2007 |
| JP | 2007026330 A | * | 2/2007 |
| JP | 2007-115072 A | | 5/2007 |
| JP | 2014-127164 A | | 7/2014 |
| JP | 2017-049867 A | | 3/2017 |
| JP | 2017049867 A | * | 3/2017 |
| WO | 2017/149687 A1 | | 9/2017 |
| WO | 2018/181819 A1 | | 10/2018 |

* cited by examiner

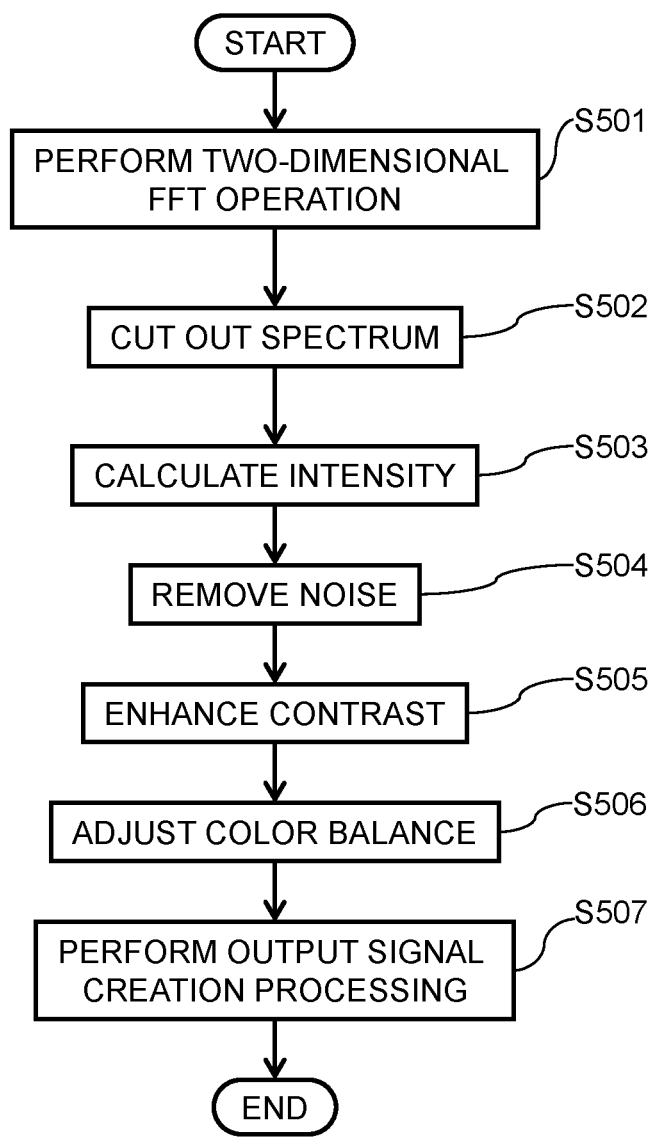

FIG.5A
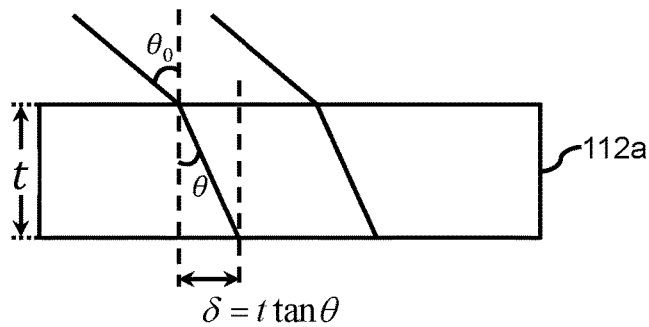
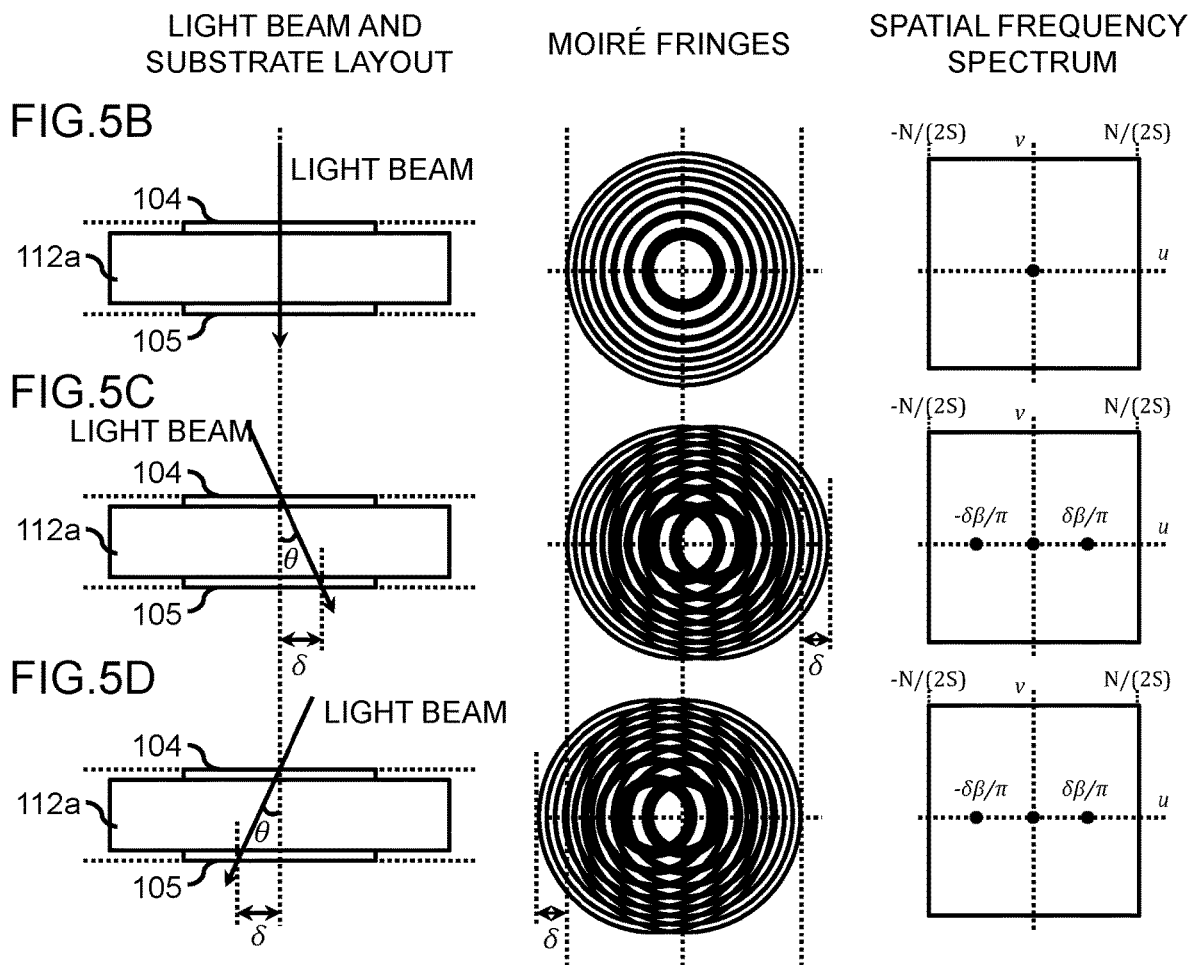

FIG.6A
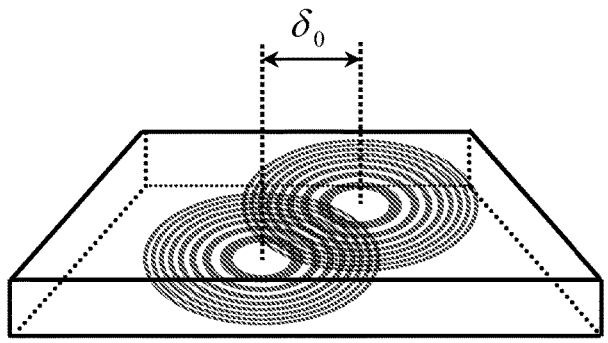
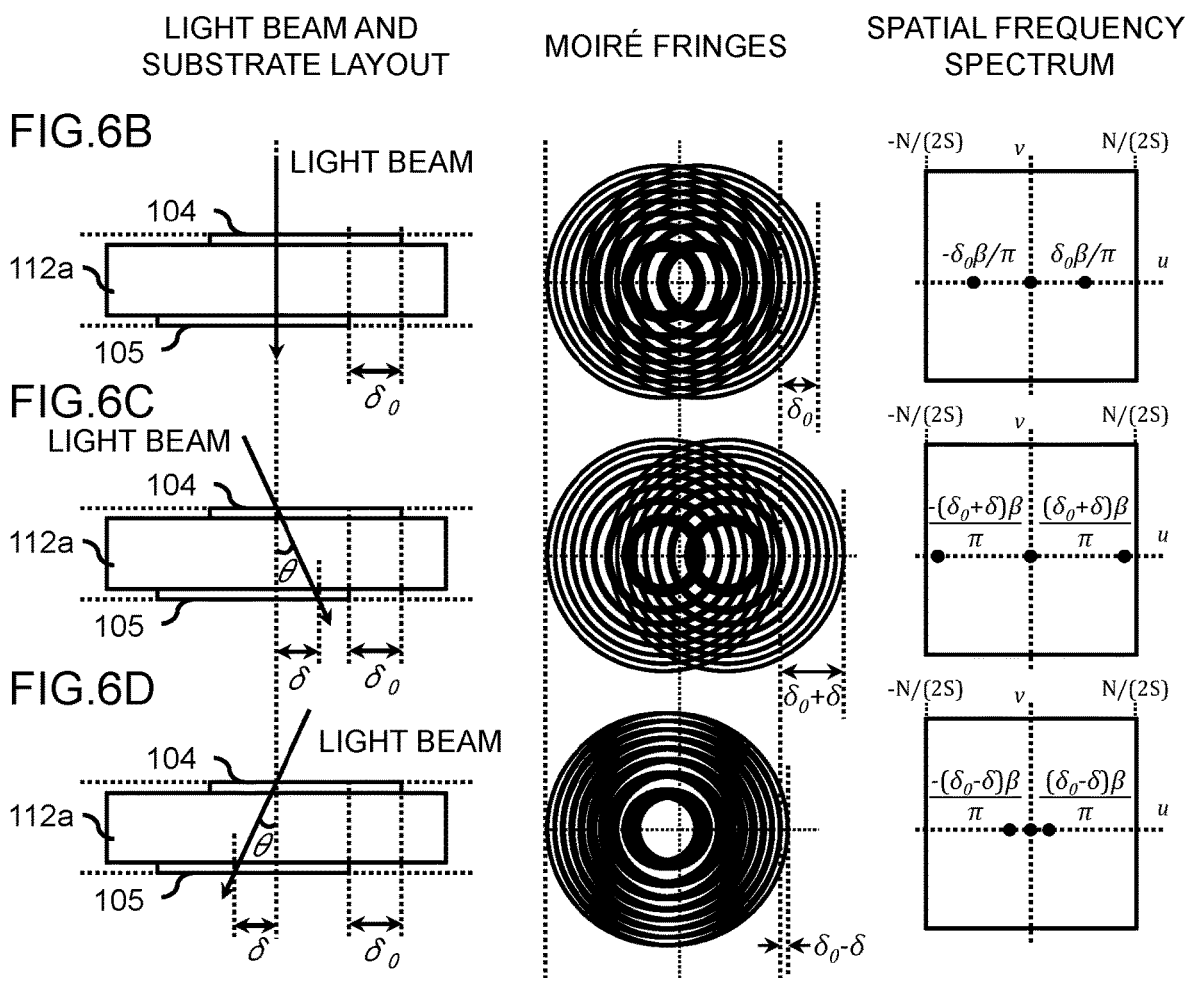

104a

104b

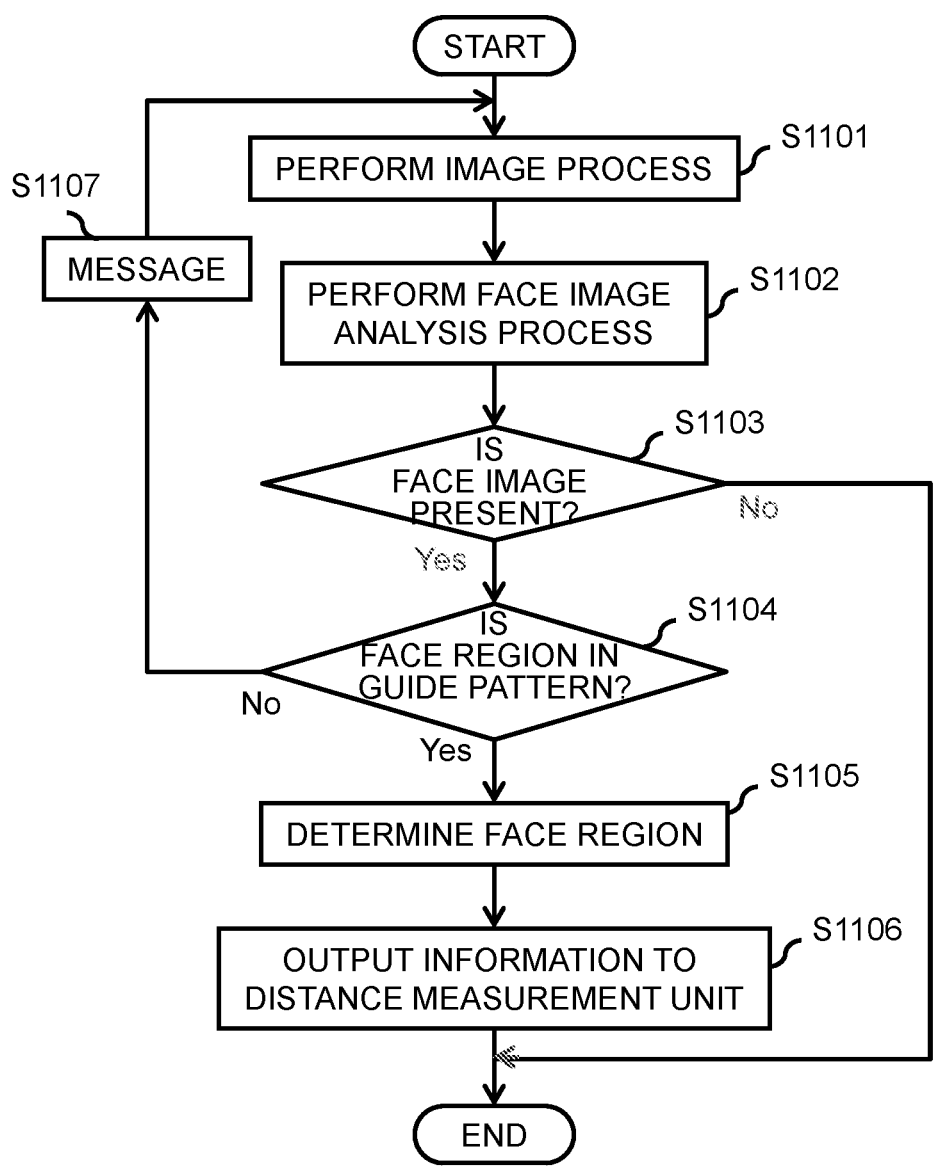

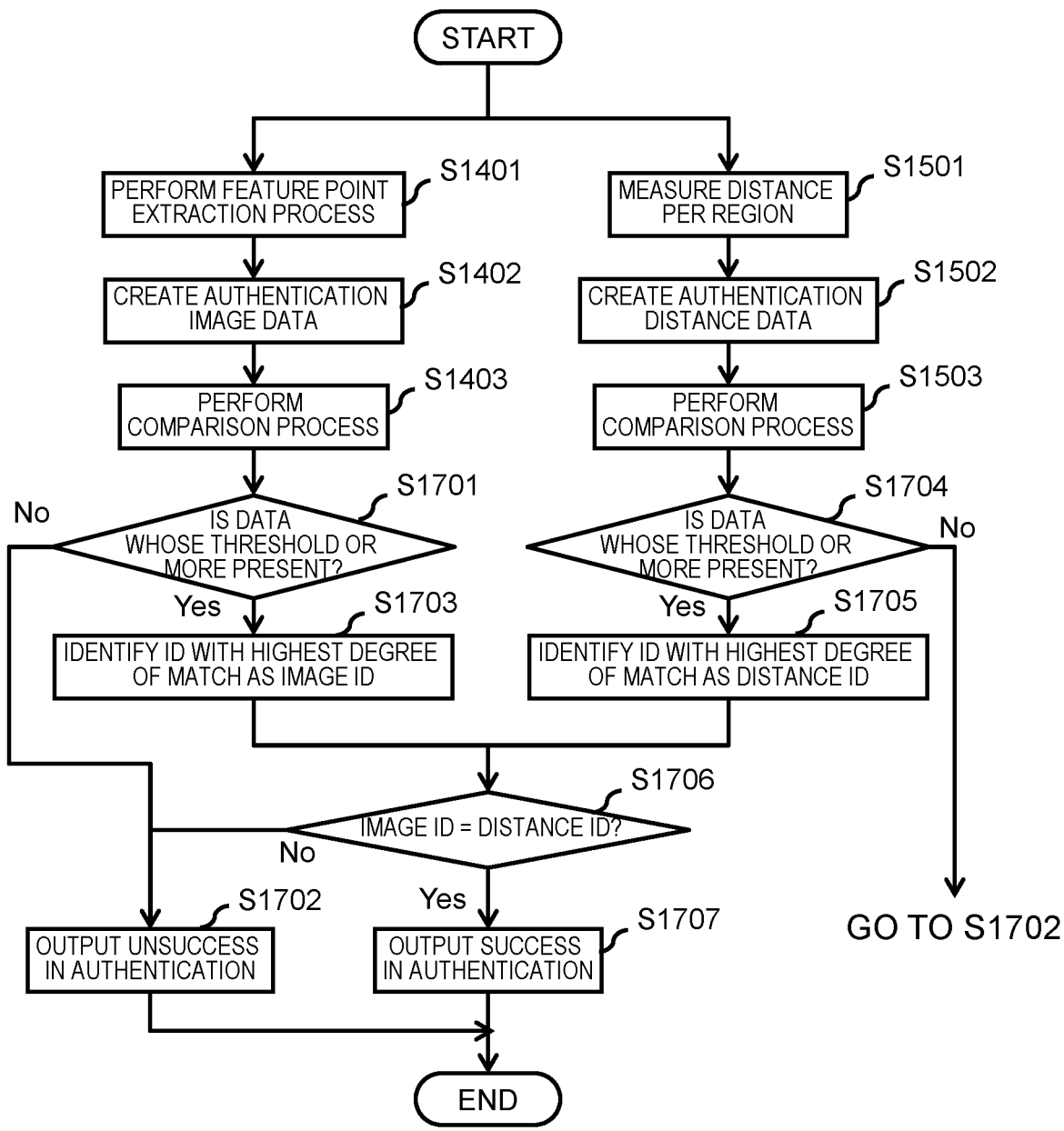

FIG.36

| PROCESSING MODE | PORTABLE TERMINAL | ACCESS MANAGEMENT SERVER |
|---|---|---|
| 1 | · IMAGING | · IMAGE PROCESS (DEVELOPMENT)<br>· FOCUS ADJUSTMENT<br>· DISTANCE MEASUREMENT<br>· FACE & DISTANCE AUTHENTICATION<br>· UNLOCK |
| 2 | · IMAGING<br>· IMAGE PROCESS (DEVELOPMENT)<br>· FOCUS ADJUSTMENT<br>· DISTANCE MEASUREMENT | · FACE & DISTANCE AUTHENTICATION<br>· UNLOCK |
| 3 | · IMAGING<br>· IMAGE PROCESS (DEVELOPMENT)<br>· FOCUS ADJUSTMENT<br>· DISTANCE MEASUREMENT<br>· DISTANCE AUTHENTICATION | · FACE AUTHENTICATION<br>· UNLOCK |
| 4 | · IMAGING<br>· IMAGE PROCESS (DEVELOPMENT)<br>· FOCUS ADJUSTMENT<br>· DISTANCE MEASUREMENT<br>· FACE & DISTANCE AUTHENTICATION | · UNLOCK |

THREE-DIMENSIONAL AUTHENTICATION DEVICE, THREE-DIMENSIONAL AUTHENTICATION SYSTEM, PORTABLE INFORMATION TERMINAL, AND THREE-DIMENSIONAL AUTHENTICATION METHOD

TECHNICAL FIELD

The present invention relates to an authentication technology, and more particularly to a biometric authentication technology using a lensless camera.

BACKGROUND ART

Because of increasing security consciousness, measures to payment functions by information devices owned by individuals, and the like, a personal authentication technology of high accuracy is requested. For example, Patent Literature 1 discloses a personal authentication device that improves accuracy using three-dimensional measurement in which "in a device performing personal authentication including a measuring device that obtains at least three-dimensional shape information, a camera, and an image determining device, a head of a human is detected with the measuring device, two-dimensional information on a face is acquired with the camera, the two-dimensional information is compared with already registered information, and the measured person is determined (extracted from Abstract)."

There is a technology that is capable of three-dimensional measurement with no lens. For example, Patent Literature 2 discloses "an imaging device including an image sensor that converts an optical image captured in a plurality of pixels arrayed on an imaging surface in an array configuration into an image signal and outputs the image signal, a modulator that is provided on the light receiving surface of the image sensor and modulates light intensity, an image storing unit that temporarily stores the image signal output from the image sensor, and a signal processing unit that performs an image process of the image signal output from the image storing unit, wherein the modulator has a first grating pattern formed of a plurality of concentric circles, and the signal processing unit modulates the image signal output from the image storing unit with a virtual second grating pattern formed of a plurality of concentric circles to create a moiré fringe image, and changes the size of the concentric circles of the second grating pattern corresponding to a focus position (extracted from Abstract)."

CITATION LIST

Patent Literature

Patent Literature 1: Japanese Unexamined Patent Application Publication No. 2004-126738
Patent Literature 2: WO 2017/149687

SUMMARY OF INVENTION

Technical Problem

The authentication device described in Patent Literature 1 uses the measuring device that measures a three-dimensional shape for improving authentication accuracy. However, the authentication device needs a device for three-dimensional measurement other than the camera. Therefore, the authentication device has problems on its size and cost, and has difficulties in application to portable information devices such as a smartphone and a tablet. Also in access management and the like, specifically at the time of retrofitting and the like, a reduction in size and thickness of the authentication device is requested due to a problem of space.

The present invention has been made in view of the circumstances, and an object is to provide highly accurate personal authentication technology using a small-sized and low-profile device.

Solution to Problem

The present invention is a three-dimensional authentication device including an imaging device that images an authentication target as a subject and an authentication controller that authenticates the authentication target imaged by the imaging device, wherein the imaging device includes a modulator that includes a first pattern and that modulates light intensity with the first pattern, an image sensor that converts a light beam transmitted through the modulator into imaging data and outputs the imaging data, an image processing unit that performs, to the imaging data, a reconstruction process and acquires an image, the reconstruction process being reconstructed an image of the subject based on cross-correlation operation between the imaging data and pattern data having a second pattern, and a distance measurement unit that acquires a distance from the imaging device to the subject in a predetermined measurement region. The distance measurement unit repeats the reconstruction process to the imaging data while changing a focus distance, and the distance measurement unit sets the focus distance having a highest contrast in the measurement region as the distance. The authentication controller includes a registration information storing unit that stores registration image data and registration distance data, the registration image data being an image of an authentication target acquired in advance, the registration distance data being distance information of an authentication target acquired in advance, an image authentication unit that verifies authentication image data against the registration image data and that sets a verified result as an image authentication result, the authentication image data being an image of the authentication target acquired by the imaging device, and a distance authentication unit that verifies authentication distance data against the registration distance data and that sets a verified result as a distance authentication result, the authentication distance data being a distance of the authentication target acquired by the imaging device.

The present invention is a three-dimensional authentication system including the above-described three-dimensional authentication device and a management server that performs security management based on an authentication result by the three-dimensional authentication device.

The present invention is a three-dimensional authentication method in a three-dimensional authentication device including an imaging device that images an authentication target as a subject and an authentication controller that authenticates the authentication target imaged by the imaging device, the method including modulating, a first pattern being included, light intensity with the first pattern; converting a light beam after the modulating into imaging data; performing, to the imaging data, a reconstruction process and acquiring an image, the reconstruction process being reconstructed an image of the subject based on cross-correlation operation between the imaging data and pattern data having a second pattern, repeating the reconstruction process while changing a focus distance, acquiring the focus distance having a highest contrast in a predetermined measurement region as a distance from the imaging device to the subject in the measurement region; verifying authentication image data against registration image data stored in advance, setting a verified result as an image authentication result, the authentication image data being an image of the acquired authentication target; verifying authentication distance data against registration distance data stored in advance, and setting a verified result as a distance authentication result, the authentication distance data being a distance of the acquired authentication target.

Advantageous Effects of Invention

According to the present invention, it is possible to provide highly accurate personal authentication technology using a small-sized and low-profile device. Problems, configurations, and effects other than the ones described above will be apparent from the description of embodiments below.

BRIEF DESCRIPTION OF DRAWINGS

FIG. 4 is a flowchart of an image process performed by the image processing unit of the optical lensless imaging device according to the embodiment of the present invention.

FIG. 5A is a diagram for explaining the production of an in-plane shift in an application image from the front surface to the back surface of a grating substrate due to an oblique incident collimated light, and FIGS. 5B to 5D are diagrams for explaining the creation of moiré fringes and a frequency spectrum in the case where the axes of the gratings on both surfaces of the grating substrate are aligned according to the embodiment of the present invention.

FIG. 6A is a schematic diagram in the case where the axes of a front-side grating and a back-side grating are disposed as the axes are shifted according to an embodiment of the present invention, and FIGS. 6B to 6D are diagrams for explaining the creation of moiré fringes and a frequency spectrum in the case where the gratings of the both surfaces of the grating substrate are disposed as the gratings are shifted according to the embodiment of the present invention.

FIG. 24 is a flowchart of a face region determination process according to the first embodiment.

FIG. 30 is a flowchart of a face authentication process according to another modification of the first embodiment.

FIG. 36 is a diagram for explaining processes shared by components according to a modification of the third embodiment.

DESCRIPTION OF EMBODIMENT

In the following, embodiments of the present invention will be described with reference to the drawings.

In the embodiments described below, when the shapes, positional relationships, and the like of components and constituent parts are referred, ones in shapes substantially analogue or similar to the shapes, for example, are included, unless otherwise explicitly shown or unless clearly theoretically considered otherwise. This also applies to numerical values and ranges.

In all the drawings for explaining the embodiments, the same members are assigned with the same reference signs in principle, and the duplicated description is omitted.

Prior to describing the embodiments according to the present invention, an optical lensless (without lens) imaging device (in the following, simply referred to as an imaging device), which is used in common in the embodiments, will be described. First, a basic principle of imaging and ranging in the imaging device will be described.

<Shooting Principle of Infinite Object>

Figure 1:
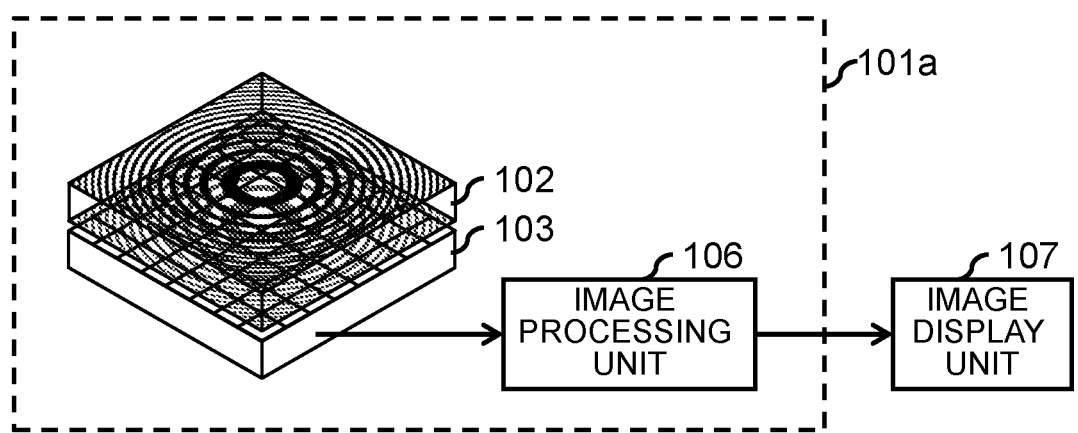
FIG. 1 is a block diagram of a basic optical lensless imaging device according to an embodiment of the present invention.

FIG. 1 is a diagram showing an example of a configuration of an imaging device 101a according to a first embodiment. The imaging device 101a is a device that acquires images of an object in the surroundings with no use of a lens that forms an image. As shown in FIG. 1, the imaging device 101a includes a modulator 102, an image sensor 103, and an image processing unit 106.

Figure 2A:
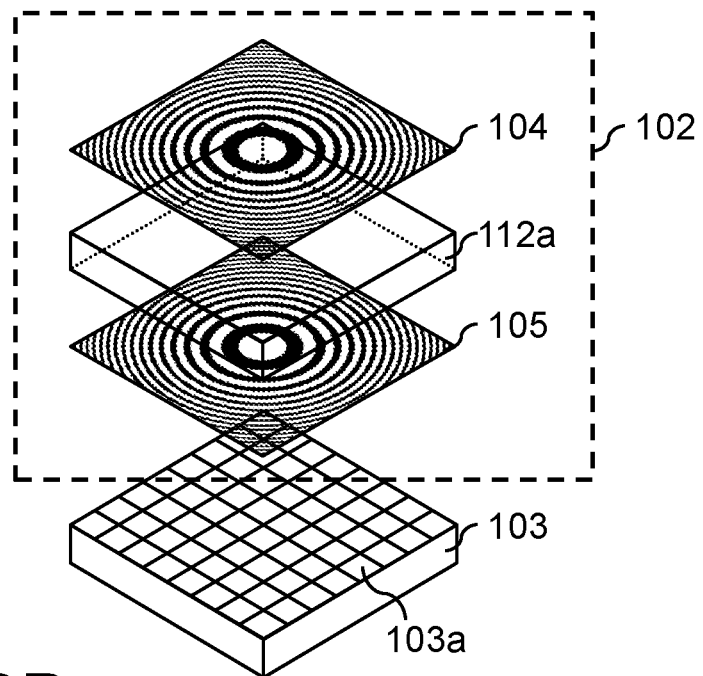
FIGS. 2A and 2B are diagrams for explaining the modulator of the optical lensless imaging device according to the embodiment of the present invention.

FIG. 2A shows an example of the modulator 102. The modulator 102 is fixed in close contact with the light receiving surface of the image sensor 103. The modulator 102 includes a first grating pattern 104 and a second grating pattern 105 formed on a grating substrate 112a. For example, the grating substrate 112a is formed of a transparent material such as glass or plastic. In the following, the image sensor 103 side of the grating substrate 112a is referred to as a back surface, and the opposite side, i.e., the shooting object side is referred to as a front surface.

The grating patterns 104 and 105 includes a grating pattern in concentric circles in which the gap of the grating pattern, i.e., the pitch narrows toward the outer side inversely proportional to the radius from the center. The grating patterns 104 and 105 are formed by depositing aluminum and the like by sputtering used for semiconductor processes and any other process, for example. With the pattern on which aluminum is deposited and the pattern on which no aluminum is deposited, shades are formed. Note that forming the grating patterns 104 and 105 is not limited to this. The grating patterns 104 and 105 may be formed with shades by printing with an ink jet printer, for example.

Figure 2B:
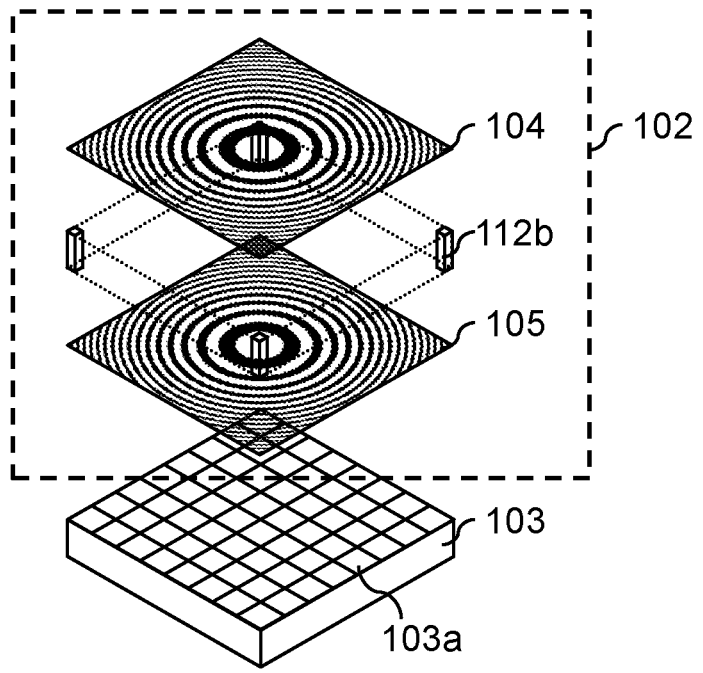

Note that here, in order to implement the modulator 102, a method is described in which the grating patterns 104 and 105 are formed on the grating substrate 112a. However, as shown in FIG. 2B, it is possible to implement the modulator 102 with a configuration, for example, in which the grating patterns 104 and 105 are formed into a thin film and are retained with a support member 112b.

The light intensity of a light beam transmitted through the grating patterns 104 and 105 is modulated with their grating pattern. The transmitted light beam is received at the image sensor 103. For example, the image sensor 103 includes a CCD (Charge Coupled device) image sensor, a CMOS (Complementary Metal Oxide Semiconductor) image sensor, and the like.

On the front surface of the image sensor 103, a pixel 103a that is a light receiving device is regularly disposed in a grating shape. The image sensor 103 converts an optical image received at the pixel 103a into an image signal that is an electrical signal. The image signal output from the image sensor 103 is subjected to image processing by the image processing unit 106, and output to the image display device 107, for example.

Figure 3:
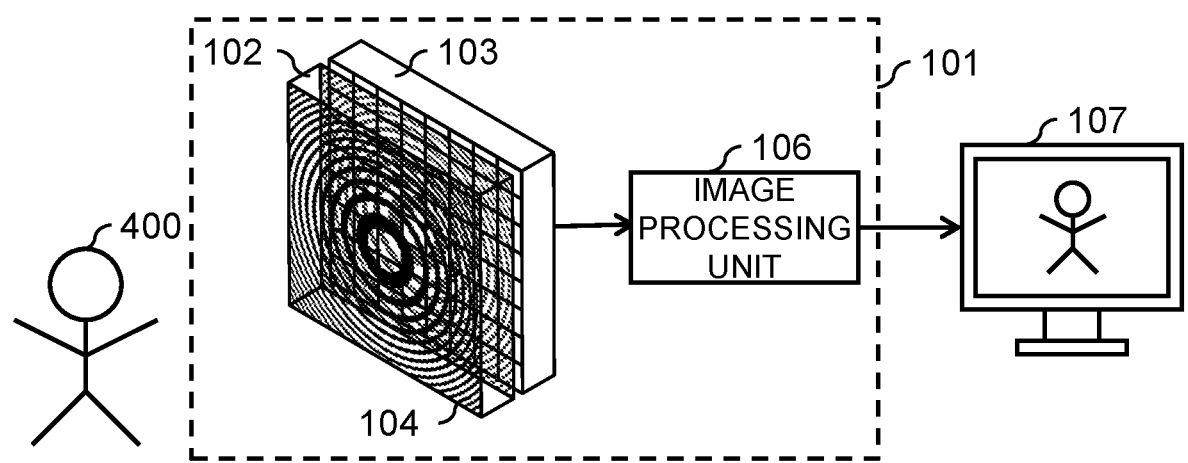
FIG. 3 is a diagram showing a manner of shooting an object in surroundings with the optical lensless imaging device according to the embodiment of the present invention.

FIG. 3 is a diagram showing an example of shooting by the imaging device 101a in FIG. 1. The present drawing shows an example in which a subject 400 is shot by the imaging device 101a and displayed on the image display device 107. As shown in the drawing, at the time of shooting the subject 400, the front surface of the modulator 102, specifically the surface of the grating substrate 112a on which the first grating pattern 104 is formed is disposed facing the subject 400.

Subsequently, the outline of the image process by the image processing unit 106 will be described. FIG. 4 is a flowchart showing the outline of the image process by the image processing unit 106 of the imaging device 101a in FIG. 1.

First, the image processing unit 106 performs two-dimensional Fast Fourier Transform (FFT) operation to a moiré fringe image output from the image sensor 103 for respective color RGB (Red, Green, and Blue) components to find a frequency spectrum (Step S501).

Subsequently, after cutting out data of the one-side frequency of the frequency spectrum derived from the process in Step S501 (Step S502), the image processing unit 106 performs the intensity calculation of the frequency spectrum (Step S503), and acquires an image.

The image processing unit 106 performs a noise removal process to the obtained image (Step S504), and subsequently, a performs process such as a contrast enhance process (Step S505).

After that, the image processing unit 106 adjusts the color balance of the image (Step S506), creates a shot image (image data) as an output signal (Step S507), and outputs the shot image. From the above, the image process performed by the image processing unit 106 is ended.

Subsequently, the shooting principle of the imaging device 101a will be described.

First, the grating patterns 104 and 105 in concentric circles in which the pitch becomes finer inversely proportional to the radius from the center are defined as follows. In a laser interferometer and the like, the case is assumed where a spherical wave close to a plane wave is caused to interfere with a plane wave used as a reference beam. When the radius from the reference coordinates that are the center of concentric circles is r and the phase of the spherical wave at that point is $\phi(r)$, the phase $\phi(r)$ is expressed by the following formula (1) using a coefficient $\beta$ that determines the size of the curve of the wave front.

[Mathematical Formula 1]

$$\phi(r) = \beta r^2 \qquad (1)$$

The reason the phase is expressed by the square of the radius r although the wave is the spherical wave is that since the spherical wave is close to the plane wave, approximation can be achieved with the lowest order of expansion. When a plane wave is caused to interfere with a light beam having this phase distribution, the intensity distribution of interference fringes (light beam) expressed by the following formula (2) is obtained.

[Mathematical Formula 2]

$$I(r) = \tfrac{1}{4}|\exp i\phi(r) + 1|^2 = \tfrac{1}{2}(1 + \cos\phi) = \tfrac{1}{2}(1 + \cos\beta r^2) \qquad (2)$$

The interference fringes (light beam) become fringes in concentric circles having bright lines at a radial position satisfying the following formula (3).

[Mathematical Formula 3]

$$(r) = \rho r^2 = 2n\pi (n=0,1,2,\ldots) \qquad (3)$$

When the pitch of the fringes is p, the following formula (4) is obtained.

[Mathematical Formula 4]

$$p\frac{d}{dr}\phi(r) = 2p\beta r = 2\pi,\ p(r) = \frac{\pi}{\beta r} \qquad (4)$$

The formula (4) reveals that the pitch narrows inversely proportional to the radius. The plate having such fringes is referred to as the Fresnel zone plate or the Gabor zone plate. The grating patterns having a transmittance distribution proportional to the intensity distribution defined in this manner are used as the grating patterns 104 and 105 shown in FIG. 1.

It is assumed that a collimated light beam enters the modulator 102 in a thickness t having such a grating pattern formed on the both surfaces at an angle of $\theta_0$ as shown in FIG. 5A. It is assumed that when the refraction angle in the modulator 102 is $\theta$, a light beam geometric-optically multiplied by the transmittance of the grating on the front surface enters the back surface with a shift $\delta = t\cdot\tan\theta$, and two concentric gratings are formed as the centers are aligned, the transmittance of the grating of the back surface is multiplied with a shift of $\delta$. At this time, the intensity distribution expressed by the following formula (5) is obtained.

[Mathematical Formula 5]

$$I(x,y)I(x+\delta,y) = \tfrac{1}{4}[1+\cos\beta(x^2+y^2)][1+\cos\beta((x+\delta)^2+y^2)] = \tfrac{1}{8}[2+4\cos\beta(r^2+\delta x)\cos\delta\beta x + \cos 2\beta(r^2+\delta x)+\cos 2\delta\beta x] \qquad (5)$$

It is revealed that the fourth term of the expansion formula provides fringe patterns at regular intervals straight to the direction of a shift of two gratings on throughout the surfaces of the overlapping region. The fringes produced at a relatively low spatial frequency with the such overlap of fringes with fringes are referred to as moiré fringes.

The fringes at regular straight intervals produce a sharp peak in the spatial frequency distribution obtained by two-dimensional First Fourier Transform of a detected image. From the value of the frequency, the value $\delta$, i.e., the incident angle $\theta$ of the light beam can be derived.

It is apparent that such moiré fringes uniformly obtained throughout the surface at regular intervals are produced at the same pitch from symmetry on the disposition of the grating in concentric circles regardless of the direction of a shift of two gratings. The reason such fringes are obtained is that the grating pattern is formed with a Fresnel zone plate or a Gabor zone plate, and it is considered that it is difficult to obtain uniform fringes throughout the surface with a grating pattern other than this. However, it is an object to obtain uniform moiré fringes at regular intervals throughout the surface, and the grating pattern is not limited to the Fresnel zone plate or the Gabor zone plate.

It is revealed that also by the second term of the expansion formula of the formula (5), the fringes are produced in which the intensity of the Fresnel zone plate is modulated with moiré fringes. However, the frequency spectrum of a product of two fringes is convolution of the Fourier spectrums of two fringes, and thus no sharp peak is obtained. From the formula (5), a component having a sharp peak alone is extracted as in the following formula (6).

[Mathematical Formula 6]

$$M(x,y) = \tfrac{1}{8}(2+\cos 2\delta\beta x) \qquad (6)$$

The Fourier spectrum is expressed by the following formula (7).

[Mathematical Formula 7]

$$\mathcal{F}[M(x, y)] = \frac{1}{8}\mathcal{F}[2 + \cos 2\delta\beta x] \quad (7)$$
$$= \frac{1}{4}\delta(u, v) + \frac{1}{8}\delta\left(u + \frac{\delta\beta}{\pi}, v\right) +$$
$$\frac{1}{8}\delta\left(u - \frac{\delta\beta}{\pi}, v\right)$$

Here, F expresses the operation of Fourier Transform, u and v express spatial frequency coordinates in an x direction and a y direction, and δ with parentheses is a delta function. From this result, it is revealed that in the spatial frequency spectrum of the detected image, the peak of the spatial frequency of moiré fringes is produced at a location u=±δβ/π.

The manner is shown in FIG. 5B to FIG. 5D. In these drawings, from left to right, a layout diagram of the light beam and the modulator 102, moiré fringes, and a schematic diagram of the spatial frequency spectrum are shown. FIG. 5B shows vertical incidence, FIG. 5C shows the case where a light beam enters at an angle θ from the left side, and FIG. 5D shows the case where a light beam enters at an angle θ from the right side.

The axes of the first grating pattern 104 formed on the front surface side of the modulator 102 and the second grating pattern 105 formed on the back surface side are aligned. In FIG. 5B, the shadows of the first grating pattern 104 and the second grating pattern 105 match, and no moiré fringes are produced.

In FIG. 5C and FIG. 5D, the shift between the first grating pattern 104 and the second grating pattern 105 is equal, and this produces moiré, and the peak positions of the spatial frequency spectra also match. Therefore, from the spatial frequency spectrum, it is not possible to discriminate whether the incident angle of the light beam is the case in FIG. 5C or the case in FIG. 5D.

In order to avoid this, for example, as shown in FIG. 6A, the two grating patterns 104 and 105 are relatively shifted beforehand to the optical axis also to the light beam that perpendicularly enters the modulator 102 such that the shadows of two grating patterns overlap with each other in a shift.

When a relative shift in the shadows of the two gratings The vertical incident plane wave on the axis is $\delta_0$, the shift δ produced due to the plane wave at the incident angle θ is expressed by the following formula (8).

[Mathematical Formula 8]

$$\delta = \delta_0 + t \tan\theta \quad (8)$$

At this time, the peak of the spatial frequency spectrum of the moiré fringes of the light beam at the incident angle θ is at the position u expressed by the following formula (9) on the positive side of the frequency.

[Mathematical Formula 9]

$$u = \frac{\delta\beta}{\pi} = \frac{1}{\pi}(\delta_0 + t\tan\theta)\beta \quad (9)$$

When the size of the image sensor 103 is S, and the pixel numbers of the image sensor in the x direction and the y direction are both N, the spatial frequency spectrum of the discrete image by Fast Fourier Transform (FFT) is obtained in the range of −N/(2S) to +N/(2S).

From this, when it is considered that the incident angle on the positive side and the incident angle on the negative side are equally received, it is appropriate that the spectrum peak position of moiré fringes on the vertical incident plane wave (θ=0) is the center position between the position of the origin point (DC: direct current component) and the frequency position at the end of the positive side, for example, i.e., the spatial frequency position expressed by the following formula (10).

[Mathematical Formula 10]

$$\frac{\delta_0\beta}{\pi} = \frac{N}{4S} \quad (10)$$

Therefore, it is appropriate that a relative shift in the center positions of the two gratings is $\delta_0$ expressed by the following formula (11).

[Mathematical Formula 11]

$$\delta_0 = \frac{\pi N}{4\beta S} \quad (11)$$

FIG. 6B to FIG. 6D are schematic diagrams for explaining the creation of moiré fringes and the frequency spectrum in the case where the first grating pattern 104 and the second grating pattern 105 are shifted and disposed. As in FIG. 5B to FIG. 5D, the left side shows a layout diagram of the light beam and the modulator 102, the center column shows moiré fringes, and the right side shows the spatial frequency spectrum. FIG. 6B is in the case where a light beam vertically enters, FIG. 6C is in the case where a light beam enters at an angle θ from the left side, and FIG. 6D is the case where a light beam enters at an angle θ from the right side.

The first grating pattern 104 and the second grating pattern 105 are disposed being shifted at $\delta_0$ beforehand. Therefore, also in FIG. 6B, moiré fringes are produced, and the peak appears in the spatial frequency spectrum. As described above, the shift amount $\delta_0$ is set such that the peak position appears at the center of the spectrum range on one side from the origin point. At this time, FIG. 6C shows the direction in which the shift δ further increases, and FIG. 6D shows the direction in which the shift δ decreases. Therefore, unlike FIG. 5C and FIG. 5D, the difference between FIG. 6C and FIG. 6D can be discriminated from the peak position of the spectrum. The spectral image of this peak is a bright spot indicating an infinite ray bundle, and is nothing more or less than a shot image with the imaging device 101a in FIG. 1.

When the maximum angle of the incident angle of a receivable collimated light beam is θ max, from $\mu_{max}$ expressed by the following formula (12),

[Mathematical Formula 12]

$$u_{max} = \frac{1}{\pi}(\delta_0 + t \tan\theta_{max})\beta = \frac{N}{2S} \quad (12)$$

The receivable maximum angle of view tan $\theta_{max}$ with the imaging device 101a is given by the following formula (13).

[Mathematical Formula 13]

$$\tan\theta_{max} = \frac{\pi N}{4t\beta S} \quad (13)$$

On the analogy of image formation using a typical lens, it is considered that the collimated light beam at the angle of view $\theta_{max}$ is received being focused at the end of the image sensor, it can be considered that the effective focal length $f_{eff}$ of the imaging device 101a with no lens corresponds to the following formula (14).

[Mathematical Formula 14]

$$f_{eff} = \frac{S}{2\tan\theta_{max}} = \frac{2t\beta S^2}{\pi N} \quad (14)$$

Here, it is revealed from the formula (13) that the angle of view is changeable by the thickness t of the modulator 102 and the coefficient β of the grating patterns 104 and 105. Therefore, for example, as long as the modulator 102 has the configuration in FIG. 2B with the function capable of changing the length of the support member 112b, the angle of view may be changed for shooting at the time of shooting.

Figure 7A:
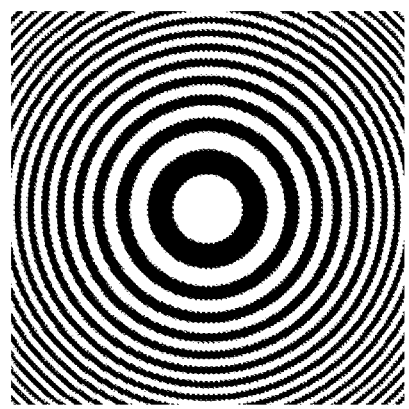
FIGS. 7A and 7B are diagrams for explaining an example of a grating pattern according to the embodiment of the present invention.

Note that as expressed by the formula (2), it is assumed that the transmittance distribution of the grating pattern basically has the sine wave properties. However, such a component only has to be provided as the basic frequency component of the grating pattern. For example, as the grating pattern 104a as shown in FIG. 7A, the transmittance of the grating pattern may be binarized. It is also considered that as the grating pattern 104b shown in FIG. 7B, the duty is changed between a grating region of high transmittance and a grating region of low transmittance, and the width of the region of high transmittance is increased to improve the transmittance. Thus, an effect such as suppressing diffraction from the grating pattern is also obtained, and the degradation in the shot image can be reduced.

In the description above, the incident light beam enters at one incident angle at the same time in any case. However, in order that the imaging device 101a actually acts as a camera, it is necessary to assume the case where light beams at a plurality of incident angles enter at the same time. Such light beams at a plurality of incident angles already overlap a plurality of images on the front-side grating by the time the light beams enter the grating pattern on the back surface side.

It is assumed that the light beams mutually produce moiré fringes, there is a concern that the moiré fringes become noise that inhibits detection of moiré fringes with the second grating pattern 105 that is a signal component. However, actually, an overlap of images of the first grating pattern 104 produces no peak in the moiré image, and the peak is produced only in an overlap with the second grating pattern 105 on the back surface side. The reason will be described below.

First, a huge difference is that an overlap of the shadows of the first grating pattern 104 on the front surface side due to the light beams at a plurality of incident angles is not a product but a sum. In an overlap of the shadow of the first grating pattern 104 due to a light beam at one incident angle and the second grating pattern 105, the light intensity distribution that is the shadow of the first grating pattern 104 is multiplied by the transmittance of the second grating pattern 105, and thus the light intensity distribution after the second grating pattern 105 on the back surface side is transmitted is obtained.

Whereas since an overlap of the shadows due to a plurality of light beams at different angles incident to the first grating pattern 104 on the front surface side is an overlap of light beams, the overlap becomes not a product but a sum. In the case of the sum, as shown in the following formula (15), the distribution is the distribution resulting from the distribution of the original grating on the Fresnel zone plate multiplied by the distribution of moiré fringes.

[Mathematical Formula 15]

$$I(x,y)+I(x+\delta,y)=\frac{1}{2}[1+\cos \beta(x^2+y^2)]+\frac{1}{2}[1+\cos \beta((x+\delta)^2+y^2)]=1+\cos [\beta(r^2+\delta x)]\cos \delta\beta x \quad (15)$$

Therefore, the frequency spectrum is expressed by an overlap integral of the frequency spectra. Therefore, even though the spectrum of moiré alone has a sharp peak, actually, a ghost of the frequency spectrum of the Fresnel zone plate is merely produced at the position. In other words, no sharp peak is produced in the spectrum.

Therefore, even though the light beams at a plurality of incident angles are included, the spectrum of the detected moiré image always includes only moiré of a product of the first grating pattern 104 on the front surface side and the second grating pattern 105 on the back surface side. Since the second grating pattern 105 is single, the peak of the detected spectrum is single to one incident angle.

Figure 8A:
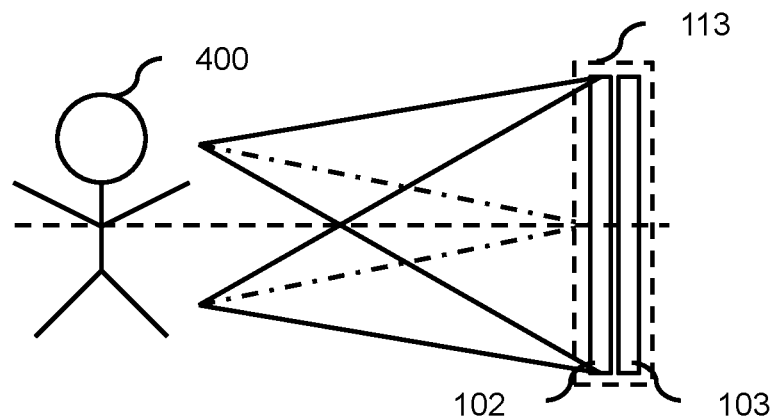
FIG. 8A is a diagram for explaining angles formed of light beams from points forming an object to a sensor.

Here, the correspondence of the collimated light beam to be detected, described so far and an actual light beam from the object will be schematically described with reference to FIG. 8A. FIG. 8A is a diagram for explaining angles formed by the light beams from the points forming the object to the image sensor 103.

The light beams from the points constituting the subject 400 enter, as strictly a spherical wave from a point light source, the modulator 102 and the image sensor 103 of the imaging device 101a in FIG. 1 (in the following, in FIG. 8A, referred to as a grating sensor integrated substrate 113). At this time, in the case where the grating sensor integrated substrate 113 is small enough to the subject 400 or in the case where the grating sensor integrated substrate 113 is far enough, the incident angle of the light beams applied from the points to the grating sensor integrated substrate 113 is regarded as the same.

From the relationship in which the spatial frequency displacement Δμ of moiré to the micro angle displacement Δθ derived from the formula (9) is equal to or less than 1/S that is the minimum resolution of the spatial frequency of the image sensor, the condition under which Δθ is regarded as the collimated light beam is expressed by the following formula (16).

[Mathematical Formula 16]

$$\begin{cases} \Delta u = \frac{1}{\pi}\beta t \Delta\theta \le \frac{1}{S} \\ \Delta\theta \le \frac{\pi}{S\beta t} \end{cases} \quad (16)$$

Figure 8B:
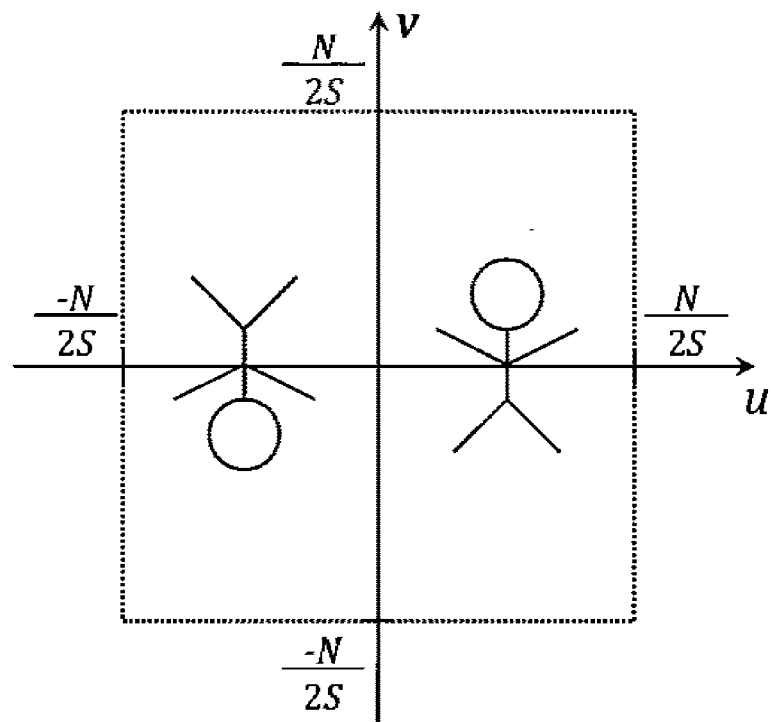
FIG. 8B is a diagram for explaining a spatial frequency spectrum in the case where the object is shot.

Under this condition, imaging can be performed to the infinite object with the imaging device 101*a*, and from the discussion so far, an image as shown in FIG. 8B can be obtained by Fast Fourier Transform (FFT).

<Shooting Principle of Finite Distance the Object>

Figure 9A:
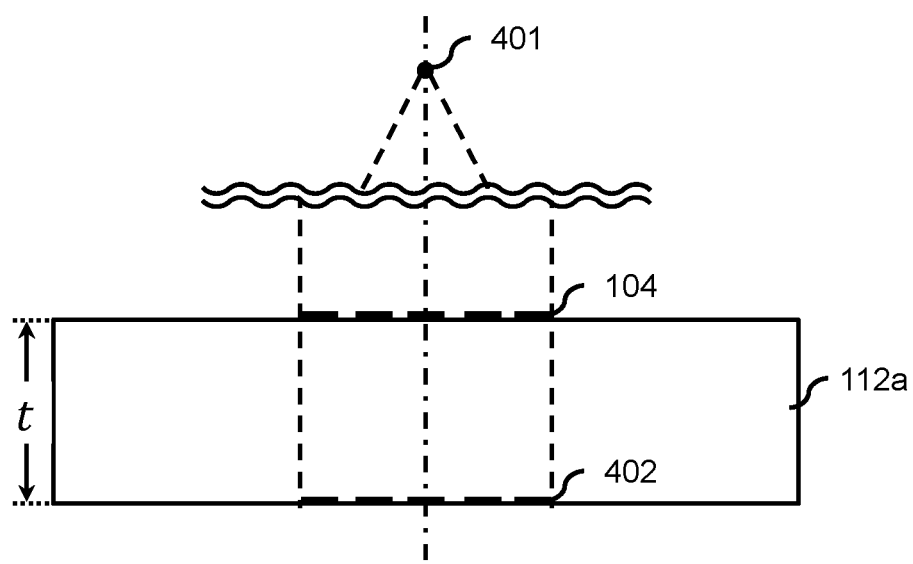
FIG. 9A is a diagram for explaining that a front-side grating pattern is projected in the case where an object is at an infinite distance.

Here, in the case of infinity described so far, a manner of the projection onto the back surface of the first grating pattern 104 on the front surface side is shown in FIG. 9A.

Figure 9B:
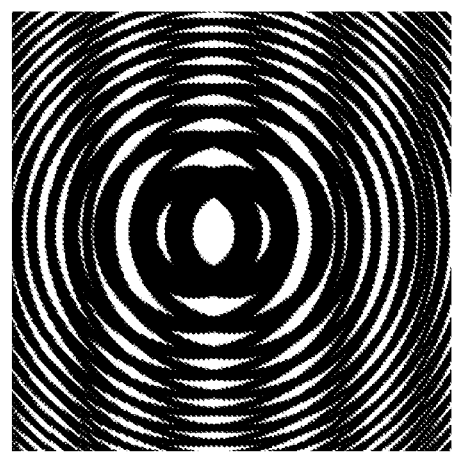
FIG. 9B is a diagram for explaining an example of moiré fringes created in the case where the object is at an infinite distance.

In the case where the spherical wave from a point 401 constituting the infinite object becomes a plane wave while propagating through a sufficiently long distance, the wave is applied to the first grating pattern 104 on the front surface side, and its projection image 402 is projected onto the surface below, the projection image is in almost the same shape as the shape of the first grating pattern 104. As a result, the projection image 402 is multiplied by the transmittance distribution of the grating pattern on the back surface side (corresponding to the second grating pattern 105 in FIG. 1), and thus linear moiré fringes at regular intervals as shown in FIG. 9B can be obtained.

Figure 10A:
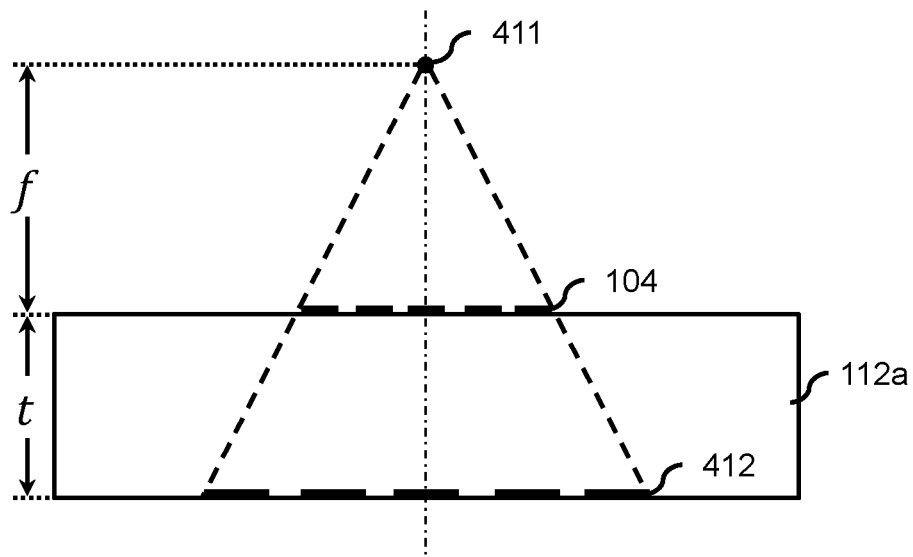
FIG. 10A is a diagram for explaining a front-side grating pattern is enlarged in the case where an object is at a finite distance.

On the other hand, imaging of an object at a finite distance will be described. FIG. 10A is a diagram showing that in the case where an object to be imaged is at a finite distance, the projection onto the back surface of the first grating pattern 104 on the front surface side is more enlarged than the first grating pattern 104.

As shown in FIG. 10A, in the case where a spherical wave from a point 411 constituting an object is applied to the first grating pattern 104 on the front surface side and its projection image 412 is projected onto the surface below, the projection image is almost uniformly enlarged. Note that this magnification α can be calculated as the following formula (17) using a distance f from the first grating pattern 104 to the point 411.

[Mathematical Formula 17]

$$\alpha = \frac{f+t}{f} \quad (17)$$

Figure 10B:
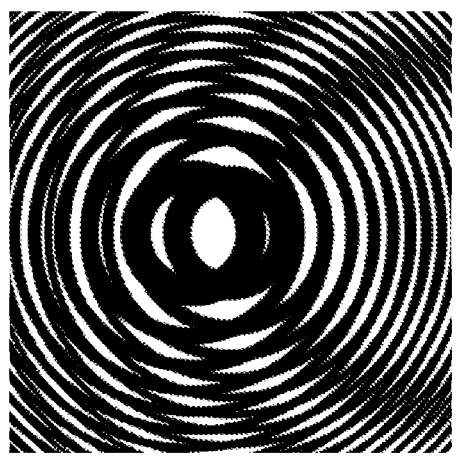
FIG. 10B is a diagram for explaining an example of moiré fringes created in the case where the object is at a finite distance.

Therefore, when the transmittance distribution of the grating pattern on the back surface side designed for the collimated light beam is multiplied as it is, no linear moiré fringe at regular intervals is produced as shown in FIG. 10B.

Figure 10C:
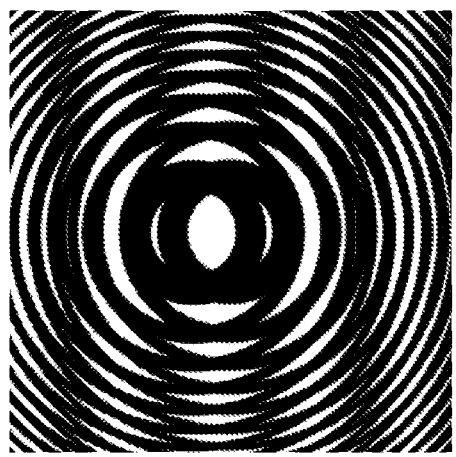
FIG. 10C is a diagram for explaining an example of moiré fringes in which a back-side grating pattern is corrected in the case where the object is at a finite distance.

However, when the second grating pattern 105 is enlarged as matched with the shadow of the first grating pattern 104 on the front surface side uniformly enlarged, as shown in FIG. 10C, linear moiré fringes at regular intervals can be again produced on the enlarged projection image 412. To this end, the coefficient β of the second grating pattern 105 is set to β/α, and thus correction is possible.

Thus, the light beam from the point 411 at a distance, which is not always at infinite, can be selectively regenerated. Accordingly, it is possible to perform shooting with focus being achieved at a given position.

<Modification of Modulator>

Figure 11A:
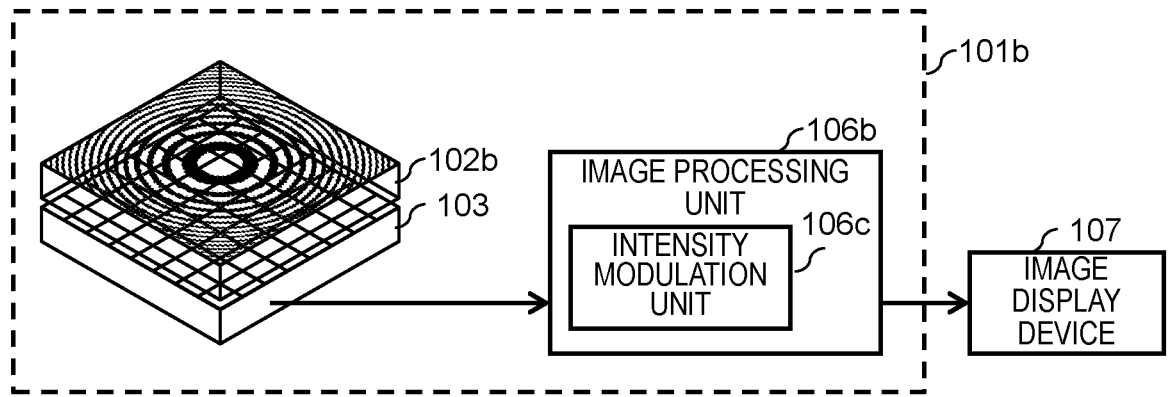
FIG. 11A is a diagram for explaining is a block diagram of an imaging device that implements a back-side grating pattern with an image process according to the embodiment of the present invention.

Next, a method of simplifying the configuration of the modulator 102 will be described. FIG. 11A shows an example of the configuration of an imaging device 101*b* in this case.

In the modulator 102 of the imaging device 101*a*, the first grating pattern 104 and the second grating pattern 105 in the same shape are shifted and formed respectively on the front surface and the back surface of the grating substrate 112*a*, and the angle of the incident collimated light beam is detected from the spatial frequency spectrum of the moiré fringes to form an image.

The second grating pattern 105 on the back surface side of the imaging device 101*a* is an optical element that is closely contacted with the image sensor 103 to modulate the intensity of the incident light beam, and has the same grating pattern regardless of the incident light beam.

Therefore, as shown in FIG. 11A, in the imaging device 101*b*, with the use of a modulator 102*b* from which the second grating pattern 105 is removed, the process corresponding to the second grating pattern 105 may be executed with an intensity modulation unit 106*c* in the image processing unit 106*b*.

Figure 11B:
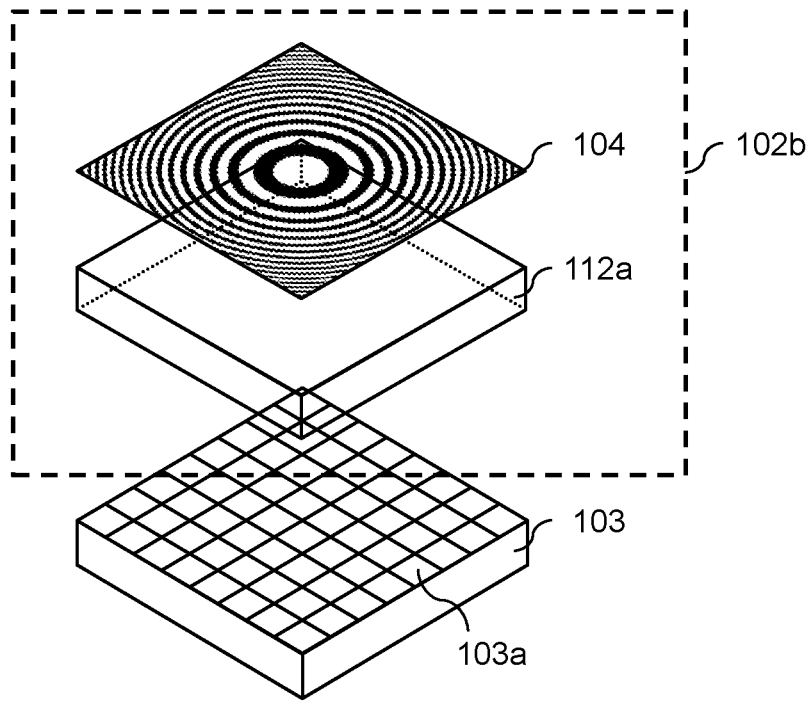
FIG. 11B is a diagram for explaining the modulator of the imaging device that implements the back-side grating pattern with the image process.

The detail of the configuration of the modulator 102*b* is shown in FIG. 11B. With this configuration, one surface of a grating pattern to be formed on the grating substrate 112*a* can be reduced. Accordingly, manufacturing costs of the modulator can be reduced.

Figure 12:
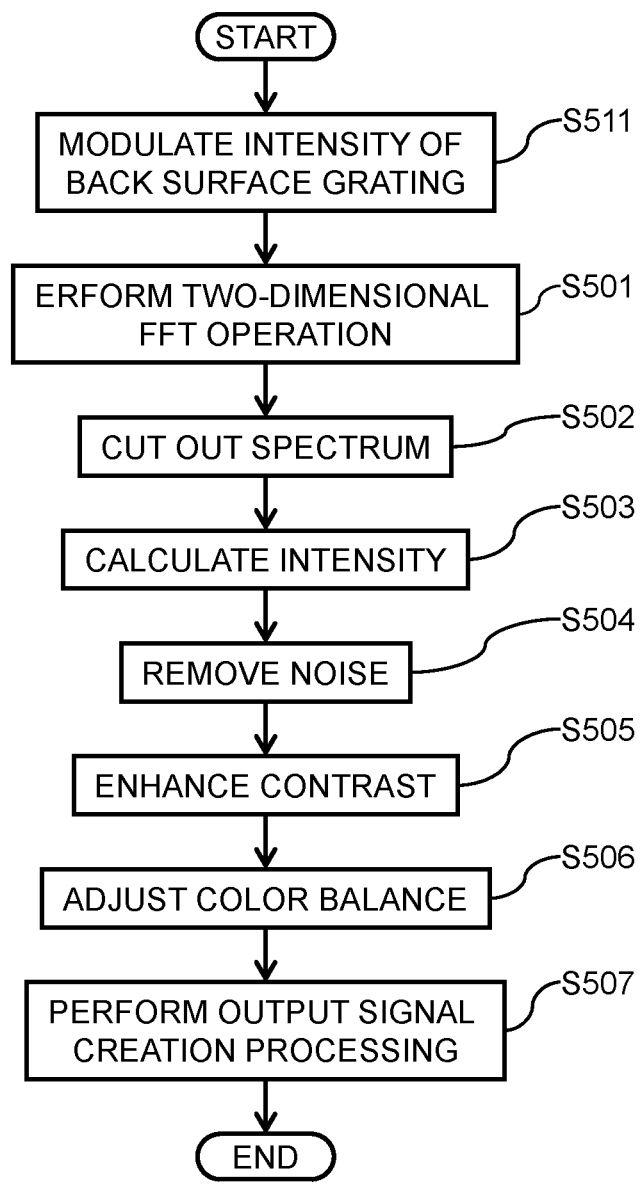
FIG. 12 is a flowchart of an image process performed by the image processing unit of the imaging device that implements the back-side grating pattern with the image process according to the embodiment of the present invention.

FIG. 12 is a flowchart showing the outline of the image process performed by the image processing unit 106*b* in FIG. 11A.

The flowchart in FIG. 12 is different from the flowchart in FIG. 4 in a process in Step S511. In Step S511, the image processing unit 106*b* creates a moiré fringe image corresponding to a process in which the grating pattern 105 on the back surface side is transmitted to the image output from the image sensor 103 with the above-described intensity modulation unit 106*c*.

Figure 7B:
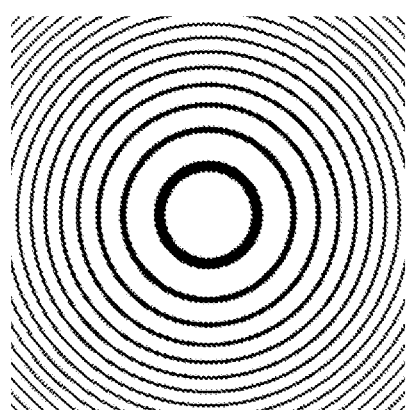

Specifically, since the operation corresponding to the formula (5) only has to be performed, the intensity modulation unit 106*c* creates the grating pattern 105 on the back surface side and multiply it against the image of the image sensor 103. Note that when the grating pattern 105 on the back surface side is a binarized pattern as shown in FIG. 7A and FIG. 7B, the intensity modulation unit 106*c* may simply set the value of the region of the image sensor 103 corresponding to black to zero. Thus, it is possible to suppress the scale of the multiplication circuit.

In the following, the processes in Steps S501 to S507 in FIG. 12 are similar to the processes in FIG. 4, and here, the description is omitted.

Note that in this case, the pitch of the pixel 103*a* of the image sensor 103 has to be fine to the extent that the pitch of the first grating pattern 104 can be reproduced sufficiently or has to be coarse to the extent that the pitch of the first grating pattern 104 can be reproduced at the pitch of the pixel 103*a*.

In the case where the grating pattern is formed on both surfaces of the grating substrate 112*a*, the pitch of the grating pattern does not necessarily have to be resolved in the pixel 103*a* of the image sensor 103, and the moiré image alone has to be resolved. However, in the case where the grating pattern is reproduced by the image process, the resolution of the grating pattern and the image sensor 103 has to be equivalent to each other.

The configuration above is implemented by the process corresponding to the second grating pattern 105 with the intensity modulation unit 106*c*. However, since the second grating pattern 105 is an optical element in close contact with the image sensor 103 to modulate the intensity of the incident light beam, it is possible to implement the second grating pattern 105 by setting the sensitivity of the image sensor 103 with effective addition of the transmittance of the second grating pattern 105.

Figure 13:
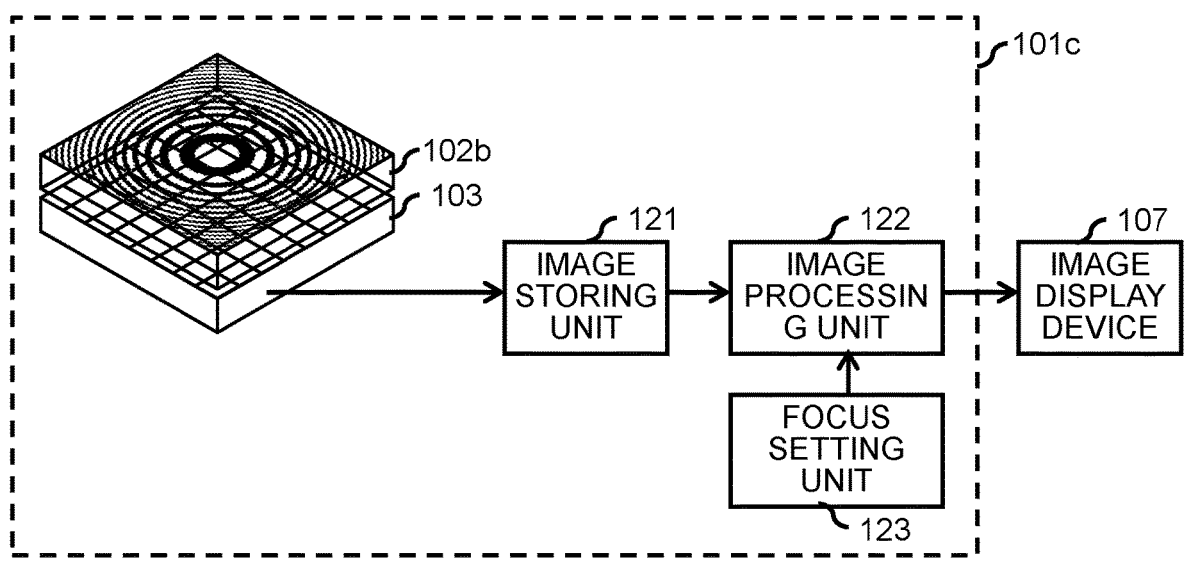
FIG. 13 is a block diagram of a re-focusable imaging device according to the embodiment of the present invention.

According to the configuration described above in which the second grating pattern 105 on the back surface side is performed with the image processing unit 106b, it is possible to achieve focus at a given distance after shooting, i.e., re-focus is possible. FIG. 13 shows the configuration of an imaging device 101c capable of such re-focus.

The imaging device 101c is different from the imaging device 101b shown in FIG. 11A in an image storing unit 121, an image processing unit 122, and a focus setting unit 123.

The image storing unit 121 is provided to enable focus adjustment after shooting and to temporarily store the image output from the image sensor 103. The focus setting unit 123 receives a focus distance set by the user through a knob equipped on the imaging device 101c or the GUI (Graphical User Interface) of a smartphone, for example, and outputs the focus distance as focus distance information to the image processing unit 122. As described above, the imaging device 101c shown in the present drawing enables the setting of the focus distance.

Figure 14:
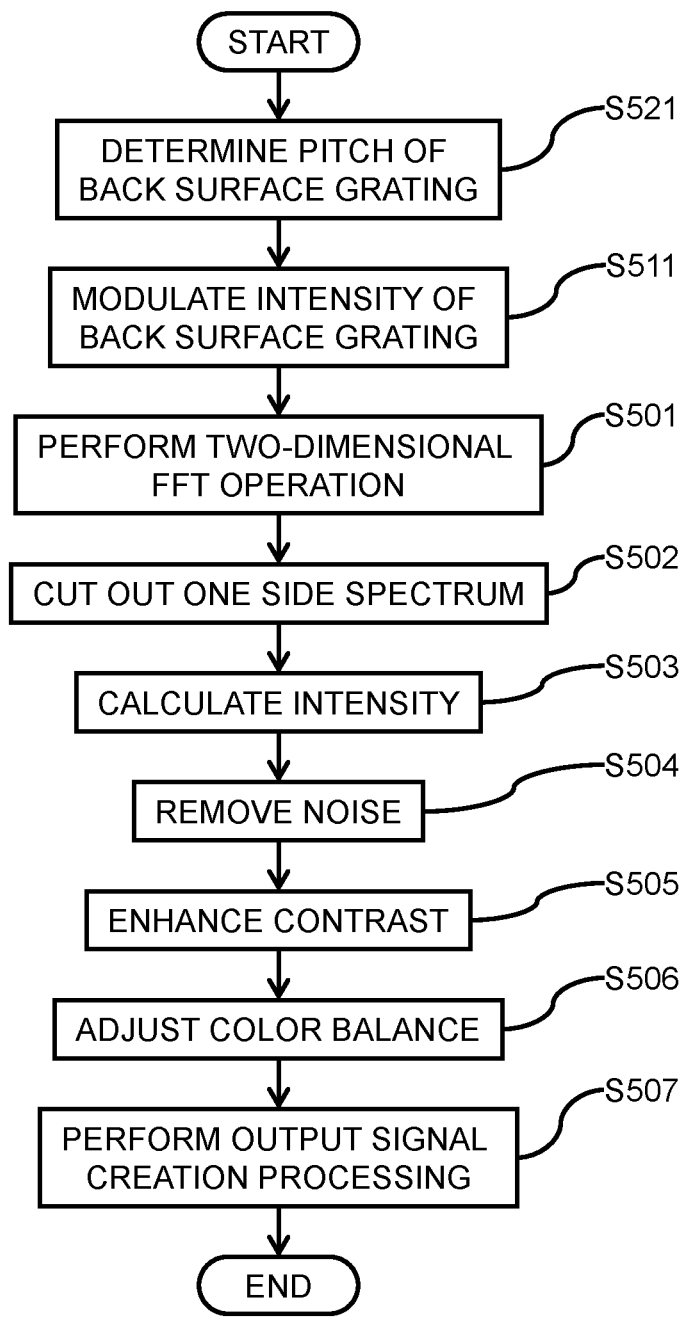
FIG. 14 is a flowchart of an image process performed by the image processing unit of a re-focusable imaging device according to the embodiment of the present invention.

FIG. 14 is a flowchart showing the outline of the image process performed by the image processing unit 122 in FIG. 13.

The flowchart in FIG. 14 is different from the flowchart in FIG. 12 in a process in Step S521. In Step S521, the image processing unit 122 calculates the magnification a from the formula (17) based on focus distance information that is the output from the above-described focus setting unit 123, and calculates that the coefficient β of the second grating pattern 105 on the back surface side is β/α. After that, in Step S511, the image processing unit 122 creates a moiré fringe image corresponding to a transmission through the grating pattern on the back side surface based on the coefficient.

In the following, the processes in Steps S501 to S507 in FIG. 14 are similar to the processes in FIG. 4, and here, the description is omitted.

According to the methods and the configurations described above, it is possible to obtain the image of the object in the surroundings by a simple operation such as Fast Fourier Transform (FFT), and furthermore, it is possible to adjust focus at a given distance after shooting. Although it is necessary to reshoot images for changing focus in conventional cameras, according to the imaging device 101c, only a shot at one time is necessary.

Note that Fast Fourier Transform is described as an example of a method of calculating the spatial frequency spectrum from moiré fringes, but the method is not limited to this method. The method can be implemented also using a method such as Discrete Cosine Transform (DCT), and furthermore, the amount of operation can also be reduced.

In the imaging device 101c, the grating patterns 104 and 105 are described as the Fresnel zone plate or the Gabor zone plate. However, the grating patterns 104 and 105 are DUCT not limited to these. As long as the spatial frequency spectrum only has to be calculated from moiré fringes, patterns and the like in the linear direction may be used. These are applicable in the other imaging devices 101a and 101b as well.

<Automation of Focus Adjustment>

Figure 15:
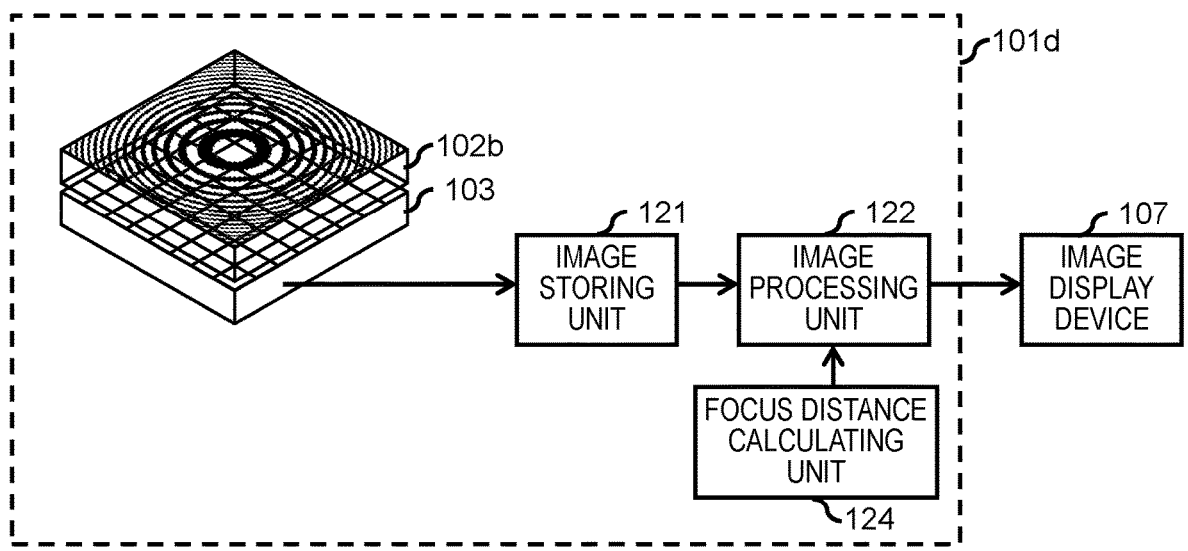
FIG. 15 is a block diagram of an auto-focusable imaging device according to the embodiment of the present invention.

FIG. 15 shows an exemplary configuration of an imaging device 101d that automates focus adjustment. The imaging device 101d is different from the imaging device 101c shown in FIG. 13 in a focus distance calculating unit 124.

Figure 16:
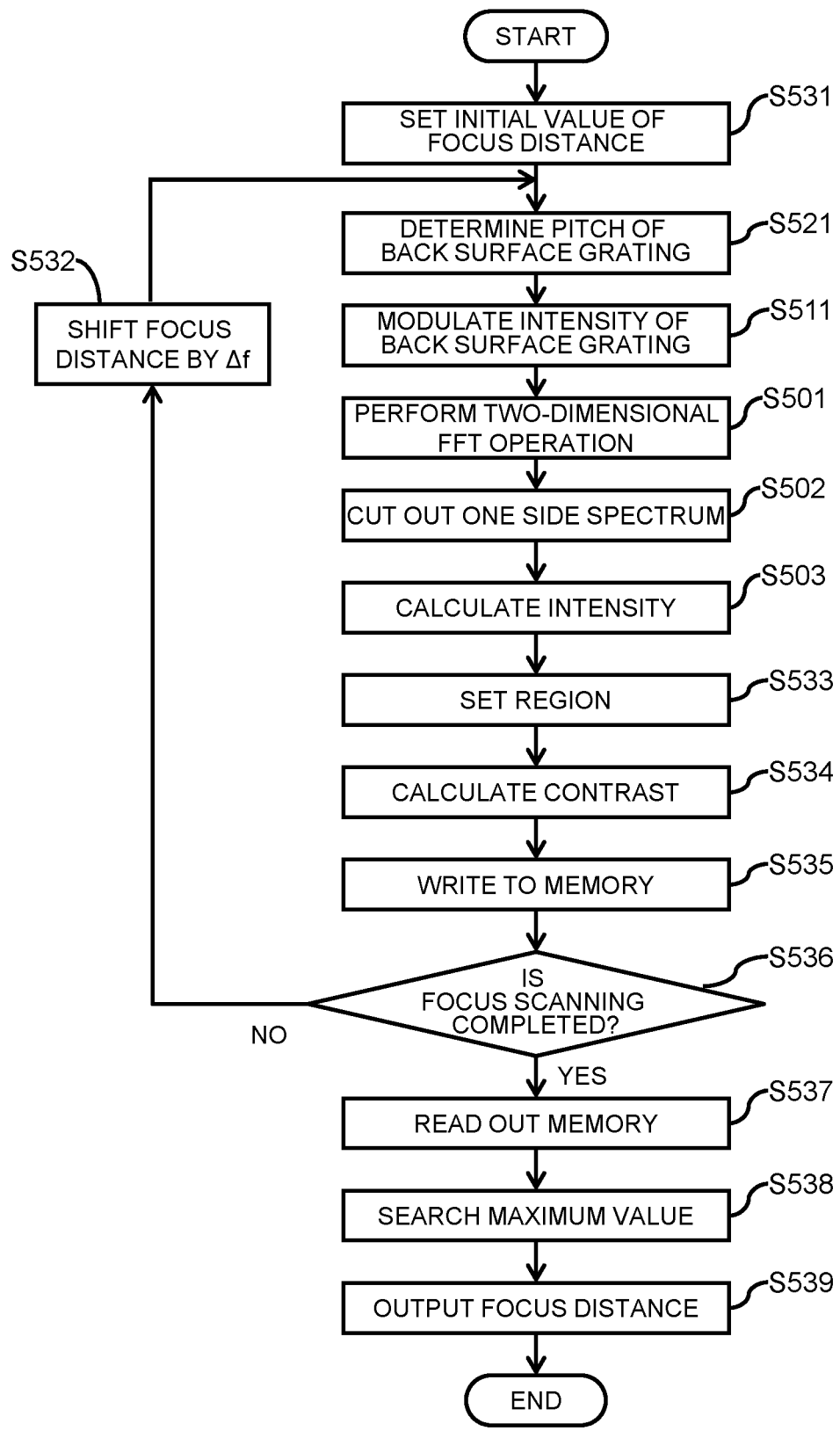
FIG. 16 is a flowchart of an image process performed by the image processing unit of the auto-focusable imaging device according to the embodiment of the present invention.

FIG. 16 is a flowchart showing the outline of autofocus performed by the focus distance calculating unit 124 shown in FIG. 15. The autofocus is implemented in which development processing is performed while the focus distance is shifted by resolution Δf (shift set values), and the distance at which the contrast is the maximum is calculated, and the distance is set as the focus distance. The process will be described in detail.

First, the focus distance calculating unit 124 sets the initial value (infinity or distance 0) of the focus distance (Step S531), calculates the magnification α from the focus distance, and calculates the coefficient β of the second grating pattern 105 (Step S521). The processes from Steps S511 to S503 are similar to the processes in FIG. 14.

Figure 17A:
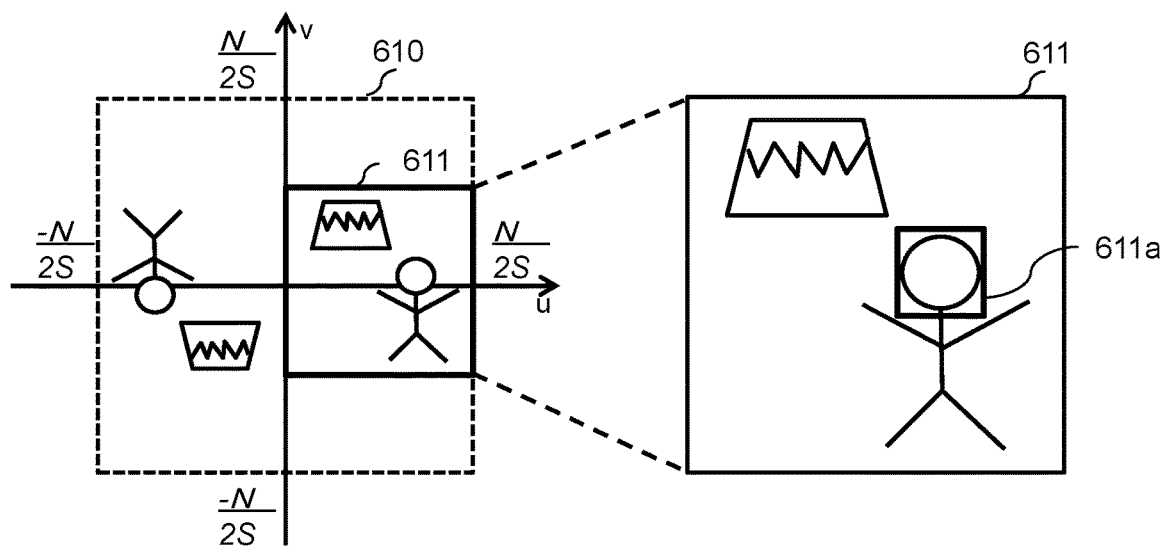
FIG. 17A is a diagram for explaining the contrast calculate region of the auto-focusable imaging device according to the embodiment of the present invention.

After that, as shown in FIG. 17A, the focus distance calculating unit 124 cuts out a given region 611a of a region 611 in an imaging range 610 captured by the image sensor 103 (Step S533). This region 611a is a region used for focus adjustment, which may be set by the user with GUI, or may be automatically set with face recognition technology and the like.

Subsequently, the focus distance calculating unit 124 calculates a contrast C in the region 611a by any of the following formula (18) or formula (19) using a maximum luminance Imax and a minimum luminance Imin in the region 611a (Step S534), and stores the result in the memory in correspondence to the focus distance (Step S535).

[Mathematical Formula 18]

$$C = \frac{I_{max} - I_{min}}{I_{max} + I_{min}} \quad (18)$$

[Mathematical Formula 19]

$$C = \frac{I_{max}}{I_{min}} \quad (19)$$

After that, until the operation in the preset focus variable range is completed (Step S536), the focus distance calculating unit 124 moves to the process of Step S532 to set the focus distance by shifting it by Δf, and repeats the processes after Step S521.

Figure 17B:
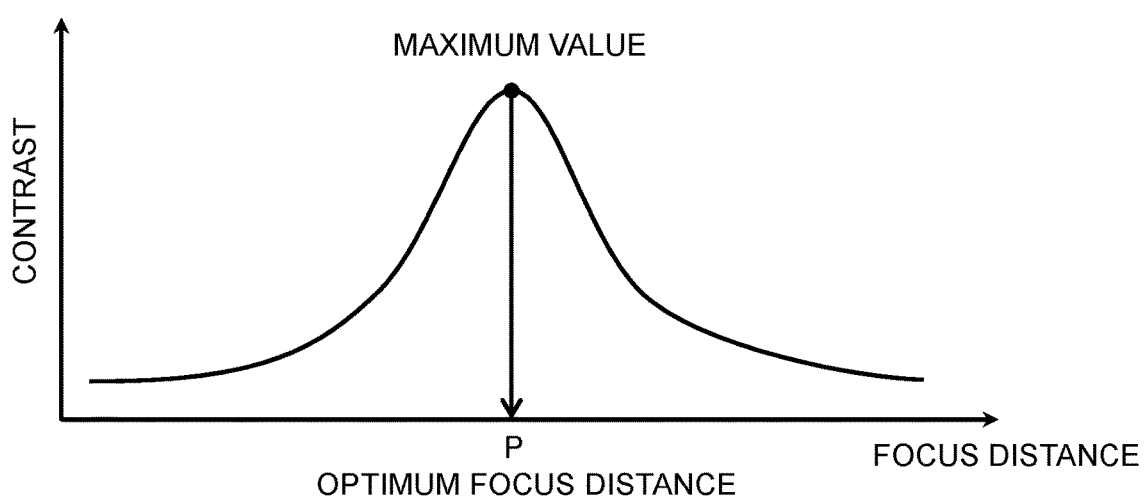
FIG. 17B is a diagram for explaining a determining method for the optimum focus distance with the auto-focusable imaging device according to the embodiment of the present invention.

After the search is completed, by reading out contrast information in the memory (Step S537), as shown in FIG. 17B, the relationship between the contrast and the focus distance is obtained, the focus distance calculating unit 124 searches the focus distance at which the contrast is at the maximum (Step S538), and outputs the focus distance (Step S539).

When the image process is performed at the image processing unit 122 based on the focus distance information obtained at this focus distance calculating unit 124, this enables shooting at the optimum focus.

According to the methods and the configurations described above, it is possible to automate focus adjustment, and furthermore, shooting at the optimum focus is made possible without with no reshooting unlike conventional cameras.

Note that here, although search in which the contrast is at the maximum is performed, the search is not limited to this, and it may be methods capable of determining the focus distance that achieves sharp images such as SNR (Signal to Noise Ratio) and the addition value of an HPF (High-Pass Filter) result.

The scan range of the focus distance may be preset by the user.

Although the method is described in which the focus distance is shifted by Δf, the method is not limited to this. In regard to the manner how images blur due to a change in the focus distance, the sensitivity to the position becomes low as the subject is far at a distance. Therefore, a finer shift in the vicinity of the imaging device 101d and a coarser shift in the distance will enable a more accurate and faster search.

<Acquisition of Distance Information>

Figure 18:
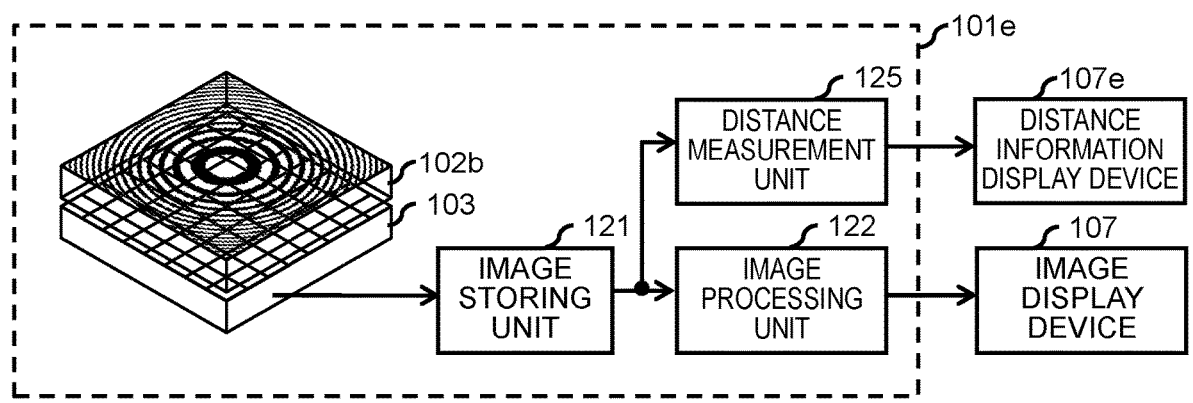
FIG. 18 is a block diagram of an imaging device capable of measuring distance according to the embodiment of the present invention.

Next, FIG. 18 shows an exemplary configuration of the imaging device 101d that acquires distance information. The imaging device 101d is an imaging device capable of measuring distance. The configurations different from the imaging device 101c shown in FIG. 13 are a distance measurement unit 125 and a distance information display device 107e.

Figure 19:
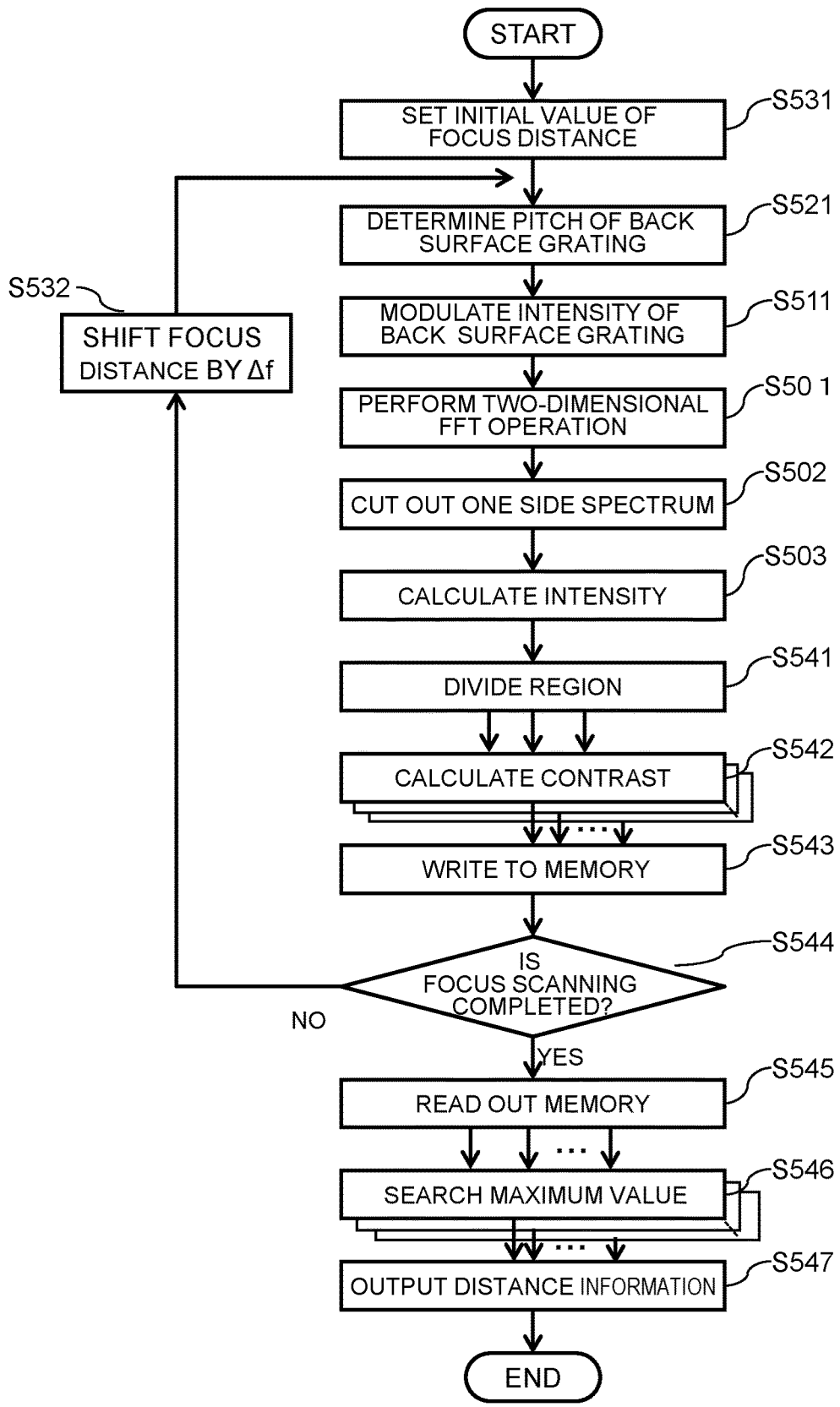
FIG. 19 is a flowchart of a distance measurement process with the distance measurement unit of the imaging device capable of measuring distance according to the embodiment of the present invention.

FIG. 19 is a flowchart showing the outline of distance measurement performed by the distance measurement unit 125 in FIG. 18. The distance measurement is achieved by implementing the above-described principle of autofocus for each predetermined pixel region on the image sensor 103 to measure the optimum focus distance (=the position at which an object is present). The process will be described in detail.

Figure 20A:
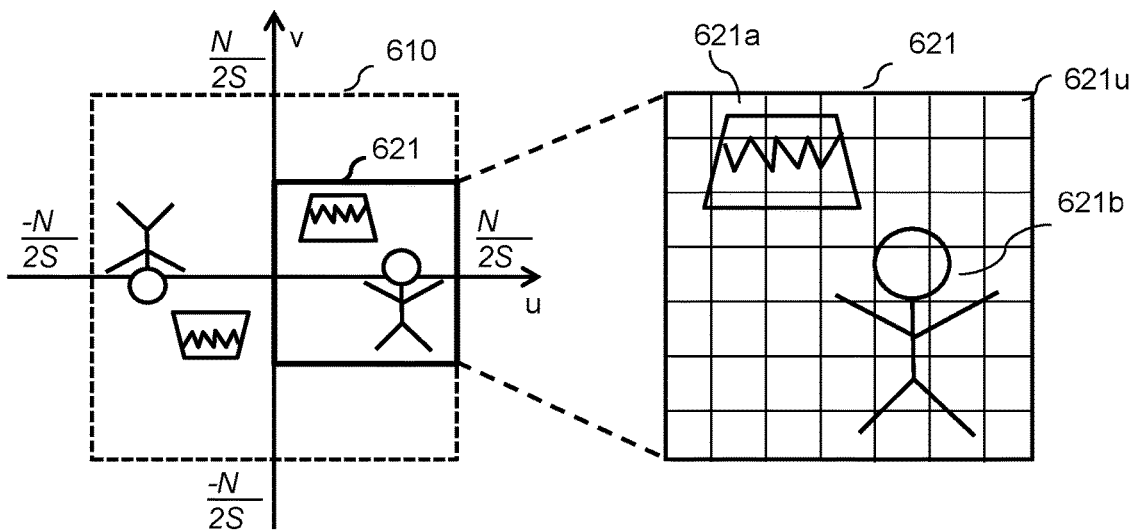
FIG. 20A is a diagram for explaining the contrast calculate region of the imaging device capable of measuring distance according to the embodiment of the present invention.

First, the processes from Step S531 to Step S503 are similar to FIG. 16. After that, as shown in FIG. 20A, the distance measurement unit 125 divides a region 621 in the imaging range 610 into unit regions 621u (Step S541).

Since this divided size corresponds to the resolution in the two-dimensional direction in the distance measurement, the size is preferably fine. However, when the resolution is too fine, it results in a problem in which measurement errors increase. Therefore, the divided size changeable by the user corresponding to an environment is useful. A unit region 621a and a unit region 621b are shown in FIG. 20A as an example of the divided unit region 621u.

Subsequently, the distance measurement unit 125 calculates the contrast C in the region for each unit region 621u using the maximum luminance Imax and the minimum luminance Imin in the region by the formula (18) or the formula (19) (Step S542), and stores the result in the memory for each region in correspondence to the focus distance (Step S543).

After that, until the operation in the preset focus variable range is completed (Step S544), the distance measurement unit 125 moves to the process of Step S532, sets the focus distance by shifting it by Δf, and repeats the processes after Step S521.

Figure 20B:
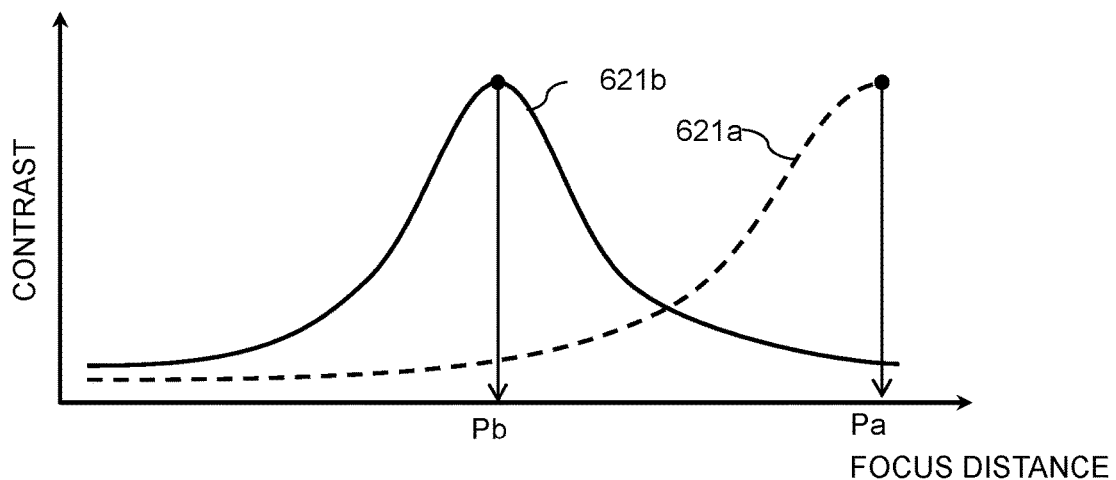
FIG. 20B is a diagram for explaining a determining method for the optimum focus distance of the imaging device capable of measuring distance according to the embodiment of the present invention.

After the search is completed, when contrast information in the memory is read (Step S545), as shown in FIG. 20B, the relationship between the contrast and the focus distance is obtained. As shown in the drawing, it is revealed that the region 621a including a mountain at a distance in the region has the contrast at the maximum at a distant place, whereas the region 621b including a person in the neighboring place in the region has the contrast at the maximum at relatively neighboring place.

Figure 20C:
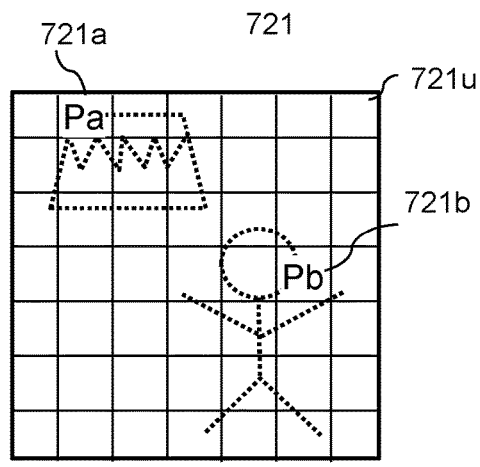
FIG. 20C is a diagram for explaining an example of a two-dimensional map output from the imaging device capable of measuring distance according to the embodiment of the present invention.

Note that in the example in the drawing, a change between only two regions is shown. However, actually, the information of as many of the unit regions 621u in FIG. 20A is stored in the memory. As described above, the distance measurement unit 125 searches the focus distance at which the contrast is at the maximum for each the unit region 621u (Step S546), as shown in FIG. 20C, creates a two-dimensional map 721 on distance information, and outputs the two-dimensional map 721 as distance data (Step S547).

Note that distance information is stored in the memory for each memory position 721u corresponding to the unit region 621u. For example, a memory 721a corresponding to the unit region 621a stores distance information Pa, and a memory 721b corresponding to the unit region 621b stores distance information pb.

This distance data is displayed with the distance information display device 107e, and thus the user can confirm the distance information in the two-dimensional direction.

Here, the description is made as an example is taken in which the output from the distance measurement unit 125 is displayed on the distance information display device 107e. However, the output from the distance measurement unit 125 may be output as an output signal to another device. The output signal from the distance measurement unit 125 is also applicable to obstacle recognition and automatic driving in devices such as automobiles and drones.

According to the methods and the configurations described above, it is possible to acquire images as well as distance information for each unit region.

Note that in the imaging devices 101d and 101e, search in which the contrast is at the maximum is performed, but it is not limited to this. For example, the method may be methods capable of determining the focus distance that achieves sharp images such as SNR (Signal to Noise Ratio) and the addition value of an HPF (High-Pass Filter) result.

In the imaging devices 101d and 101e, an example is described in which distance information is calculated from a single frame. However, images in a plurality of frames can be averaged for use, or distance information on a plurality of frames can be averaged for use to improve the SNR for improving distance accuracy or for improving resolution in the two-dimensional direction.

First Embodiment

In the following, a first embodiment of the present invention using any of imaging devices 101b to 101e will be described. In the present embodiment, with use of a lensless camera capable of acquiring three-dimensional information, a small-sized, low-profile, highly accurate three-dimensional authentication device is implemented. In the following, in the present embodiment, the description will be made with an example in which the three-dimensional authentication device shoots the face of an authentication target (user) and performs authentication by the face. That is, the description will be made, taking an example in which a subject 400 is a face.

Figure 21:
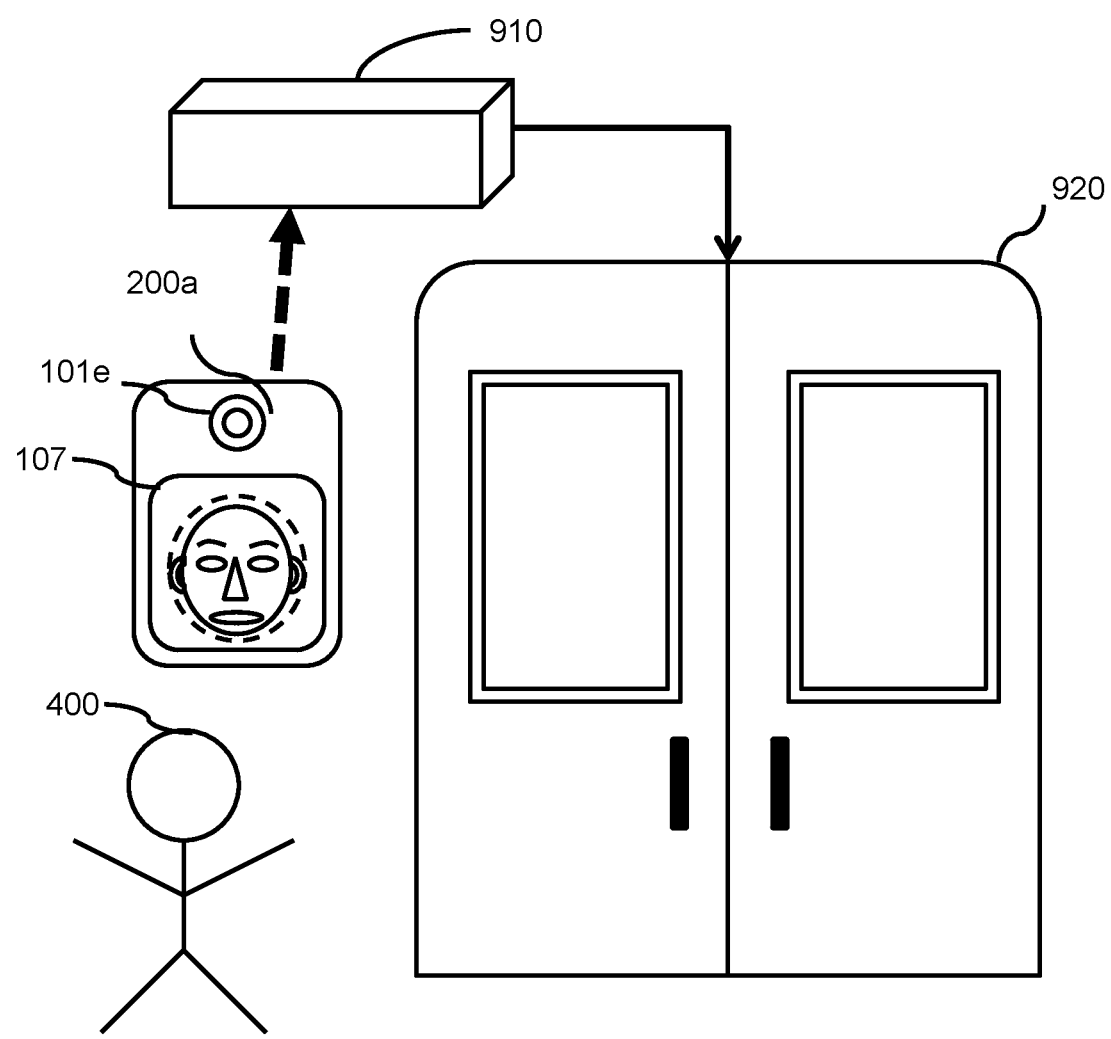
FIG. 21 is a diagram for explaining the use environment of a three-dimensional authentication device according to a first embodiment.

FIG. 21 is a diagram illustrating an example of the use environment of a three-dimensional authentication device 200a according to the present embodiment. As shown in the drawing, the three-dimensional authentication device 200a according to the present embodiment includes an imaging device 101e, for example, which is used for access management. That is, in the case where user authentication is successful in the three-dimensional authentication device 200a according to the present embodiment, an unlock signal that unlocks an access gate 920 is output from the three-dimensional authentication device 200a toward an access management server 910. In the case of receiving the unlock signal, the access management server 910 unlocks the access gate 920.

Figure 22A:
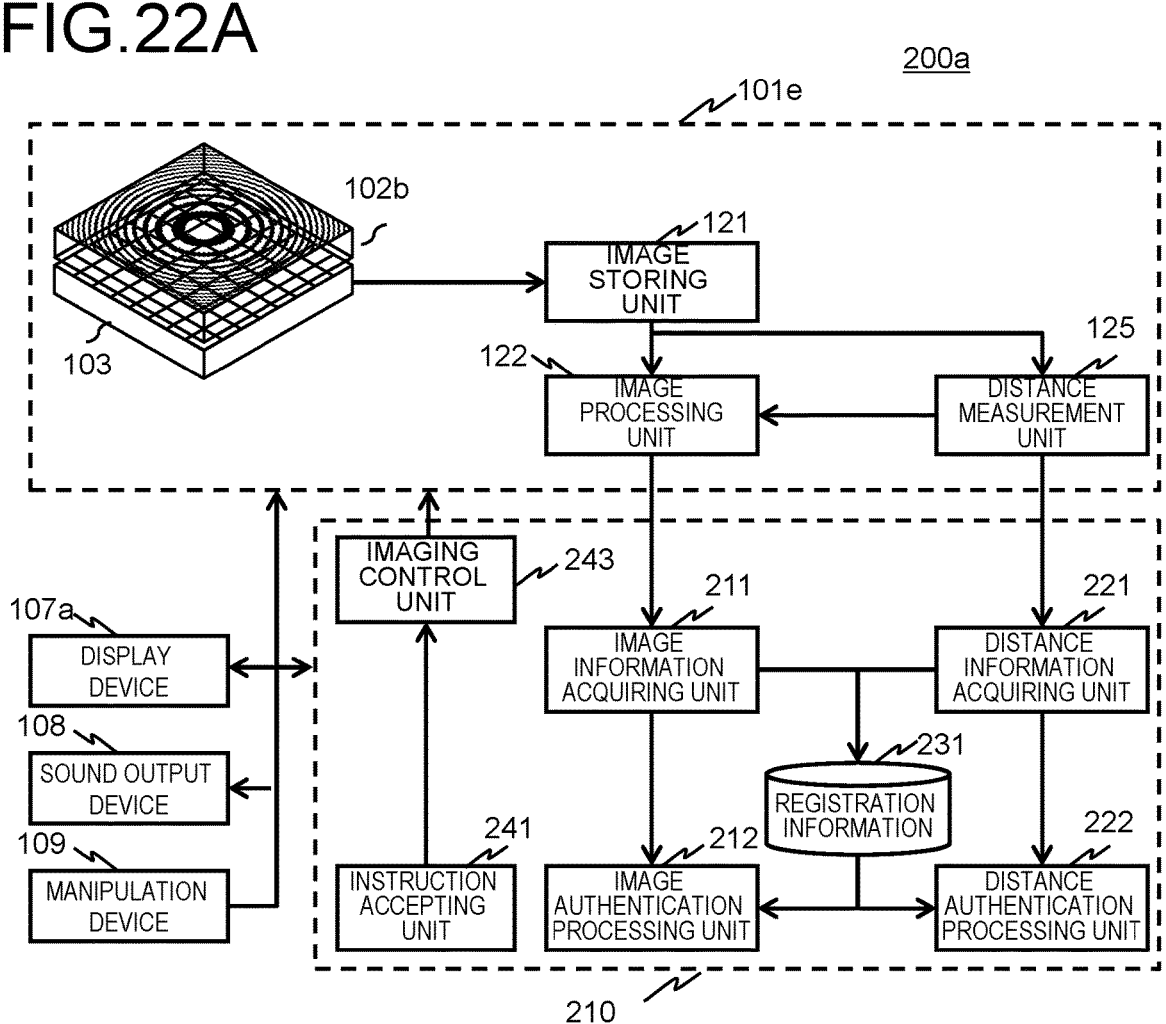
FIG. 22A is a block diagram of the three-dimensional authentication device according to the first embodiment.
Figure 22B:
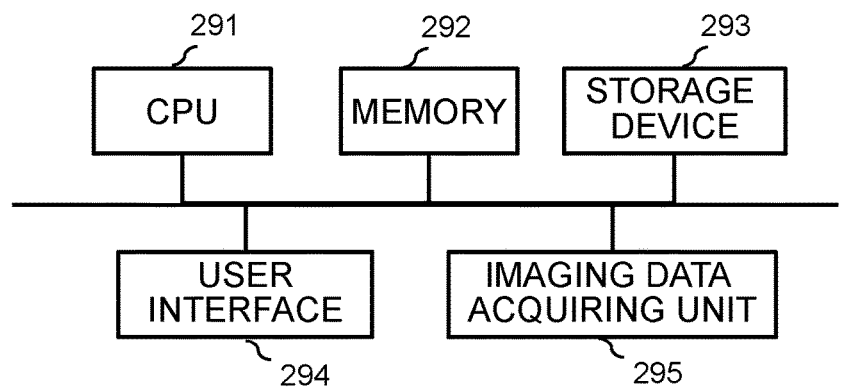
FIG. 22B is a block diagram of a hardware configuration of the three-dimensional authentication device according to the first embodiment.

The configuration of the three-dimensional authentication device 200a according to the present embodiment will be described. FIG. 22A is a block diagram of the three-dimensional authentication device 200a according to the present embodiment. As shown in the drawing, the three-dimensional authentication device 200a according to the present embodiment includes the imaging device 101e, an authentication controller 210, a display device 107a, a sound output device 108, and a manipulation device 109.

Note that the three-dimensional authentication device 200a according to the present embodiment includes, for example, a CPU 291, a memory 292, a storage device 293, a user interface 294, and an image data acquiring unit 295. The functions of the imaging device 101e and the authentication controller 210 are implemented in which the CPU 291 loads a program stored in the storage device 293 to the memory 292 and executes it.

As the user interface 294, the three-dimensional authentication device 200a is provided with the display device 107a, the sound output device 108, and the manipulation device 109, and the like. Note that the image data acquiring unit 295 includes an image sensor 103 and a modulator 102b.

The imaging device 101e is a three-dimensional image acquiring device that obtains a captured image (image data) and distance information (distance data). The imaging device 101e is a device that is capable of achieving focus on a given distance after shooting.

The imaging device 101e according to the present embodiment basically includes the same configuration as the above-described imaging device 101e. That is, the imaging device 101e is provided with the modulator 102b, the image sensor 103, an image storing unit 121, an image processing unit 122, and a distance measurement unit 125.

The modulator 102b includes a first pattern, and modulates light intensity with the first pattern. In the present embodiment, the modulator 102b uses a first grating pattern formed of a plurality of concentric circles as the first pattern.

The image sensor 103 converts a light beam transmitted through the modulator 102b into imaging data at a predetermined time interval and outputs the imaging data. In the present embodiment, the image sensor 103 converts an optical image captured in a plurality of pixels arrayed on an imaging surface in an array configuration into image signals and outputs as imaging data.

The image storing unit 121 stores the imaging data output from the image sensor 103. This is to allow for focus adjustment after shooting. Also, the imaging data can be used for calculating distance of each region. The imaging data may be used for improving image quality such as noise canceling using imaging data of a plurality of frames.

The image processing unit 122 performs a reconstruction process in which, to imaging data stored in the image storing unit 121, the image of the subject 400 is reconstructed based on the cross-correlation operation between the imaging data and a pattern data having a second pattern, and acquires a shot image (image data). As described above, in the present embodiment the image processing unit 122 uses, as the second pattern, a virtual second grating pattern formed of a plurality of concentric circles.

The distance measurement unit 125 acquires a distance (distance data) in a predetermined measurement region from the imaging device 101 to the subject 400. In the present embodiment, the distance measurement unit 125 repeats the reconstruction process to the imaging data stored in the image storing unit 121 while changing the focus distance, and sets the focus distance having the highest contrast in the measurement region as distance data (the distance value of the measurement region).

Figure 23A:
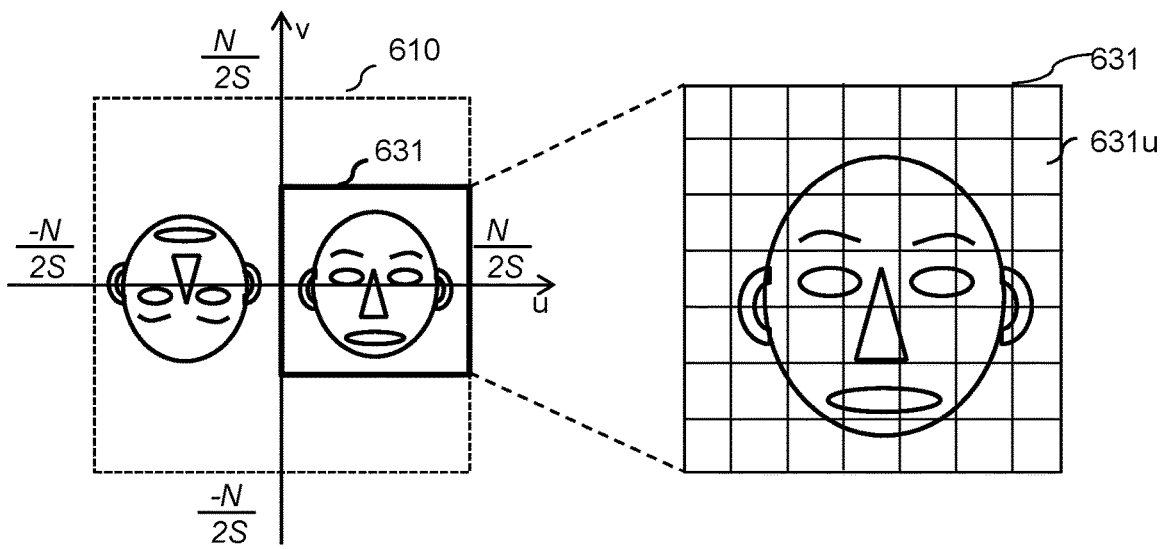
FIG. 23A is a diagram for explaining the contrast calculate region of the three-dimensional authentication device according to the first embodiment at the time of measuring distances.
Figure 23B:
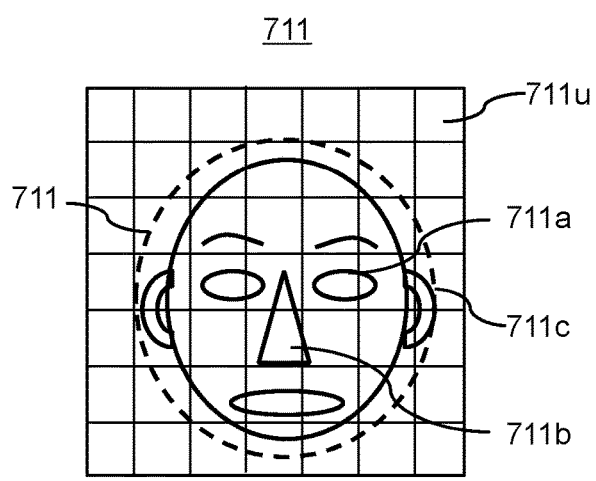
FIG. 23B is a diagram for explaining an example of a two-dimensional map created by the three-dimensional authentication device according to the first embodiment.

In the present embodiment, as shown in FIG. 23A, a predetermined region 631 in an imaging range 610 is divided into a plurality of unit regions 631u in advance. The distance measurement unit 125 sets the unit regions 631u as measurement regions, and acquires distance information for each unit region 631u. As shown in FIG. 23B, the distance measurement unit 125 creates a map 711 of the distance information for each unit region, and outputs the map 711 as distance data.

The distance measurement process performed by the distance measurement unit 125 according to the present embodiment is basically the same as the distance measurement process performed by the above-described imaging device 101e, and here, the description is omitted.

However, in the present embodiment, the imaging target is the face of a person. As described later, the distance measurement unit 125 displays a guide pattern 117 shown in FIG. 23C on the display device 107a for imaging.

Therefore, the size of the face image that is an imaging target becomes generally equivalent, and unevenness can be almost assumed. Therefore, in regard to the initial value of the focus distance set in steps S531 and S532 in the focus distance calculation process, the value can be narrowed to a certain range. Since the range of states of the unevenness of the face can be assumed within a predetermined range, the value of the shift set value Δf can also be preset. Therefore, the throughput can be reduced.

The distance measurement unit 125 outputs distance information for each region 711u (in the following, a unit region 711u) corresponding to the unit region 631u thus obtained as focus distance information to the image processing unit 122. The image processing unit 122 performs focus adjustment of the image using this information, and outputs image data that has been subjected to focus adjustment to the image information acquiring unit 211 and the image display device 107.

The configurations of the modulator 102b, the image sensor 103, the image storing unit 121, the image processing unit 122, and the distance measurement unit 125 are basically the same as the components having the same names in the imaging device 101e. Therefore, here, the detailed description is omitted.

The authentication controller 210 controls the overall operation of the three-dimensional authentication device 200a, and authenticates the subject 400 that is an authentication target imaged by the imaging device 101e using image data and distance data. In the present embodiment, in order to implement this, the authentication controller 210 is provided with the image information acquiring unit 211, an image authentication processing unit 212, a distance information acquiring unit 221, a distance authentication processing unit 222, a registration information storing unit 231, an instruction accepting unit 241, and an imaging control unit 243.

The instruction accepting unit 241 accepts an instruction from the user. In the present embodiment, the instruction accepting unit 241 accepts a registration instruction that registers verification data used at the time of user authentication. When accepting the registration instruction, the instruction accepting unit 241 notifies the imaging control unit 243 it has been accepted.

Note that at the time of accepting the registration instruction from the user, the instruction accepting unit 241 also accepts an input of identification information on the relevant user to be stored in the registration information storing unit 231 in correspondence to verification data, described later.

The instruction accepting unit 241 accepts the instruction from the user, for example, through the display device 107a having the function of a touch panel or the manipulation device 109 such as an instruction button, a ten key pad, a keyboard, and the like included in the imaging device 101e.

The imaging control unit 243 controls the imaging of the imaging device 101e. In the present embodiment, when a registration instruction is received from the instruction accepting unit 241, the imaging control unit 243 controls the imaging device 101e so as to acquire verification data (registration data). The registration data acquiring process will be described later. The imaging control unit 243 stores the acquired registration data in the registration information storing unit 231 as registration image data and registration distance data. Note that at this time, the imaging control unit 243 stores the registration data in correspondence to the identification information received through the instruction accepting unit 241.

Figure 23C:
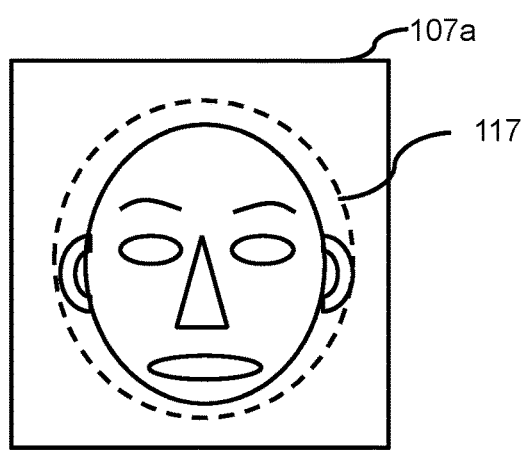
FIG. 23C is a diagram for explaining a manner of imaging a face by the three-dimensional authentication device according to the first embodiment.

The imaging control unit 243 displays the guide pattern 117 on the display device 107a, and adjusts the position of the user (standing position) at the time of imaging. As shown in FIG. 23C, the adjustment is performed such that the face of the user enters within the guide pattern displayed on the display device 107a.

Note that the guide pattern 117 guides the user who performs face authentication during image capture to keep an appropriate distance from the imaging device 101 so that the face image can be displayed in an appropriate size on the image display device 107.

The image information acquiring unit 211 and the image authentication processing unit 212 verify the authentication image (authentication image data) that is the image of the authentication target acquired at the imaging device 101e against the registered authentication image (registration image data), and output the verified result as an image authentication result. As described above, the image information acquiring unit 211 and the image authentication processing unit 212 function as the image authentication unit.

The image information acquiring unit 211 extracts a feature (referred to as authentication feature data) from image data to be output from the image processing unit 122, and creates authentication image data or registration image data.

In the present embodiment, first, the image information acquiring unit 211 extracts a face region used for face authentication from an image region defined by the image data. The face region is extracted using an image process such as a known face recognition process. Note that in the present embodiment, as described above, at the time of imaging, the image information acquiring unit 211 display the guide pattern 117, and prompts the user to stand at the position at which the face enters within the guide pattern 117. Therefore, the image information acquiring unit 211 may extract a region corresponding to the guide pattern 117 in the image region as a face region.

The image information acquiring unit 211 performs a feature value extraction process only on the range extracted as the face region. In the feature value extraction process, a known feature value extraction method is used.

That is, the image information acquiring unit 211 performs a face image analysis process on the extracted face region, and identifies principal parts constituting the features of the face. Examples of the principal parts of the face include face parts such as the eye, the nose, the mouth, the eyebrow, and the ear. Upon identifying principal parts, the image information acquiring unit 211 performs the extraction process of feature points from the principal parts, and sets the position of the feature point or two-dimensional distance information between the feature points and the like as authentication feature data.

Here, in the case of receiving the registration instruction through the instruction accepting unit 241, the image information acquiring unit 211 performs a process described later on the calculated authentication feature data, and creates registration image data. The image information acquiring unit 211 stores the registration image data in the registration information storing unit 231 in correspondence to the received identification information together with the registration instruction.

On the other hand, in the case of receiving no registration instruction, the image information acquiring unit 211 sets the calculated authentication feature data as authentication image data, and outputs the authentication image data to the image authentication processing unit 212.

Note that information on the identified face region may also be output to the distance measurement unit 125. In this case, the distance measurement unit 125 calculates distance information only on the face region. Thus, it is possible to suppress the calculation amount of the distance measurement unit 125.

The image authentication processing unit 212 performs an authentication process on the image using the authentication image data received from the image information acquiring unit 211. In the present embodiment, the image authentication processing unit 212 discriminates whether or not registration image data matching the received authentication image data is stored in the registration information storing unit 231. In the present embodiment, the image authentication processing unit 212 compares both data, and discriminates whether or not the degree of match exceeds a predetermined threshold (image authentication threshold). The threshold of the degree of match used for the discrimination is determined in advance.

As a result of discrimination, in the case where the registration image data showing the degree of match having the image authentication threshold or more is stored, the image authentication processing unit 212 outputs information indicating that verification is successful, and otherwise it outputs information indicating that verification fails, as an image authentication result.

The distance information acquiring unit 221 and the distance authentication processing unit 222 verify authentication distance information (authentication distance data) that is the distance of the authentication target acquired at the imaging device 101e against registration authentication distance information (registration distance data), and output the verified result as a distance authentication result. As described above, the distance information acquiring unit 221 and the distance authentication processing unit 222 function as a distance authentication unit.

The distance information acquiring unit 221 calculates the difference between the parts based on the distance information from the imaging device 101e to the parts of the face calculated at the distance measurement unit 125, and calculates an unevenness information of the face. The unevenness information calculated is set as authentication distance data. In the present embodiment, the distance information acquiring unit 221 defines a position (the unit region 711u) to be a reference in advance, and calculates the difference of the distance value to the relevant unit region.

For example, as shown in FIG. 23B, in the unit regions 711u in the face region, the distance information acquiring unit 221 sets a region 711c including the ear part as a reference unit region. The distance information acquiring unit 221 calculates the difference from another unit region, for example, a region 711*a* including the eye part or a region 711*b* including the tip of nose, and sets the differences as the unevenness information of the face (authentication distance data).

Note that in the above description, the region 711C including the ear part is set as the reference, but it is not limited to this. Parts such as the forehead part and the mouth part may be set as the reference.

Note that in the case of receiving the registration instruction through the instruction accepting unit 241, the distance information acquiring unit 221 applies a process described later to the authentication distance data, and creates registration distance data. The distance information acquiring unit 221 stores the registration distance data in the registration information storing unit 231 in correspondence to the received identification information together with the registration instruction.

On the other hand, in the case of receiving no registration instruction, the distance information acquiring unit 221 outputs the calculated authentication distance data to the distance authentication processing unit 222.

The distance authentication processing unit 222 performs authentication on the distance information using the authentication distance data received from the distance information acquiring unit 221. In the present embodiment, the distance authentication processing unit 222 discriminates whether or not the registration distance data matching the received authentication distance data is stored in the registration information storing unit 231. In the present embodiment, the distance authentication processing unit 222 compares both data, and discriminates whether or not the degree of match exceeds a predetermined threshold (distance authentication threshold). The threshold of the degree of match used for the discrimination is determined in advance.

As a result of determination, in the case where the registration distance data indicating the degree of match having the distance authentication threshold or more is stored, the distance authentication processing unit 222 outputs information indicating that verification is successful, and otherwise, it outputs information indicating that verification fails, as a distance authentication result.

As described above, the registration information storing unit 231 stores the registration image data and the registration distance data together with identification information on the user.

The display device 107*a* displays the image processed at the image processing unit 122. In the present embodiment, in response to the instruction from the authentication controller 210, the display device 107*a* displays the guide pattern 117.

The sound output device 108 outputs an audio message in response to the instruction from the authentication controller 210. The message to be output is stored in the storage device 293 in advance.

[Face Region Determination Process]

Next, a face region determination process in the three-dimensional authentication device 200*a* according to the present embodiment will be described. FIG. 24 is a process flow of the face region determination process according to the present embodiment. As described above, in the present embodiment, the image sensor 103 outputs imaging data to the image storing unit 121 at a predetermined time interval. The present process is started with a trigger that imaging data is output to the image storing unit 121.

The image processing unit 122 performs the image process to the imaging data output to the image storing unit 121 (Step S1101), and creates image data.

Subsequently, in order to identify the face region, the image information acquiring unit 211 performs the face image analysis process to the image data (Step S1102). First, the image information acquiring unit 211 discriminates whether or not the face image is included in the image data, i.e., there is a region that is identified as the face region (Step S1103). Here, in the case where the region that is identified as the face region is not included in the image data (S1103: No), the image information acquiring unit 211 ends the process as it is.

On the other hand, in the case where the face region is included in the image data (S1103: Yes), the image information acquiring unit 211 discriminates whether or not the relevant face region falls within the guide pattern 117 (Step S1104).

In the case where the relevant face region falls within the guide pattern 117 (S1104: Yes), in Step S1104, the image information acquiring unit 211 determines the identified face region as a face region (Step S1105). The image information acquiring unit 211 outputs information that identifies the determined face region to the distance measurement unit 125 (Step S1106), and ends the process.

On the other hand, in Step S1104, in the case where the relevant face region does not fall within the guide pattern 117 (No), the imaging control unit 243 outputs a message (Step S1107), and again waits for imaging data. Note that at this time, the message to be output includes, for example, an instruction that changes the standing position such that the face falls within the guide pattern.

According to the present process, the three-dimensional authentication device 200*a* can perform the process using imaging data acquired in the state where the face falls within the guide pattern 117, and the accuracy of authentication can be improved.

[Registration Process for Registration Data]

Figure 25:
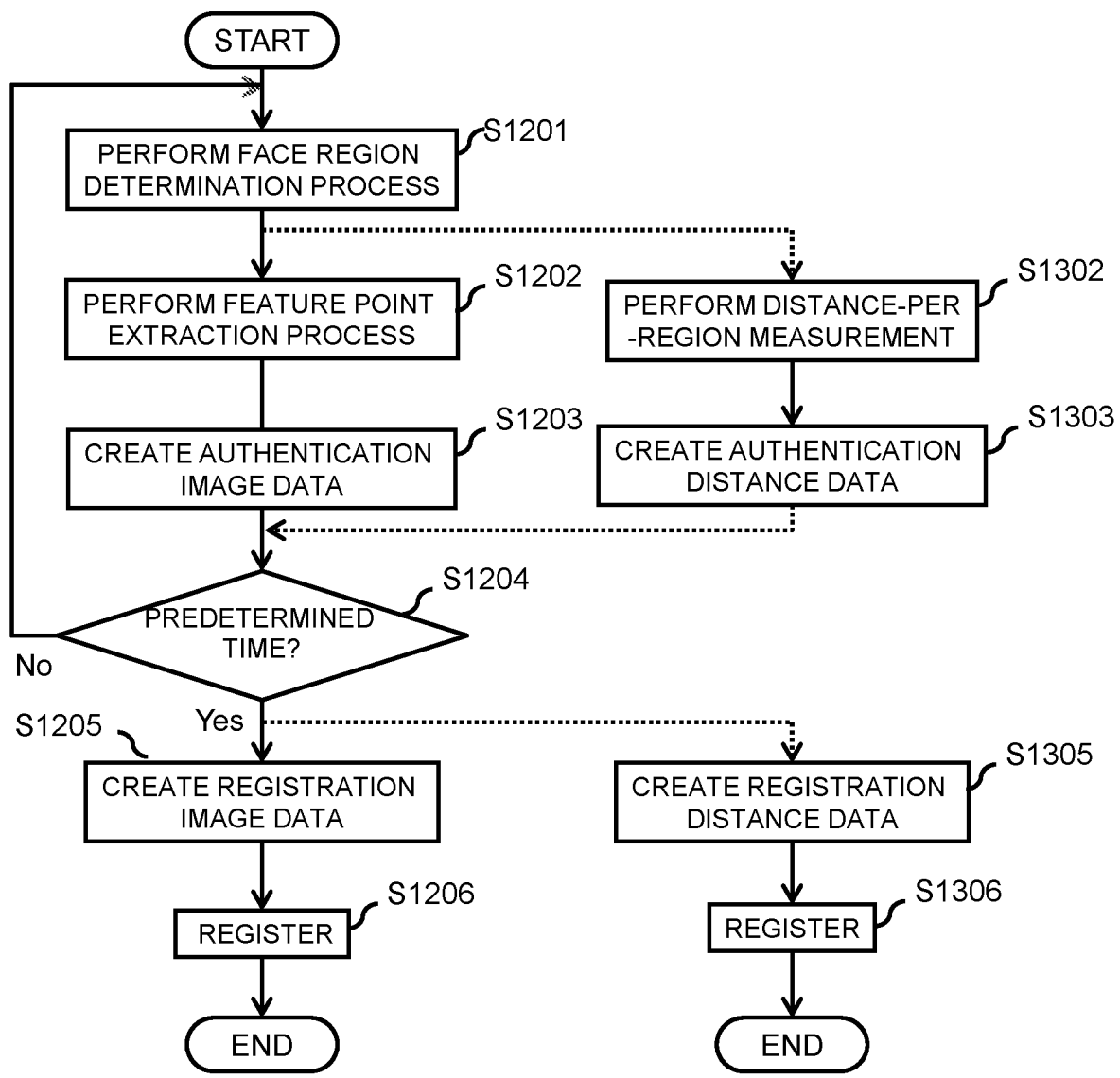
FIG. 25 is a flowchart of a registration process for registration data according to the first embodiment.

Next, a registration process for image data and distance data by the image information acquiring unit 211 and the distance information acquiring unit 221 of the imaging device 101 according to the present embodiment will be described. FIG. 25 is a process flow of the present registration process. In the present embodiment, in the case of accepting a registration instruction through the instruction accepting unit 203, the present process is performed, and registration image data and registration distance data are registered. The present process is started after the registration instruction is accepted through the instruction accepting unit 203.

Note that in the present embodiment, after the face region is determined, the registration image data acquiring process and the registration distance data acquiring process are performed in parallel to the imaging data that determines the face region.

First, the above-described three-dimensional authentication device 200*a* performs the face region determination process (Step S1201).

After that, the image information acquiring unit 211 performs the feature point extraction process (Step S1202), and performs the authentication image data creation process in which the extracted feature point is set as authentication image data (Step S1203).

On the other hand, the distance measurement unit 125 receiving the notification of the face region calculates distance data for each unit region 711*u* included in the face region (Step S1302). The distance information acquiring unit 221 creates authentication distance data from the distance data (Step S1303).

The three-dimensional authentication device 200 repeats the above processes at a predetermined number of times (Step S1204).

The image information acquiring unit 211 creates registration image data from the repeated number of authentication image data (Step S1205), and registers the registration image data in the registration information storing unit 231 in correspondence to the inputted identification information (Step S1206).

The distance information acquiring unit 221 creates registration distance data from the repeated number of authentication distance data (Step S1305), and registers the registration distance data in the registration information storing unit 231 in correspondence to the inputted identification information (Step S1306). Then, the distance information acquiring unit 221 ends the process.

Note that the registration data (registration image data and registration distance data) is created by subjecting a plurality of acquired authentication data (authentication image data and authentication distance data) to a predetermined statistical process. The statistical process is, for example, a mean value process and calculation of determining a variation range to calculate the tolerance of variation due to measurement errors.

As described above, in order to reduce the influence of variation at the time of imaging or errors, a plurality of authentication data are acquired and subjected to the statistical process to them to create registration data. It is assumed that the conditions at the time of imaging, for example, the conditions including the ambient luminosity, the distance to the imaging device 101*e*, the orientation or the slope of the face to the imaging device 101*e* vary for each imaging. Therefore, the number of times of processing (the number of times of repeats) in Step S1204 is preset in consideration of recognition accuracy, recognition errors, and the like. Note that the number of times of processing may be configured so as to be capable of appropriately increasing or decreasing with the tradeoff of authentication accuracy.

[Face Authentication Process]

Figure 26A:
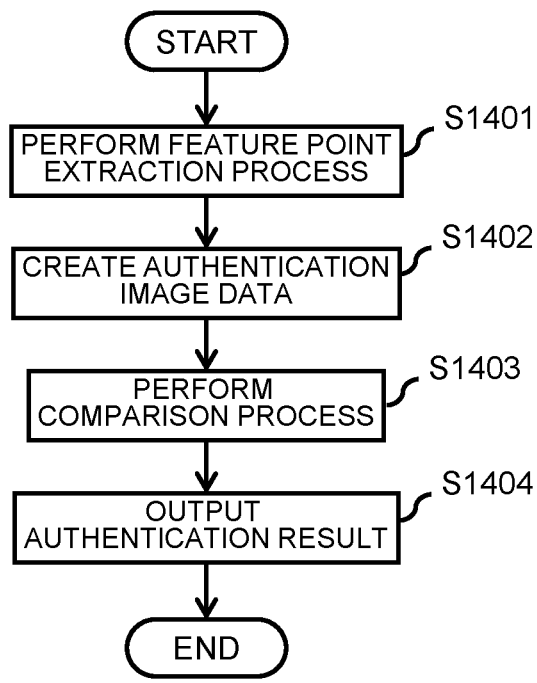
FIGS. 26A and 26B are flowcharts of a face authentication process according to the first embodiment.
Figure 26B:
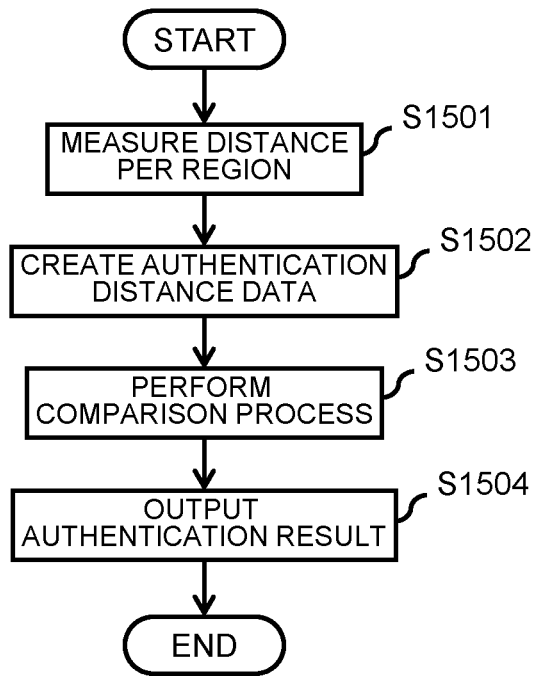

Next, a flow of the face authentication process by the three-dimensional authentication device 200*a* according to the present embodiment will be described. The present process is started at the time of determining the face region by the face region determination process. FIG. 26A is a process flow of the face authentication process by the image according to the present embodiment. FIG. 26B is a process flow of the face authentication process by the distance.

First, a flow of the face authentication process by the image will be described.

The image information acquiring unit 211 performs the feature point extraction process to the face region of the determined imaging data (Step S1401). The image information acquiring unit 211 then performs the authentication image data creation process in which the extracted feature point is used as authentication image data (authentication image) (Step S1402).

Subsequently, the image authentication processing unit 212 compares the created authentication image data with the registration image data stored in the registration information storing unit 231 for verification (Step S1403). The compared result is output as an image authentication result (Step S1404), and ends the process. Here, the image authentication processing unit 212 compares the authentication image data with the registration image data, and determines that the authentication is successful, in the case where the registration image data showing the degree of match having the image authentication threshold or more is stored. On the other hand, the image authentication processing unit 212 determines that the authentication is unsuccessful, in the case where the degree of match with all the stored registration image data is less than the image authentication threshold.

Next, a flow of the face authentication process by the distance will be described.

The distance measurement unit 125 having received the notification of the face region calculates distance data on each unit region included in the face region of the imaging data that has determined the face region (Step S1501). The distance information acquiring unit 221 creates authentication distance data from the distance data (Step S1502).

The distance authentication processing unit 222 compares the created authentication distance data with the registration distance data stored in the registration information storing unit 231 for verification (Step S1503). The distance authentication processing unit 222 outputs the compared result as a distance authentication result (Step S1504), and ends the process. Here, the distance authentication processing unit 222 compares the authentication distance data with the registration distance data, and determines that the authentication is successful, in the case where the registration distance data indicating the degree of match having the distance authentication threshold or more is stored. On the other hand, the distance authentication processing unit 222 determines that the authentication is unsuccessful, in the case where all the degree of match with the stored registration distance data is less than the distance authentication threshold.

The image authentication threshold and the distance authentication threshold used at the time of performing the comparison process are determined such that data indicating the degree of match within a predetermined value is discriminated as the same person. The determination is made such that the influence of variation due to measurement errors, the imaging conditions at the time of imaging, or the like is excluded based on an environment and the like in which the three-dimensional authentication device 200*a* is placed.

The image authentication threshold and the distance authentication threshold may be the same or may have different values. This is similar in another embodiment and modifications below.

The output destination of the authentication result is, for example, the access management server 910 that controls the opening and closing of the access gate 920. The access management server 910 receives the image authentication result and the distance authentication result, and unlocks the access gate 920 corresponding to the success or failure in authentication. For example, in the case where both of the image authentication result and the distance authentication result are successful, the access management server 910 unlocks the access gate 920, and otherwise it does not unlock the access gate 920.

Note that the authentication result may be output to the display device 107*a*. At this time, as the authentication result, the degree of match may be output to the display device 107*a*.

Note that in the process flow according to the present embodiment, the processes performed by the functions may be performed with another function. The process flow may be performed with any component as long as the configuration is achieved as a flow of the overall processes.

The registration image data and the registration distance data are described are stored in the registration information storing unit 231 included in the three-dimensional authentication device 200a, but it is not limited to this. As long as enough safety can be secured so as not to give easy access from the outside, the registration image data and the registration distance data may be externally retained in a device other than the three-dimensional authentication device 200a. For example, these data may be retained on a on a network. In this case, the three-dimensional authentication device 200a includes a function of transmitting and receiving data with an external device or a communication function.

As described above, the three-dimensional authentication device 200a according to the present embodiment includes the imaging device 101e that images the authentication target as the subject 400 and the authentication controller 210 that authenticates the authentication target imaged by the imaging device 101e. The imaging device 101e includes the modulator 102b including a first pattern, the modulator 102b modulating light intensity using the relevant first pattern, the image sensor 103 that converts a light beam transmitted through the modulator 102b into imaging data and outputs the imaging data, the image processing unit 122 that performs the reconstruction process to the imaging data in which the image of the subject 400 is reconstructed based on the cross-correlation operation between the imaging data and the pattern data having the second pattern for acquiring an image, and the distance measurement unit 125 that acquires a distance from the relevant imaging device 101e to the subject 400 in a predetermined measurement region. The distance measurement unit 125 repeats the reconstruction process to the imaging data while changing the focus distance is repeated, and sets the focus distance having the highest contrast in the measurement region as a distance. The authentication controller 210 includes the registration information storing unit 231 that stores the registration image data, which is the image of the authentication target acquired in advance, and registration distance data, which is the distance information of the authentication target acquired in advance, the image authentication unit that verifies the authentication image data, which is the image of the authentication target acquired by the imaging device 101e, against registration image data and sets a verified result as an image authentication result, and the distance authentication unit that verifies authentication distance data, which is the distance of the authentication target acquired by the imaging device 101e against registration distance data and sets a verified result as a distance authentication result.

As described above, according to the three-dimensional authentication device 200a of the present embodiment, the imaging device with no use of an optical lens for authentication is used. Therefore, it is possible to implement a small-sized, low-profile authentication device. The imaging data acquired by the imaging device is processed, image data and distance data in the same shooting area are simultaneously obtained, and authentication by the image and authentication by the distance are performed in parallel using these data. Therefore, it is possible to implement authentication of much higher accuracy. That is, according to the present embodiment, it is possible to provide highly accurate personal authentication technology using a small-sized and low-profile device.

Moreover, in the present embodiment, the distance information is acquired for each predetermined two-dimensional unit region. Using this distance data, authentication by the distance is performed. Specifically, when the three-dimensional authentication device 200a of the present embodiment is used for face authentication in which authentication is performed with the face of a person, it is possible to perform distance authentication using distance information including the unevenness information of the face in addition to face image authentication by the two-dimensional image. Thus, three-dimensional authentication is made possible, and the improvement of authentication accuracy can be expected.

Note that in the present embodiment, the description is made with an example in which the three-dimensional authentication device 200a is used for access management, but it is not limited to this. In order to improve security, the three-dimensional authentication device 200a according to the present embodiment is usable for data management of a PC, a server, or an information device, for authentication for operation management of various devices and apparatuses, for example.

It is unnecessary to the configurations of the three-dimensional authentication device 200a shown in FIG. 22A with one device. For example, a device directly available for the user includes the configurations such as the image sensor 103, the modulator 102b, and the image storing unit 121 of the imaging device 101, and the other configurations may be included in a device such as a PC or a server present at another place. In this case, the registration information storing unit 231 is provided on a device such as a PC or a server present at another place.

Modification 1

In the foregoing embodiment, the description is made with an example in which the face authentication process is performed when the face image that is the subject 400 falls within the guide pattern 117, but it is not limited to this. A configuration may be provided in which the instruction accepting unit 241 receives an instruction to perform the authentication process from the user and the process is started as the instruction is a trigger.

In this case, the distance measurement unit 125 divides all the region of the imaging data or a predetermined region 631 determined beforehand into the unit region 631u without waiting for the determination of the face region, and calculates the distances of the unit regions 631u. Note that imaging data to be used is imaging data that is a base of the captured image that is a process target by the image information acquiring unit 211.

Note that also in the present modification, the face region determination process may be executed after accepting the instruction from the user or before performing the face authentication process.

Modification 2

In the foregoing embodiment, after the face region is determined, the distance measurement unit 125 calculates distance data on the unit regions 631u including the face region. However, the calculation range of distance data is not limited to this.

Figure 27A:
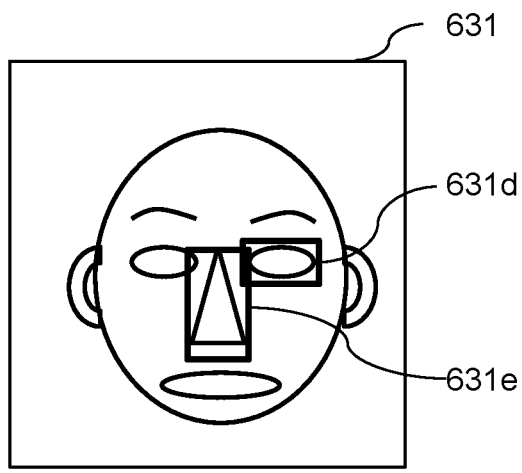
FIGS. 27A and 27B are diagrams for explaining an authentication target according to a modification of the first embodiment.

In the embodiment, as additional authentication for face authentication by the two-dimensional image, distance information is used. Since the authentication target is the face, distance information on the principal parts such as the eye, the nose, and the mouth, which are predetermined is enough as authentication information. Therefore, a configuration may be provided in which for example, as shown in FIG. 27A, the principal part is set as the specified region in advance, and the distance measurement unit 125 calculates distance data only on the specified region.

In the example in the drawing, the distance is calculated in a region 631d including the eye and a region 631e including the nose by the method described using the imaging device 101d.

In these regions 631d and 631e, first, the image information acquiring unit 211 identifies regions on the image corresponding to the regions 631d and 631e. As described above, identification is made by performing the face recognition process on the two-dimensional image acquired by the image processing unit 122. The distance measurement unit 125 identifies the corresponding region of the memory, i.e., the pixel 103a of the image memory as the regions 631d and 631e.

With such a configuration, it is possible to suppress the region in which distance information is calculated, and in consequence, it is possible to suppress the amount of operation. That is, according to the present modification, it is possible to implement three-dimensional authentication with a small load.

Modification 3

Figure 27B:
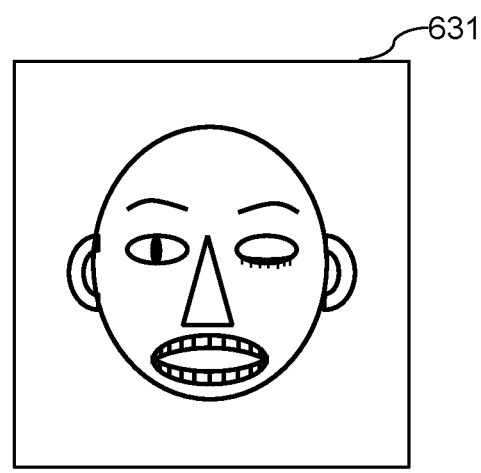

Note that in order to further improve security, two-dimensional information and distance information such as one eyelid, the throat, and the back of the teeth of the user may also be acquired for authentication. FIG. 27B shows an example of a face image this case.

In this appearance, in addition to the unevenness information of the face in normal expressions, information on more complex shapes such as one eyelid, two eyelids, and the mouth is captured as authentication information, and thus it is possible to avoid invalid authentication due to disguise using a form like a death mask.

Note that in the example in FIG. 27B, a manner of acquiring information of the one eye with closed or inside the mouth, but it is not limited to this. The distance between two eyes and the distance to the eyelid, for example, are also usable.

Upon performing face authentication with the expressions in the normal state and receiving the notification of authentication successful from the image authentication processing unit 212, the sound output device 108 outputs a predetermined audio message at a predetermined time interval.

The audio message to be output is a speech instruction saying that, for example, "please close one eye" or "please open the mouth wide". These data are stored in the storage device 293 in advance. The sound output device 108 prompts the user to be in the state of a desired face using these speech instructions.

Note that in this case, three-dimensional information on the image and the distance before changed and three-dimensional information after changed may be registered in the registration information storing unit 231, and the three-dimensional information may be verified at the time of authentication. That is, the image information acquiring unit 211, the image authentication processing unit 212, the distance information acquiring unit 221, and the distance authentication processing unit 222 perform the above-described face authentication process after the audio message is output, or after a lapse of a predetermined time period.

The expressions after changed may not be registered as registration information. For example, the image information acquiring unit 211, the image authentication processing unit 212, the distance information acquiring unit 221, and the distance authentication processing unit 222 only have to discriminate whether or not the region, which is a target to be changed, is changed.

That is, in this case, in the case of detecting that the relevant region is changed in response to the speech instruction, the image authentication processing unit 212 and the distance authentication processing unit 222 determine that authentication is successful. On the other hand, in the case where the relevant region is not changed after the speech instruction is received, i.e., in the case of determining that the user fails to give expressions of the face as instructed, the image authentication processing unit 212 and the distance authentication processing unit 222 determine that authentication is unsuccessful.

With this configuration, it is possible to suppress an increase in the information volume to be stored, and it is possible to prevent impersonation. It is possible to reduce the amount of operation at the time of the authentication process.

All the speech instructions to instruct a change in the expressions registered in the storage device 293 do not have to be performed. For example, the number of times of upper limits is determined, and the speech instruction is performed until a change in the expressions can be detected. A configuration may be provided in which in the case where no change is detected in the expressions up to the number of times of upper limits, authentication fails, i.e., it is determined as a disguise.

Note that the instruction to change the expressions of the face is not limited to the speech instruction. For example, the image display device 107 is further caused to display the instruction as a message.

Modification 4

Note that in the foregoing embodiment, authentication by the image is separately and independently performed with authentication by the distance, but it is not limited to this. For example, a configuration may be provided in which notification that authentication is successful is not output as long as both of authentication by the image and authentication by the distance information are successful.

Figure 28:
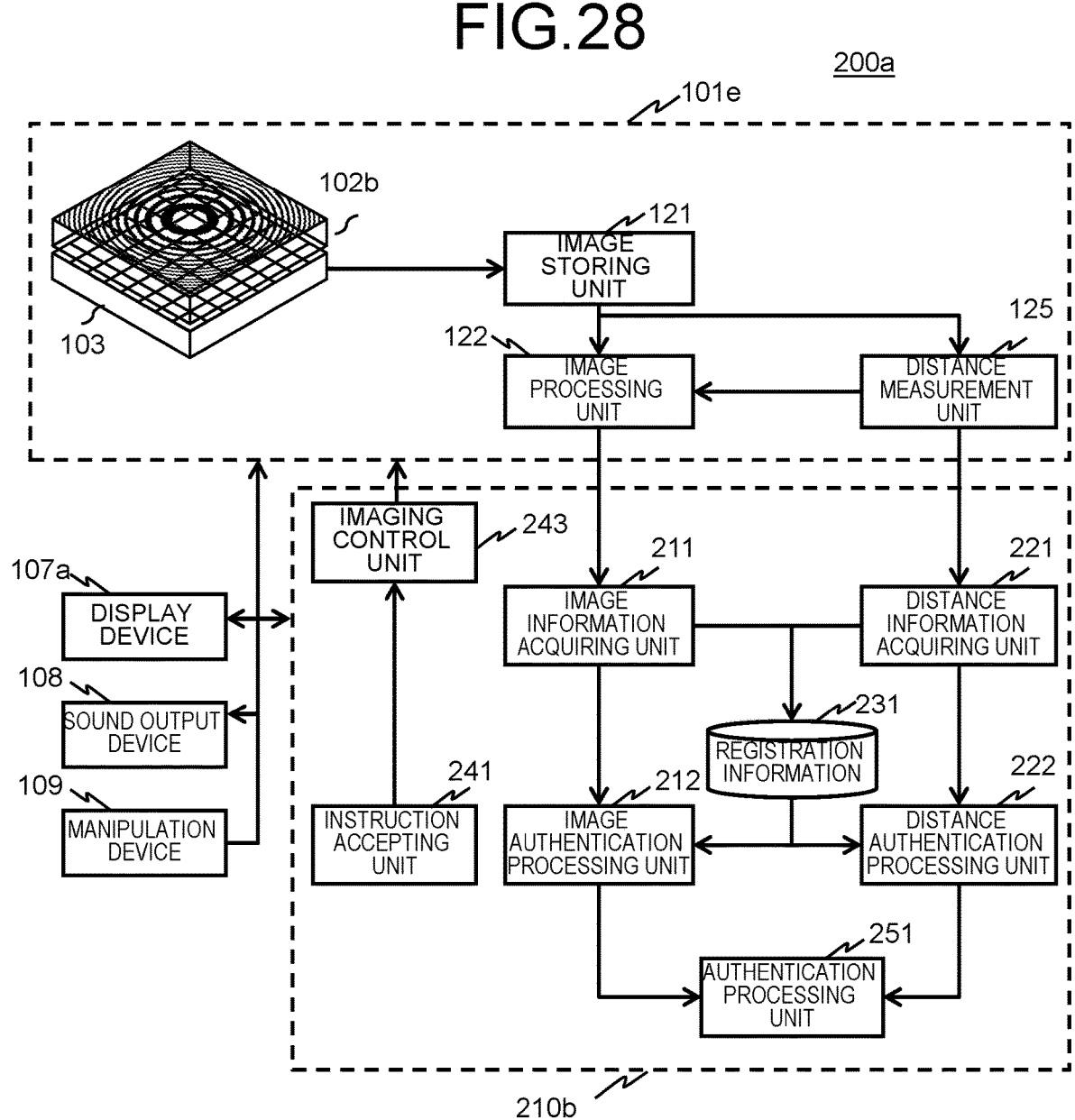
FIG. 28 is a block diagram of a three-dimensional authentication device according to the modification of the first embodiment.

In this case, as shown in FIG. 28, a three-dimensional authentication device 200a further includes an authentication processing unit 251. The authentication processing unit 251 finally performs authentication (three-dimensional authentication) based on the authentication results of the image authentication processing unit 212 and the distance authentication processing unit 222.

For example, the authentication processing unit 251 discriminates that authentication is successful only in the case where the image authentication processing unit 212 discriminates that authentication is successful and the distance authentication processing unit 222 discriminates authentication is successful. On the other hand, in the case where at least one of them discriminates that authentication is unsuccessful, it is discriminated that authentication is unsuccessful.

Figure 29:
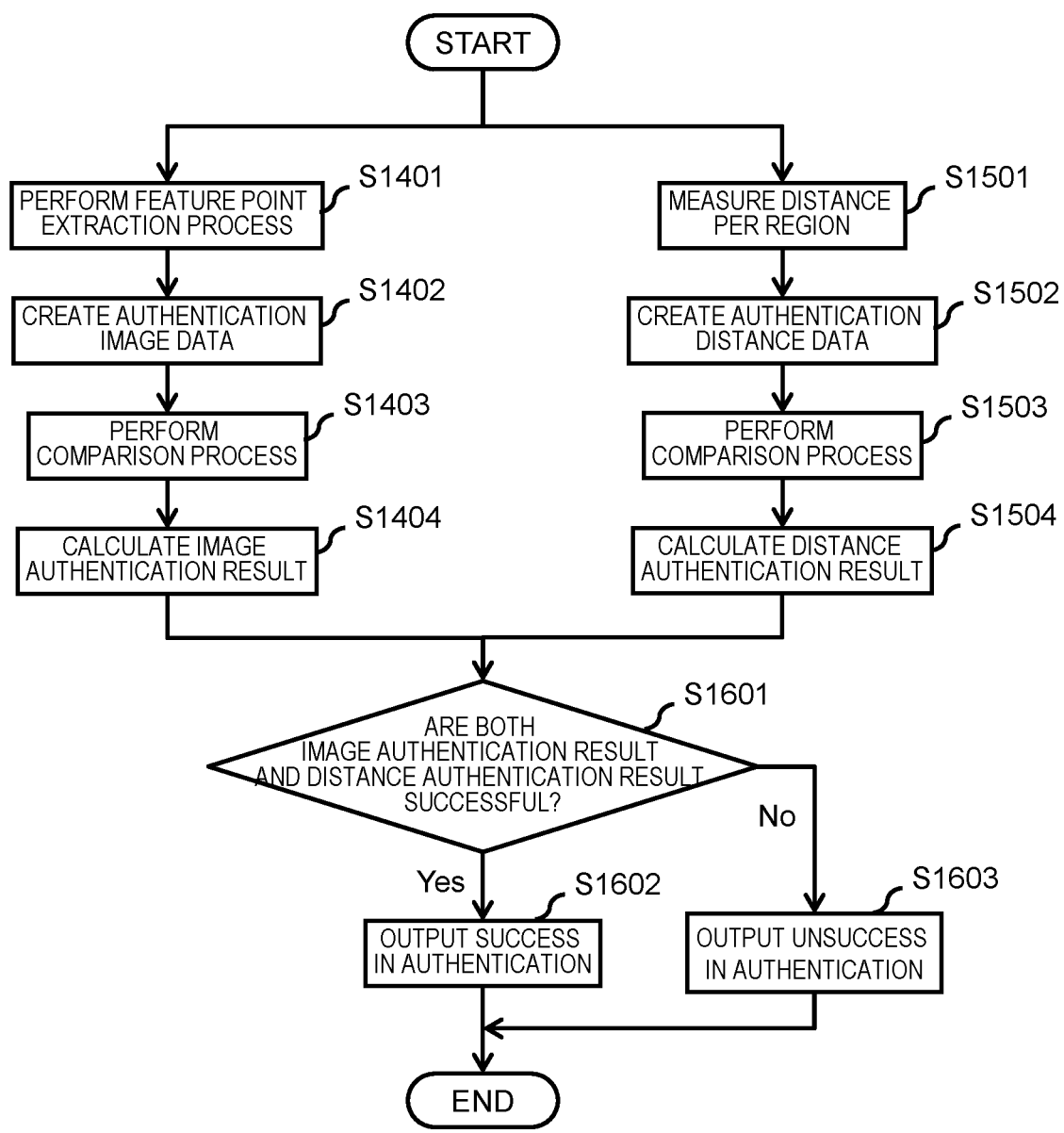
FIG. 29 is a flowchart of a face authentication process according to the modification of the first embodiment.

FIG. 29 shows a flow of the face authentication process in this case. Also in this case, the description is made that the process is started with a trigger that the face region is determined by the face region determination process.

Upon determining the face region, similar to the description above, the image information acquiring unit 211 and the image authentication processing unit 212 perform the feature point extraction process (Step S1401), the authentication image data creation process (Step S1402), and the comparison process (Step S1403), and calculate the image authentication result (Step S1404).

Similar to the description above, the distance information acquiring unit 221 and the distance authentication processing unit 222 perform the distance-per-region measurement process (Step S1501), the authentication distance data creation process (Step S1502), and the comparison process (Step S1503), and calculate the distance authentication result (Step S1504).

The authentication processing unit 251 receives the image authentication result and the distance authentication result, and performs three-dimensional authentication that discriminates whether or not both authentication results are successful (Step S1601). In the case where both authentication results are successful (S1601: Yes), the authentication processing unit 251 outputs a notification that authentication is successful as a three-dimensional authentication result (Step S1602), otherwise, it outputs a notification that authentication is unsuccessful (Step S1603), and ends the process.

As described above according to the present modification, for example, in the case of face authentication, both in authentication based on two-dimensional information by the face image and authentication using three-dimensional information adding information in other dimensions such as the unevenness information of the face by distance information, authentication is determined as successful only in the case where both authentication results are successful. Therefore, it is possible to improve the accuracy of an output itself of the success or failure in authentication from the three-dimensional authentication device 200a. Further, it is unnecessary to provide new hardware. Therefore, according to the present modification, it is possible to perform authentication of high accuracy with a simple configuration.

Modification 5

Moreover, in the foregoing embodiment, the success or failure in authentication is discriminated whether or not there is registration data whose degree of match is a predetermined threshold or more as a comparison result, but it is not limited to this.

For example, in the case where there is registration image data whose degree of match is the image authentication threshold or more, the image authentication processing unit 212 outputs identification information of registration image data with the highest degree of match to the authentication processing unit 251.

In the case where there is registration distance data whose degree of match is the distance authentication threshold or more, i.e., in the case where authentication is successful, the distance authentication processing unit 222 outputs identification information on the registration distance data at the highest degree of match to the authentication processing unit 251.

In the case where the identification information received from the image authentication processing unit 212 matches identification information received from the distance authentication processing unit 222, the authentication processing unit 251 determines that authentication is successful. On the other hand, even though authentication is successful in both units, in the case where identification information does not match, the authentication processing unit 251 determines that authentication is unsuccessful.

FIG. 30 shows a process flow in this case. Up to the comparison process by the image authentication processing unit 212 and the distance authentication processing unit 222 (S1403 and S1503), the process of the Modification 5 is similar to the processes in the embodiment above.

After that, the image authentication processing unit 212 discriminates whether or not there is registration image data showing the degree of match having the image authentication threshold or more (Step S1701). In the case where there is no data indicating the degree of match having the image authentication threshold or more (S1701: No), the image authentication processing unit 212 discriminates that authentication is unsuccessful, outputs an unsuccessful notification (Step S1702), and ends the process.

On the other hand, in the case where there is data indicating the degree of match having the image authentication threshold or more (S1701: Yes), the image authentication processing unit 212 identifies identification information (ID) stored in correspondence to registration image data with the highest degree of match (highest match degree) as an image ID (Step S1703), and outputs the image ID to the authentication processing unit 251.

Similarly, the distance authentication processing unit 222 discriminates whether or not there is registration distance data indicating the degree of match having the distance authentication threshold or more (Step S1704). In the case where there is no data indicating the degree of match having the distance authentication threshold or more (S1704: No), the distance authentication processing unit 222 discriminates that authentication is unsuccessful, outputs an unsuccessful notification (Step S1702), and ends the process.

On the other hand, in the case where there is data indicating the degree of match having the distance authentication threshold or more (S1704: Yes), the distance authentication processing unit 222 identifies identification information (ID) stored in correspondence to registration distance data at the highest degree of match (highest match degree) as the distance ID (Step S1705), and outputs the identification information to the authentication processing unit 251.

The authentication processing unit 251 compares the received image ID with the distance ID, and discriminates whether or not they match (Step S1706). In the case where they match, the authentication processing unit 251 discriminates that authentication is successful, outputs a successful notification (Step S1707), and ends the process. In the case where they do not match, the authentication processing unit 251 moves to the process of Step S1702.

According to this modification, the authentication processing unit 251 identifies the identification information of the registration information with the highest degree of match in each of authentication by the image and authentication by the distance, and discriminates whether or not those identification information match. Therefore, authentication accuracy is further improved.

Note that in the present modification, the configuration is provided in which the identification information with the highest degree of match is output to the authentication processing unit 251 one from each of the image authentication processing unit 212 and the distance authentication processing unit 222, but identification information to be output from each is not limited to one.

For example, N pieces and M pieces of identification information (N and M are integers of two or more) from the image authentication processing unit 212 and the distance authentication processing unit 222, respectively, may be extracted at a descending order of the degree of match. The authentication processing unit 251 may compare N pieces of the received identification information with M pieces of identification information, and if any of them match, it may discriminate that authentication is successful.

N and M are predetermined corresponding to the accuracy of the image authentication and the distance authentication. Thus, it is possible to improve the tolerance of authentication.

Second Embodiment

A second embodiment of the present invention will be described. In the foregoing embodiment, the authentication target is considered to be the face of the user. On the other hand, in the present embodiment, the authentication target is, for example, the vein and the like in the inside of the living body, although the target is the same living body. In the following, the present embodiment will be described, taking an example in which authentication is performed with the finger vein.

Figure 31A:
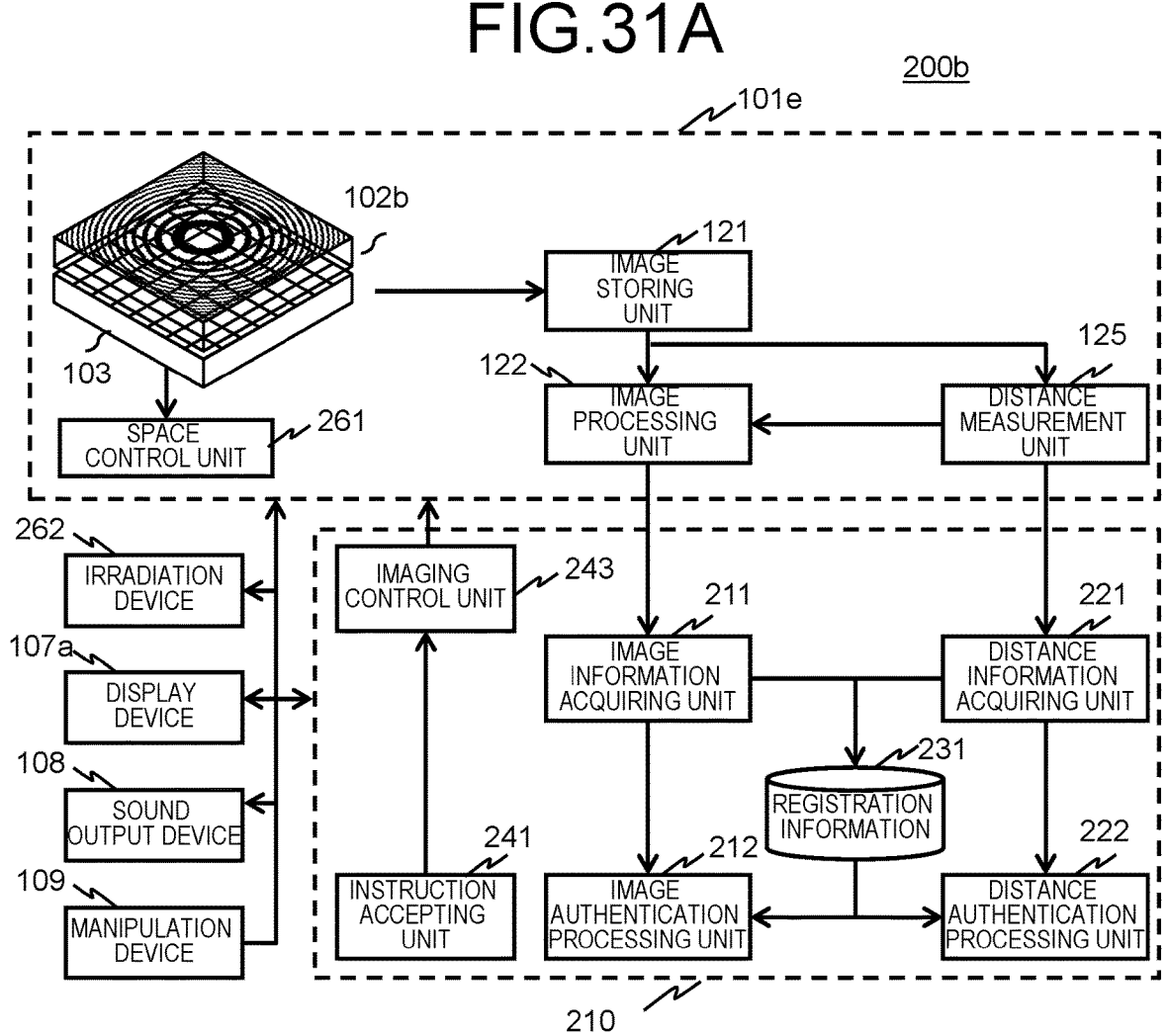
FIG. 31A is a block diagram of a three-dimensional authentication device according to a second embodiment.

FIG. 31A shows a three-dimensional authentication device 200b according to the present embodiment. The three-dimensional authentication device 200b according to the present embodiment basically has the same configuration as the first embodiment. The three-dimensional authentication device 200b according to the present embodiment further includes a space control unit 261 and an irradiation device 262.

In the present embodiment, the distance between an image sensor 103 and a modulator 102b is variable. As expressed by the above-described formula (13), the distance between an image sensor 103 and a modulator 102b corresponding to the length of a support member 112b is changed, and the angle of view is changed. Focus adjustment accuracy by postprocessing at the time of imaging an object in a short-distant range from the image sensor 103 is improved.

Figure 31B:
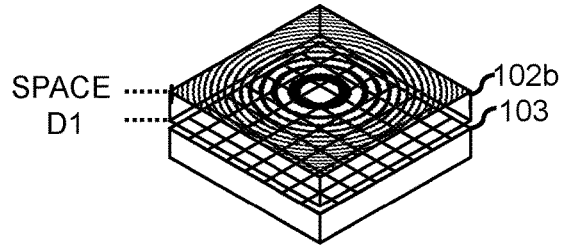
FIG. 31B and FIG. 31C are diagrams for explaining a use method in the case where the three-dimensional authentication device according to the second embodiment is used for vein authentication.
Figure 31C:
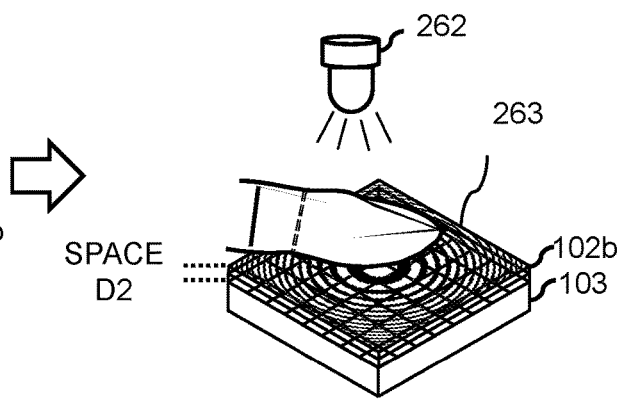

FIG. 31B and FIG. 31C show examples in the case where vein authentication is performed. At the time of normal imaging, as shown in FIG. 31B, a spacing D between the image sensor 103 and the modulator 102b is arranged to be D1. On the other hand, in the case where vein authentication is executed, as shown in FIG. 31B, the spacing between the image sensor 103 and the modulator 102b is arranged to be D2. Note that D1>D2.

The space control unit 261 controls the spacing between the image sensor 103 and the modulator 102b. For example, the spacing is controlled by an instruction from a user. Note that the space control unit 261 may be a support member 112b disposed between the image sensor 103 and the modulator 102b. That is, it may be that this support member 112b is formed of an elastic body, the user presses down the modulator 102b at the time of authentication, and thus the spacing is changed. The space control unit 261 may be configured to detect a spacing after changed, and to output the spacing to an imaging control unit 243.

Note that the imaging device 101e according to the present embodiment may include a detection sensor 263 detecting that the user places, for example, the finger and the like for authentication. The detection sensor 263 may be provided on the modulator 102b or may be included on, for example, the support member 112b disposed between the modulator 102b and the image sensor 103.

The irradiation device 262 is an irradiation device that transmissively images a vein pattern. The irradiation device 262 is placed across the finger to be authenticated, in a position opposite the modulator 102b. For example, near infrared LEDs and the like are used for the irradiation device 262.

The three-dimensional authentication device 200b may be used for both a target to be authenticated in close proximity to the modulator 102b, such as the vein, and a target to be authenticated at a distance, such as the face. That is, the three-dimensional authentication device 200b may include two authentication modes, a face authentication mode and a vein authentication mode. In this case, the spacing between the image sensor 103 and the modulator 102b may be changed by pressing down the modulator 102b part with the finger, as described above, or the spacing may be changed mechanically or electrically at the time of switching the mode.

Note that in the case where the three-dimensional authentication device 200b is dedicated for, for example, authentication with the vein, the spacing D between the modulator 102b and the image sensor 103 may be fixed to D2 optimum for the object in a short-distant range. In this case, the space control unit 261 does not have to be provided.

When the detection sensor 263 detects the finger of the user placed on the modulator 102b, the imaging control unit 243 according to the present embodiment first causes the irradiation device 262 to be irradiated. Then, the imaging control unit 243 causes the image processing unit 122 to perform the image process.

Figure 32:
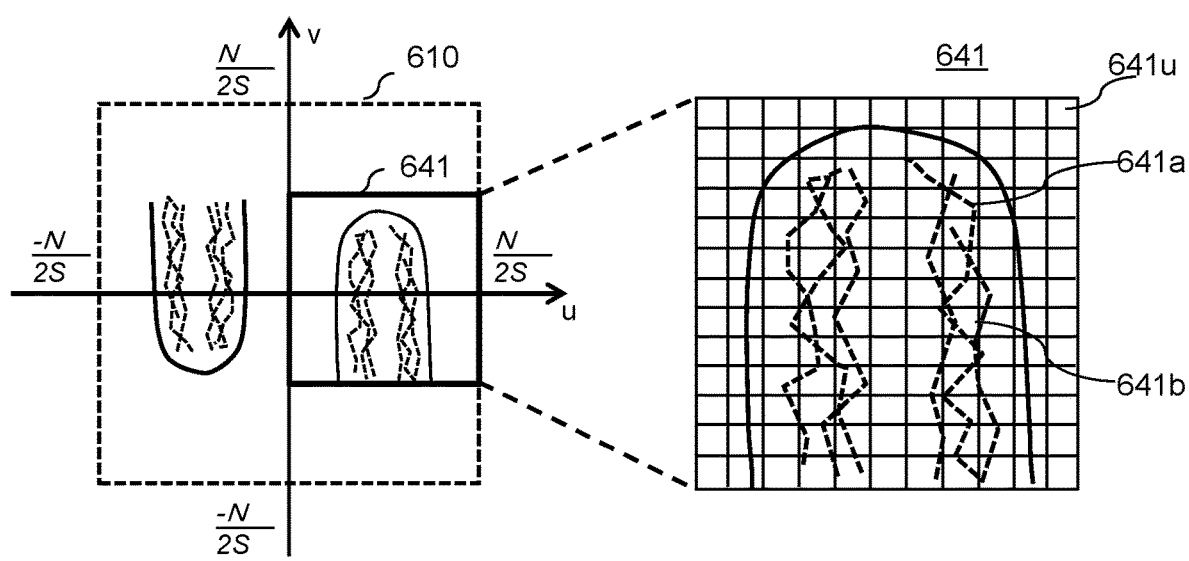
FIG. 32 is a diagram for explaining the contrast calculate region of the imaging device of the three-dimensional authentication device according to the second embodiment.

As shown in FIG. 32, the image processing unit 122 cuts out a region 641 corresponding to the contour of the finger and the vein in the finger depicted by the broken lines from the image obtained with irradiation by the irradiation device 262 to create a vein image, and output it.

The distance measurement unit 125 performs focus adjustment and distance measurement to obtain distance information. As shown in FIG. 32, the distance measurement is carried out for each unit region 641u, where the unit region 641u is finely divided into predetermined meshes. For each unit region 641u, distance data is obtained.

Similar to the first embodiment, the distance information acquiring unit 221 according to the present embodiment calculates the difference between the distance data of each unit region 741u and the distance data of the reference unit region and creates authentication distance data of unevenness information.

Moreover, the distance information acquiring unit 221 according to the present embodiment identifies the properties of the intersecting region in the vein image by analyzing distance data for each unit region. specifically, the distance information acquiring unit 221 discriminates whether an overlap of blood vessels on the image is due to branching of the blood vessels or due to three-dimensionally overlapping of independent blood vessels. The distance information acquiring unit 221 outputs discrimination result together with information that identifies the unit region.

The discrimination principle will be described. In the unit region where vein images overlap, such as 641a and 641b, the distance data is different between cases where veins are branched and cases where veins are three-dimensionally overlapped. In the unit region 641a in which the vein is branched, almost the same result as in the four-sided unit regions is obtained for the distance value to the vein. On the other hand, in the unit region 641b in which the vein overlaps three-dimensionally, a result different from that of the four-sided unit regions is obtained for the distance value to the vein.

As described above, the distance information acquiring unit 221 performs three-dimensional analysis by analyzing the distance value of the distance data using that of the four-sided unit regions, and thus discriminates whether an overlap of the vein image is due to branching of the blood vessels or due to independent blood vessels being imaged overlapping in three dimensions.

Note that the other configurations having the same name as the components of the first embodiment are similar functions, and here, the description is omitted.

The registration image data the registration process, the registration distance data the registration process, and the face authentication process in the present embodiment are basically similar to the first embodiment. However, in the present embodiment, the face determination process is not performed. Instead, upon detecting that the finger is placed on the modulator 102b, the imaging control unit 243 starts processes.

At this time, after starting processes, the image processing unit 122 reconstructs an image from imaging data output from the image sensor 103 at a predetermined time interval, and outputs the image to an image information acquiring unit 211. The image information acquiring unit 211 analyzes the relevant image every time it receives the image, performs the feature point extraction process, and creates authentication image data.

After starting processes, the distance measurement unit 125 calculates distance data based on imaging data obtained the same timing as processing of the image processing unit 122, and outputs the distance data to the distance information acquiring unit 221. The distance information acquiring unit 221 creates authentication distance data based on the distance data.

Note that the other process procedures are similar to the processes in the first embodiment, and here, the description is omitted.

Figure 33A:
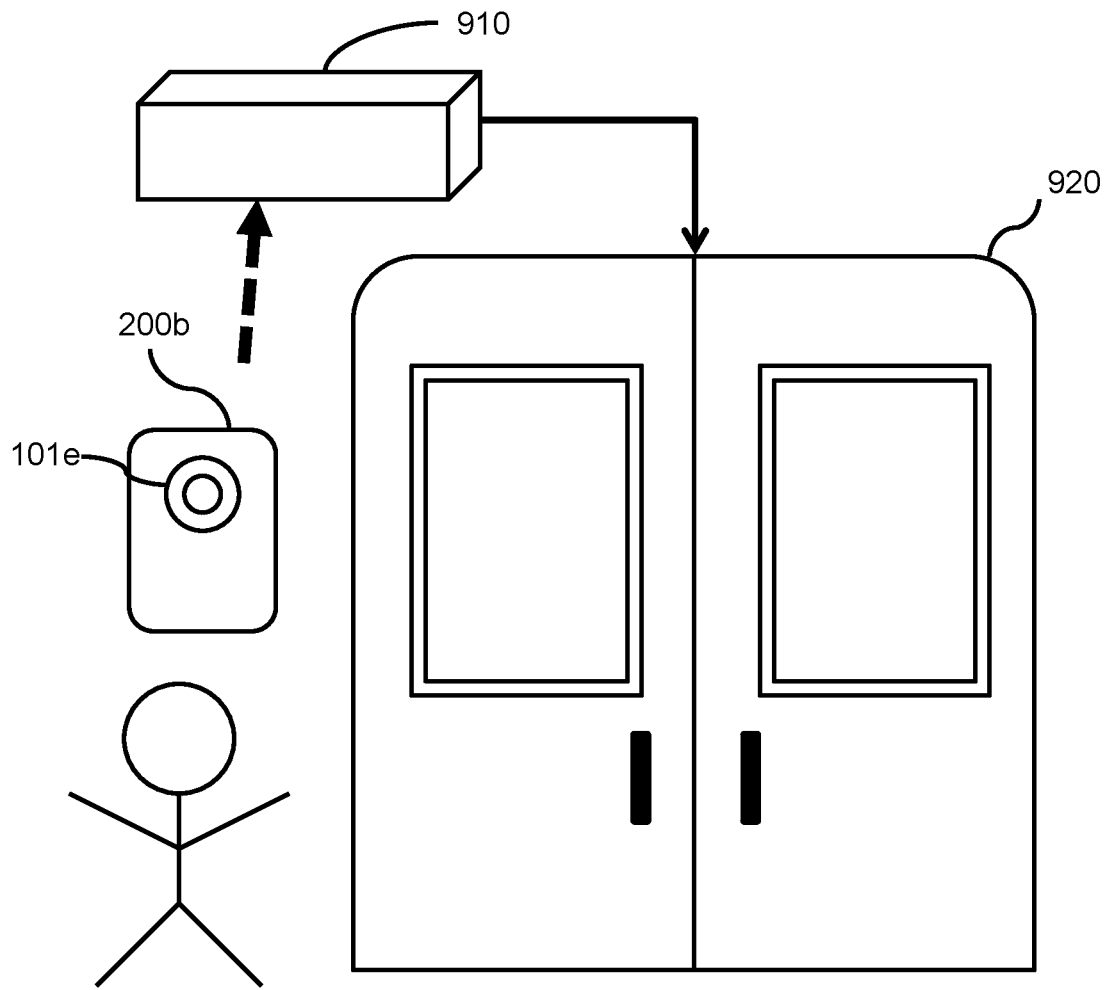
FIG. 33A is a diagram for explaining the use environment of the three-dimensional authentication device according to the second embodiment.

FIG. 33A shows a diagram for explaining that the three-dimensional authentication device 200b according to the present embodiment is applied to the access management.

Figure 33B:
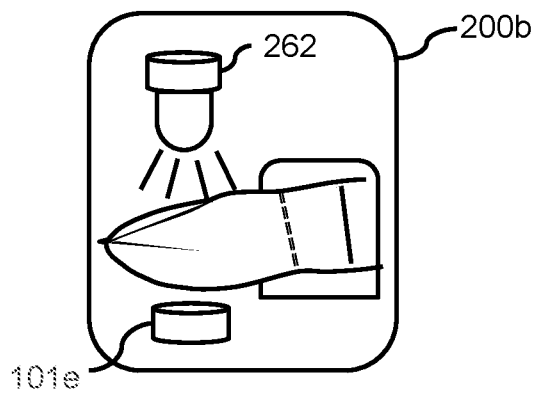
FIG. 33B is a diagram for explaining the use mode of the imaging device of the three-dimensional authentication device according to the second embodiment.

As shown in FIG. 33B, when the imaging device 101e whose distance between the image sensor 103 and the modulator 102b is set for vein authentication, is applied to the three-dimensional authentication device 200b, an access gate 920 can be unlocked by authentication in the three-dimensional positional relationship between the vein pattern and the vein.

As described above, in addition to the configuration of the first embodiment, the three-dimensional authentication device 200b according to the present embodiment includes the space control unit that changes the spacing between the image sensor 103 and the modulator 102b. Thus, the three-dimensional authentication device 200b can freely change the angle of view of the imaging device 101e.

Therefore, according to the present embodiment, the range capable of imaging is enlarged, and in consequence, it is possible to widen the authentication target. For example, the present embodiment can meet face authentication performed by shooting the face at a distance from the imaging device 101e to some extent as well as vein authentication in which shooting is necessary in a close range.

In the three-dimensional authentication device 200b according to the present embodiment, the image authentication unit extracts a vein pattern necessary for authentication from the vein image, and determines the degree of match with the vein pattern registered in advance.

On the other hand, the distance authentication unit acquires distance information on the vein pattern and captures the vein three-dimensionally. That is, the distance authentication unit can grasp the three-dimensional positional relationship of the blood vessel from distance data on the vein pattern obtained at the distance measurement unit 125.

Specifically, as described above, an overlap part on the image can be discriminated whether to be branches of the blood vessel or an overlap. Note that with the use of the properties, instead of performing three-dimensional authentication on the entire vein pattern, it is possible to focus on overlapping portions as described above, and extract those overlapping portions as a feature point for three-dimensional authentication.

Note that in the present embodiment, the case of the finger vein is exemplified, and three-dimensional authentication can be similarly performed with the palm, for example, as long as the vein can be imaged.

Also to the present embodiment, various modifications according to the first embodiment are applicable.

Moreover, the first embodiment may be combined with the second embodiment.

Figure 33C:
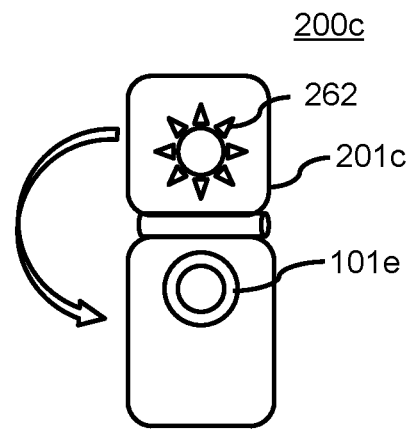
FIG. 33C is a diagram for explaining a three-dimensional authentication device according to a modification of the second embodiment.

FIG. 33C shows an example of a three-dimensional authentication device 200c capable of executing both of three-dimensional face authentication and three-dimensional vein authentication. In the state where a cover part 201c of the three-dimensional authentication device 200c is open, the imaging device 101e executes face image acquisition for executing face authentication, and then the cover part 201c is closed, it acquires the vein image to execute vein authentication. For example, the three-dimensional authentication device 200c can perform both of the face authentication and the vein authentication, and allow passage only the case where the both are successfully authenticated. Thus, it is also possible to further improve the strength of security.

Third Embodiment

A third embodiment of the present invention will be described. In the present embodiment, some or all the functions of the three-dimensional authentication devices 200a to 200c of the first embodiment or the second embodiment (in the following, represented by the three-dimensional authentication device 200) are installed on a portable information communication device such as a smartphone. Thus, in the present embodiment, with use of a lensless camera capable of acquiring three-dimensional information, a three-dimensional authentication system 900 that is small-sized, low-profile, capable of highly accurate authentication, and portable is implemented.

Figure 34A:
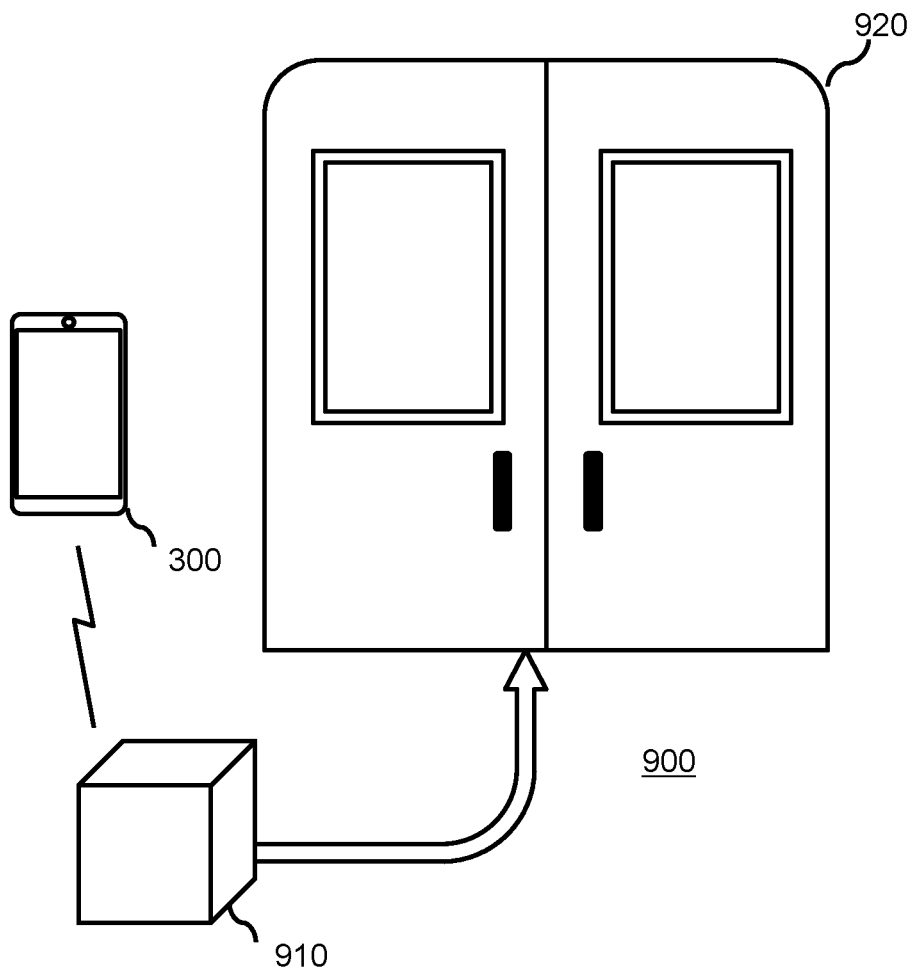
FIG. 34A is a diagram for explaining an authentication system including a three-dimensional authentication device according to a third embodiment.

FIG. 34A is a diagram explaining the outline of the system of the three-dimensional authentication system 900 according to the present embodiment. As shown in the drawing, in the present embodiment, a portable information terminal (in the following referred to as a portable terminal) 300 such as a smartphone is provided with the function and hardware of the three-dimensional authentication device 200. The authentication result by the portable terminal 300 is output to an access management server 910. The access management server 910 controls the unlock of an access gate 920 corresponding to the authentication result.

Note that the portable terminal 300 may be an information processing device having a wireless communication function, an information processing function, an imaging function, and a display function. Examples of the information processing devices include a mobile telephone, a smartphone, a tablet terminal, a wearable terminal such as a watch and a head mounted display, a future phone, or other portable digital devices.

Figure 34B:
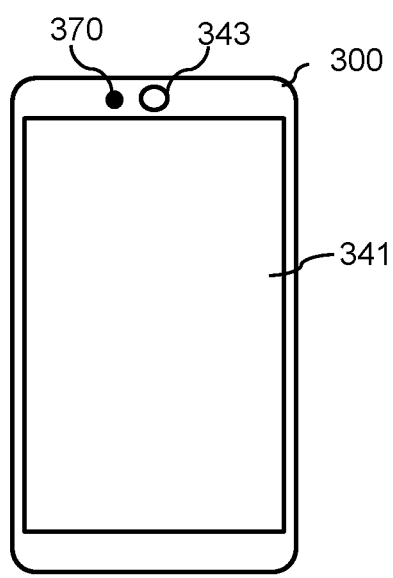
FIG. 34B is a diagram of the appearance of a portable terminal equipped with the three-dimensional authentication device according to the third embodiment.
Figure 35:
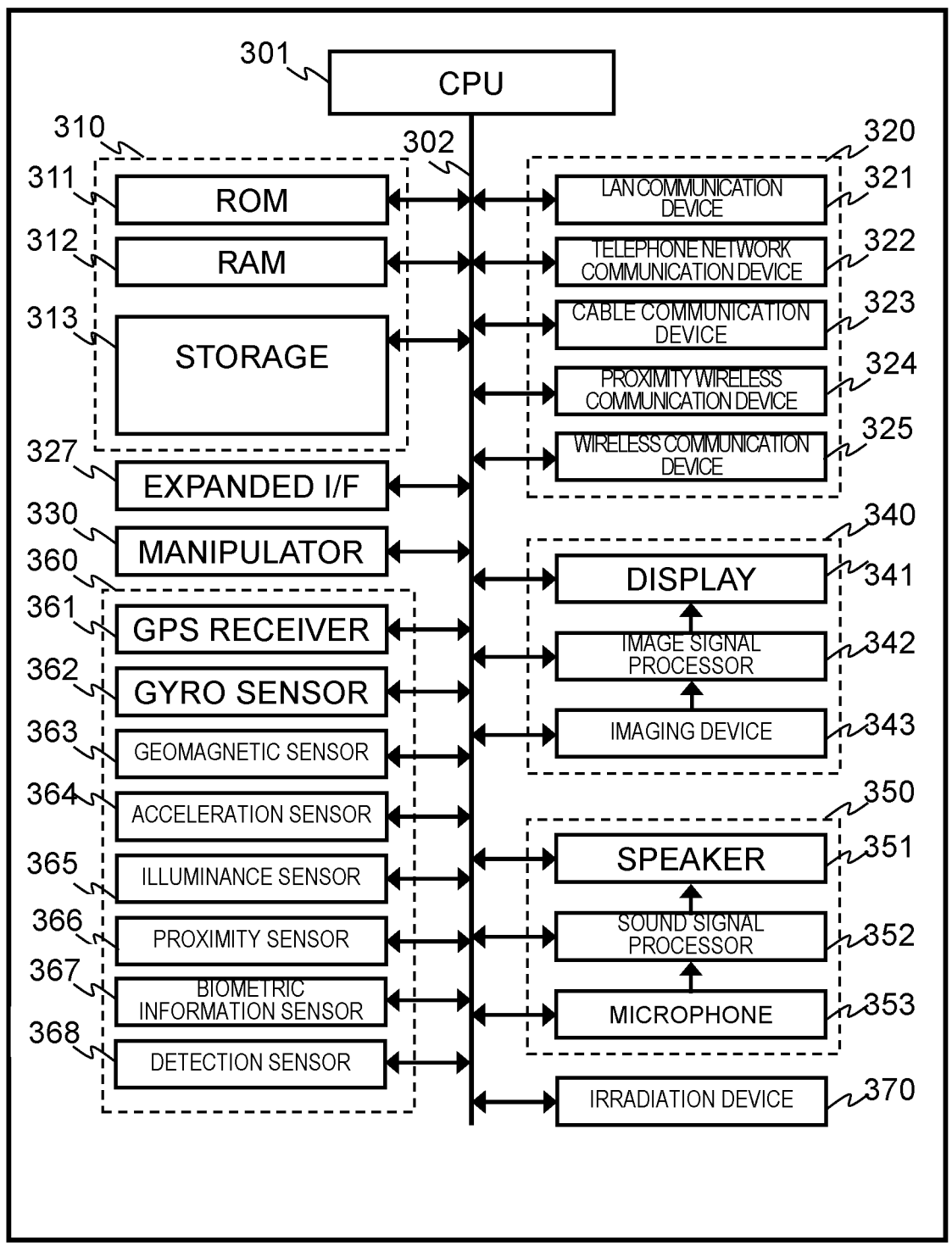
FIG. 35 is a block diagram of a hardware configuration of the portable terminal equipped with the three-dimensional authentication device according to the third embodiment.

The portable terminal 300 according to the present embodiment is a typical portable terminal 300. FIG. 34B shows the appearance thereof, and FIG. 35 shows the hardware configuration thereof, respectively. As shown in the drawings, the portable terminal 300 includes a CPU (Central Processing Unit) 301, a system bus 302, a storage device 310, a communication device 320, an expanded I/F 327, a manipulator 330, a video processor 340, an audio processor 350, a sensor 360, and an irradiation device 370.

The CPU 301 is a microprocessor unit that controls the overall portable terminal 300. The system bus 302 is a data communication path that transmits and receives data with the operation blocks in the CPU 301 and the portable terminal 300.

The storage device 310 includes a ROM (Read Only Memory) 311, a RAM (Random Access Memory) 312, and a storage 313.

The ROM 311 is a memory in which a basic operation program such as an operating system and other operation programs are stored. As the ROM 311, for example, rewritable ROMs such as an EEPROM (Electrically Erasable and Programmable Read Only Memory) or a flash ROM are used.

The storage 313 stores various programs of the operation program or the operation set value of the portable terminal 300 and various programs and items of data necessary to implement the functions of the embodiments. The storage 313 retains stored information even in the state where no power is externally supplied to the portable terminal 300. Therefore, for the storage 313, for example, devices such as a flash ROM, an SSD (Solid State Drive), and an HDD (Hard Disk Drive) are used.

The RAM 312 is a work area when the basic operation program or other operation programs are executed.

The communication device 320 includes a LAN (Local Area Network) communication device 321, a telephone network communication device 322, a cable communication device 323, a proximity wireless communication device 324, and a wireless communication device 325.

The LAN communication device 321 is connected to a network through an access point (AP) device by wireless connection such as Wi-Fi (registered trademark), and transmits and receives data with other devices on the network.

The telephone network communication device 322 establishes telephone calls and transmits and receives data via wireless communications with the base station of mobile telecommunication networks.

The cable communication device 323 transmits and receives data with other devices near the portable terminal 300 by cabled connection schemes such as a USB (Universal Serial Bus).

The proximity wireless communication device 324 transmits and receives data with other devices including a proximity wireless communication device via wireless communications. The proximity wireless communication device 324 is an I/F of near field communication (NFC), for example, and implements interactive communications between devices equipped with an NFC chip at ultrashort distances from a few centimeters to about one meter. For example, the proximity wireless communication device 324 meets services using a non-contact IC chip such as electronic money installed on the portable terminal 300.

The wireless communication device 325 transmits and receives data with the other devices including a wireless communication device via wireless communications. For example, the wireless communication device 325 implements simple exchange of information using radio waves with information devices within a distance of several meters to several tens of meters using Bluetooth (registered trademark), for example.

The LAN communication device 321, the telephone network communication device 322, the cable communication device 323, the proximity wireless communication device 324, and the wireless communication device 325 each of them is provided with coding and decoding circuits, antennas, and the like. The communication device 320 may be further provided with a communication device that implements infrared communications or other communication devices.

In the present embodiment, the portable terminal 300 transmits the authentication result to the access management server 910 using, for example, the LAN communication device 321, the wireless communication device 325, or the cable communication device 323.

The expanded I/F 327 is an interface group that expands the functions of the portable terminal 300. In the present embodiment, a video/audio I/F, an operating device I/F, a memory I/F, and the like are included. The video/audio I/F inputs picture signals/sound signals from an external video/audio output device and outputs picture signals/sound signals to external video/audio input devices. The external operating device such as a keyboard is connected through the operating device I/F. The memory I/F connects a memory card or other memory media and transmits and receives data.

The manipulator 330 inputs operating instructions to the portable terminal 300. In the present embodiment, the manipulator 330 has an operation key on which a touch panel and button switches are arranged overlapping with a display 341. Note that the manipulator 330 may provided with only any one of them. The portable terminal 300 may be operated using a keyboard connected to the expanded I/F 327. The portable terminal 300 may be operated using a separate personal digital assistant device connected via cable communications or wireless communications. The touch panel function may be included in the display 341.

The video processor 340 includes the display 341, an image signal processor 342, and a camera 343.

The display 341 is, for example, a display device including a liquid crystal panel, and displays image data processed at the image signal processor 342, and provides the image data to the user of the portable terminal 300. In the present embodiment, the display 341 also functions as the display device 107a of the three-dimensional authentication device 200.

The image signal processor 342 includes a video RAM, not shown, and drives the display 341 based on image data inputted to the video RAM. The image signal processor 342 performs format conversion, the superposition process of a menu or other OSD (On-Screen Display) signals, and the like, as necessary.

The camera 343 is an imaging device that converts an incident light beam into an electrical signal to acquire the surroundings or a target as image data. In the present embodiment, the camera 343 is the imaging device 101 of the three-dimensional authentication device 200.

The audio processor 350 includes a speaker 351, a sound signal processor 352, and a microphone 353. The speaker 351 provides a sound signal processed at the sound signal processor 352 to the user of the portable terminal 300. The microphone 353 converts a voice of the user and the like into voice data and inputs the voice data. The speaker 351 also functions as the sound output device 108 of the three-dimensional authentication device 200.

The sensor 360 is a sensor group that detects the state of the portable terminal 300. In the present embodiment, for example, a GPS (Global Positioning System) receiver 361, a gyro sensor 362, a geomagnetic sensor 363, an acceleration sensor 364, an illuminance sensor 365, a proximity sensor 366, a biometric information sensor 367, and a detection sensor 368 are included.

The detection sensor 368 is a sensor detecting that the finger is placed on the modulator 102b at the time of installing the three-dimensional authentication device 200 according to the second embodiment.

Note that another sensor group detects the position, inclination, direction, motion, ambient luminosity, user biometric information, and the like of the portable terminal 300.

The portable terminal 300 may further include another sensor such as an atmospheric pressure sensor and a pressure sensor. Note that positional information is acquired by the GPS receiver 361. At places at which GPS radio waves are not easily available, positional information may be acquired using positional information on the Wi-Fi AP device with the LAN communication device 321, or positional information may be acquired using positional information on the base station similarly with the telephone network communication device 322 and by a positional information acquiring method using propagation delay of telephone communication radio waves. These sensor groups do not necessarily have to include all the configurations.

The irradiation device 370 is a device that irradiates the finger placed on the modulator 102*b* at the time of installing the three-dimensional authentication device 200 according to the second embodiment.

Note that an exemplary configuration of the portable terminal 300 shown in FIG. 35 includes a large number of configurations that are not necessarily required in the present embodiment. However, even the configurations not including these do not impair the effect of the present embodiment. Configurations, not shown, such as a digital broadcast receiver function and an electronic money payment function, may be additionally provided.

The functions of an imaging device 101*e* and an authentication controller 210 are implemented by loading and executing a program stored in the storage device 310 in advance on the RAM 312 by the CPU 301. For example, a registration information storing unit 231 is constructed on the storage 33.

The method and the operation of imaging and three-dimensional authentication according to the present embodiment are similar to the embodiments and the modifications above.

As described above, according to the present embodiment, the portable terminal 300 includes the above-described three-dimensional authentication device 200. Therefore, it is possible to easily perform the three-dimensional authentication process with a small-sized terminal. Therefore, the present embodiment is applied to access management that needs security management, data management for information devices, software operation, for example, allowing to improve safety.

Modification 6

Note that in the three-dimensional authentication system 900 according to the present embodiment, the description is made with an example in which the portable terminal 300 includes all the functions of the three-dimensional authentication device 200 according to the first embodiment or the second embodiment, but it is not limited to this. The access management server 910 may include some of functions.

The three-dimensional authentication system 900 according to the present embodiment includes processes (functions), for example, imaging and image processes (development), distance measurement (distance measurement process), focus adjustment, face authentication (image authentication process), a distance authentication process, and an unlock instruction.

FIG. 36 shows an example of sharing of functions between the portable terminal 300 and the access management server 910. Here, examples of sharing the functions are shown as processing modes.

In processing mode 1, the portable terminal 300 performs only the imaging process, and the access management server 910 realizes the other processes.

That is, the portable terminal 300 acquires image data with an image sensor 103, transmits the imaging data to the access management server 910 via communications.

The access management server 910 includes the functions of an image storing unit 121, the image sensor 103, a distance measurement unit 125, and the authentication controller 210. The access management server 910 realizes the image process, distance measurement (focus adjustment), the authentication process, and the unlock instruction.

In processing mode 2, the portable terminal 300 carries the processes from imaging to distance measurement (focus adjustment), and the access management server 910 takes over the subsequent processes.

That is, the portable terminal 300 includes the function of the imaging device 101, and the access management server 910 includes the function of the authentication controller 210 and the unlock instruction function.

In processing mode 3, the portable terminal 300 executes imaging and three-dimensional authentication, and the access management server 910 performs face authentication and the unlock instruction. Note that the devices that performs authentications may be the other way around. That is, the portable terminal 300 performs any one of authentications, and the access management server 910 performs other authentication.

In processing mode 4, the portable terminal 300 performs all the processes up to the authentication process, and the access management server 910 executes unlock control on the access gate 920 based on the authentication result from the portable terminal 300.

As described above, it is possible to freely change the sharing of the processes between the portable terminal 300 and the access management server 910 due to easiness of the processing load, the system architecture, and the like, and it is possible to implement a system of high flexibility.

Note that even in the case of adopting any mode, the registration information storing unit 231 that stores registration data used at the time of performing the authentication process is desirably disposed on the device on side of the function performing the authentication process.

Modification 7

Moreover, data communications between the portable terminal 300 and the access management server 910 may be encrypted.

Figure 37A:
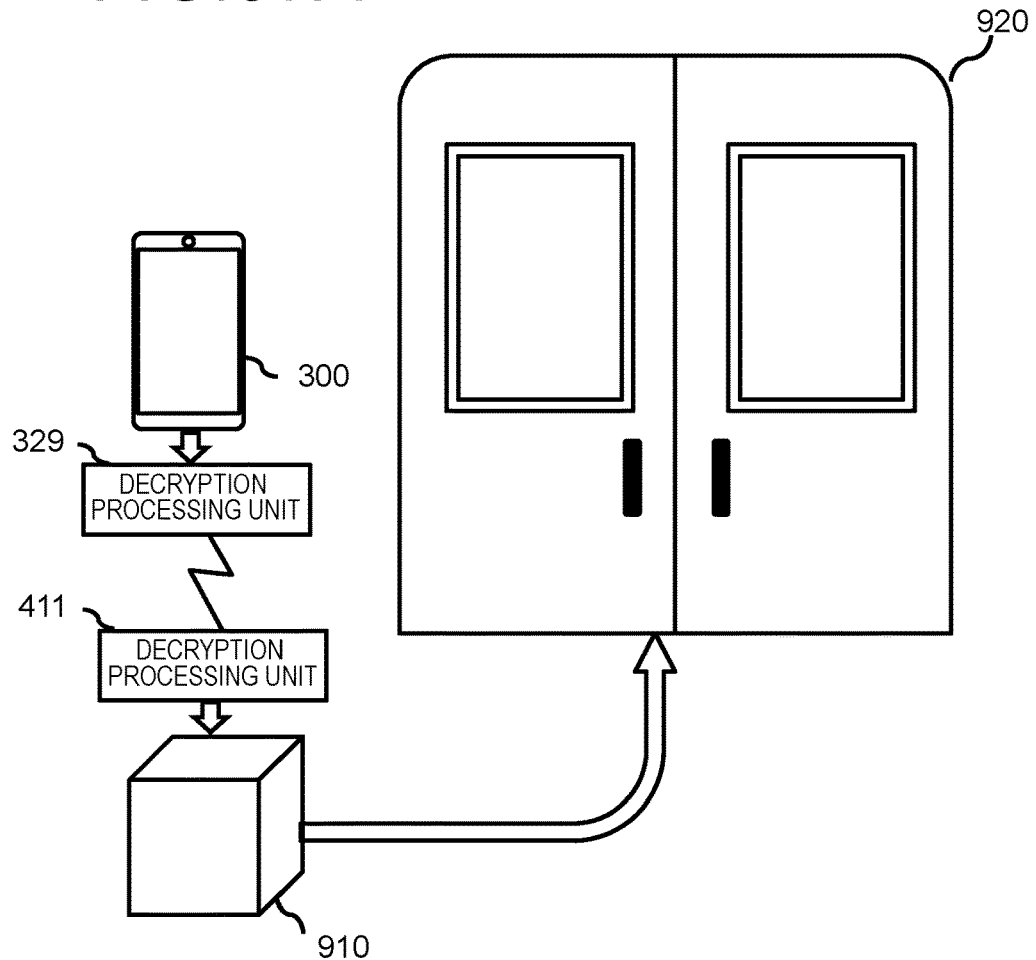
FIG. 37A is a diagram for explaining the use environment according to the modification of the third embodiment.

As shown in FIG. 37A, the communication device 320 of the portable terminal 300 includes a decryption processing unit 329 that encrypts data to be delivered and decrypts received data. The access management server 910 also similarly includes a decryption processing unit 411 that encrypts data to be delivered and decrypts received data.

Thus, it is possible to deliver information and data necessary for authentication between the portable terminal 300 and the access management server 910 without wiretapping.

Note that the decryption processing units 329 and 411 may be implemented by operation of the CPUs in the devices, or may be implemented by dedicated hardware and the like.

Modification 8

Figure 37B:
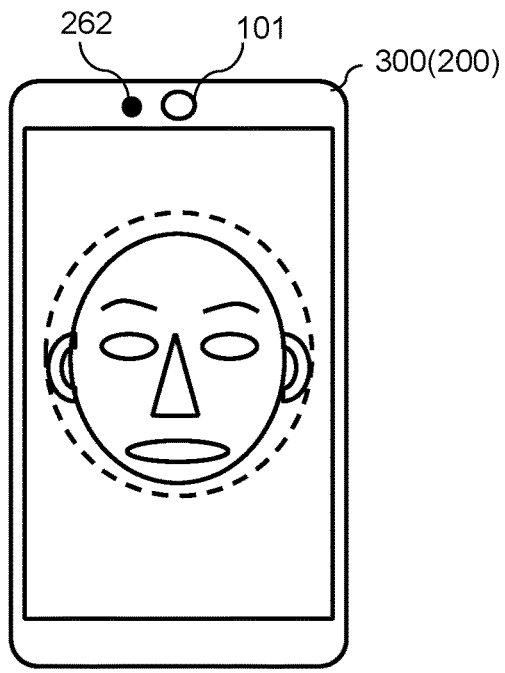
FIG. 37B is a diagram for explaining a use mode according to another modification of the third embodiment.

Note that for example, as shown in FIG. 37B, the three-dimensional authentication device 200 according to the present embodiment may be used for user authentication on the portable terminal 300 itself.

In this case, data to be registered as registration image data and registration distance data is the user's data alone. Therefore, in the comparison process in the face authentication process, when the degree of match with the registered registration image data is the image authentication threshold or more, the three-dimensional authentication device 200 discriminates that authentication is successful. Similar to distance data, when the degree of match with the registered registration distance data is the distance authentication threshold or more, the three-dimensional authentication device 200 discriminates that authentication is successful. The control unit of the portable terminal 300 unlocks the lock of the relevant portable terminal 300 when authentication is successful.

Also in the present modification, an authentication processing unit 251 may further determines final success or failure in authentication using results of image authentication and distance authentication. The success or failure in authentication may be determined in combination of face authentication and vein authentication.

Thus, in compliance with the payment function by the portable terminal 300, for example, it is possible to perform user authentication of high accuracy.

In the foregoing embodiments and the modifications, except modification 8, the description is made taking an example in which the three-dimensional authentication device 200 is used for access management. However, places for use are not limited to this. For example, it can further improve security using the three-dimensional authentication devices of the embodiments and the modifications, instead of or by further addition to a password process using application software and the like, which needs the strength of security, including data management and Internet banking.

Also in regard to authentication target, it is possible to use the three-dimensional authentication devices of the embodiments and the modifications for biometric authentication and the like, which accuracy is enhanced with the iris, the palm, and other three-dimensional information, non-limiting to the face and the vein.

As described above, according to the embodiments and the modifications, it is possible to provide authentication functions using the imaging device with no need of optical lenses, by which three-dimensional authentication can be performed with a simple configuration, the size of the device is reduced, and convenience is improved.

The present invention is not limited to the foregoing embodiments and the modifications, and includes various modifications. For example, the foregoing embodiments and the modifications are described in detail for easy understanding of the present invention, which are not necessarily limited to ones including all the configurations described above. Some of the configurations of an embodiment or a modification may be replaced with the configuration of another embodiment or another modification. The configuration of another embodiment or another modification may be added to the configuration of an embodiment or a modification. In regard to some of the configurations of the embodiments or the modifications, another configuration may be added, removed, or replaced.

The foregoing configurations, the functions, the processing units, and the processing schemes may be implemented by hardware, for example, by designing some or all of them using an integrated circuit and the like. The foregoing configurations, the functions, and the like may be implemented by software by a processor that interprets programs implementing the functions and that executes the programs. The information such as a program, a table, and a file, which implements the functions, can be placed on the memory unit, a recording device such as a hard disk, an SSD (Solid State Drive), or a recording medium such as an IC card, an SD card, and a DVD.

Control lines and information lines are shown, which are considered to be necessary for explanation, and all control lines and all information lines are not necessarily shown on products. It may be considered that actually almost all the configurations are mutually connected to each other.

LIST OF REFERENCE SIGNS

101: imaging device,
101*a*: imaging device,
101*b*: imaging device,
101*c*: imaging device,
101*d*: imaging device,
101*e*: imaging device,
102: modulator,
102*b*: modulator,
103: image sensor,
103*a*: pixel,
104: first grating pattern,
104*a*: grating pattern,
104*b*: grating pattern,
106: image processing unit,
106*b*: image processing unit,
106C: intensity modulation unit,
107: image display device,
107*a*: display device,
107*e*: distance information display device,
108: sound output device,
109: manipulation device,
112*a*: grating substrate,
112*b*: support member,
113: grating sensor integrated substrate,
117: guide pattern,
121: image storing unit,
122: image processing unit,
123: focus setting unit,
124: focus distance calculating unit,
125: distance measurement unit,
200: three-dimensional authentication device,
200*a*: three-dimensional authentication device,
200*b*: three-dimensional authentication device,
200*c*: three-dimensional authentication device,
201*c*: cover part,
203: instruction accepting unit,
210: authentication controller,
211: image information acquiring unit,
212: image authentication processing unit,
221: distance information acquiring unit,
222: distance authentication processing unit,
231: registration information storing unit,
241: instruction accepting unit,
243: imaging control unit,
251: authentication processing unit,
261: space control unit,
262: irradiation device,
263: detection sensor,
291: CPU,
292: memory,
293: storage device,
294: user interface, 295: imaging data acquiring unit,
300: portable terminal,
301: CPU,
302: system bus,
310: storage device,
311: ROM,
312: RAM,
313: storage,
320: communication device,
321: LAN communication device,
322: telephone network communication device,
323: cable communication device,
324: proximity wireless communication device,
325: wireless communication device,
327: expanded I/F,
329: decryption processing unit,
330: manipulator,
340: video processor,
341: display,
342: image signal processor,
343: camera,
350: audio processor,
351: speaker,
352: sound signal processor,
353: microphone,
360: sensor,
361: GPS receiver,
362: gyro sensor,
363: geomagnetic sensor,
364: acceleration sensor,
365: illuminance sensor,
366: proximity sensor,
367: biometric information sensor,
368: detection sensor,
370: irradiation device,
400: subject,
402: projection image,
411: decryption processing unit,
412: projection image,
610: imaging range,
611: region,
611a: region,
621: region,
621a: unit region,
621b: unit region,
621u: unit region,
631: predetermined region,
631d: region,
631e: region,
631u: unit region,
641: region,
641a: unit region,
641b: unit region,
641u: unit region,
711: distance information map,
711a: region,
711b: region,
711C: region,
711u: unit region,
721: two-dimensional map,
721a: memory,
721b: memory,
721u: memory position,
741u: unit region,
900: three-dimensional authentication system,
910: access management server,
920: access gate

The invention claimed is:

1. A three-dimensional authentication device comprising:
an imaging device that images an authentication target as a subject; and
an authentication controller that authenticates the authentication target imaged by the imaging device,
wherein the imaging device includes
a modulator that includes a first pattern and that modulates light intensity with the first pattern,
an image sensor that converts a light beam transmitted through the modulator into imaging data and outputs the imaging data,
an image processing unit that performs, to the imaging data, a reconstruction process and acquires an image, the reconstruction process being reconstructed an image of the subject based on cross-correlation operation between the imaging data and pattern data having a second pattern,
a distance measurement unit that acquires a distance from the imaging device to the subject in a predetermined measurement region, and
a space control unit that changes a spacing between the modulator and the image sensor;
the distance measurement unit repeats the reconstruction process to the imaging data while changing a focus distance, and the distance measurement unit sets the focus distance having a highest contrast in the measurement region as the distance; and
the authentication controller includes
a registration information storing unit that stores registration image data and registration distance data, the registration image data being an image of an authentication target acquired in advance, the registration distance data being distance information of an authentication target acquired in advance,
an image authentication unit that verifies authentication image data against the registration image data and that sets a verified result as an image authentication result, the authentication image data being an image of the authentication target acquired by the imaging device, and
a distance authentication unit that verifies authentication distance data against the registration distance data and that sets a verified result as a distance authentication result, the authentication distance data being a distance of the authentication target acquired by the imaging device.

2. The three-dimensional authentication device according to claim 1,
wherein the authentication controller further includes an authentication processing unit that determines and outputs a three-dimensional authentication result of the authentication target based on the image authentication result and the distance authentication result; and
the authentication processing unit determines that the three-dimensional authentication result is successful in authentication when both of the image authentication result and the distance authentication result are successful.

3. The three-dimensional authentication device according to claim 1,
wherein the measurement region includes a plurality of unit regions obtained by dividing the measurement region; and
the distance measurement unit acquires the distance for each of the unit regions.

4. The three-dimensional authentication device according to claim 2,
wherein when both of the image authentication result and the distance authentication result are successful, the authentication processing unit further discriminates propriety of motion of the authentication target based on the authentication image data and the authentication distance data, and only when the discriminated motion is appropriate, the authentication processing unit determines that the three-dimensional authentication result is successful in authentication.

5. The three-dimensional authentication device according to claim 1,
wherein the registration information storing unit stores a plurality of the registration image data and a plurality of the registration distance data;
the image authentication unit verifies the authentication image data against the plurality of the registration image data respectively, and when there is one or more registration image data obtaining a degree of match having a predetermined image authentication threshold or more, determines the image authentication result is successful in authentication; and
the distance authentication unit verifies the authentication distance data against the plurality of the registration distance data respectively, and when there is one or more registration distance data obtaining a degree of match having a predetermined distance authentication threshold or more, determines the distance authentication result is successful in authentication.

6. The three-dimensional authentication device according to claim 1, further comprising an authentication processing unit that determines and outputs a three-dimensional authentication result of the authentication target based on the image authentication result and the distance authentication result,
wherein the registration information storing unit stores a plurality of the registration image data and a plurality of the registration distance data;
the registration image data is stored in the registration information storing unit in correspondence to identification information on the authentication target of the registration image data;
the registration distance data is stored in the registration information storing unit in correspondence to identification information on the authentication target of the registration distance data;
the image authentication unit verifies the authentication image data against the plurality of the registration image data respectively, and when there is the registration image data having a predetermined image authentication threshold or more, in the registration image data, determines the identification information stored in correspondence to registration image data at a highest degree of match as an image authentication result;
the distance authentication unit verifies the authentication distance data against the plurality of the registration distance data respectively, and when there is the registration distance data having a predetermined distance authentication threshold or more, in the registration distance data, determines the identification information stored in correspondence to registration distance data at a highest degree of match as a distance authentication result; and
when the image authentication result matches the distance authentication result, the authentication processing unit determines that verification is successful.

7. The three-dimensional authentication device according to claim 1, further comprising an authentication processing unit that determines and outputs a three-dimensional authentication result of the authentication target based on the image authentication result and the distance authentication result,
wherein the registration information storing unit stores a plurality of the registration image data and a plurality of the registration distance data;
the registration image data is stored in the registration information storing unit in correspondence to identification information on the authentication target of the registration image data;
the registration distance data is stored in the registration information storing unit in correspondence to identification information on the authentication target of the registration distance data;
the image authentication unit verifies the authentication image data against the plurality of the registration image data respectively, and when there is the registration image data having a predetermined image authentication threshold or more, from the identification information stored in correspondence to the registration image data, determines a predetermined number of the identification information in descending order of a degree of match as an image authentication result;
the distance authentication unit verifies the authentication distance data against the plurality of the registration distance data respectively, and when there is the registration distance data having a predetermined distance authentication threshold or more, from the identification information stored in correspondence to the registration distance data, determines a predetermined number of the identification information in descending order of a degree of match as a distance authentication result; and
when there is the identification information that matches in the image authentication result and the distance authentication result, the authentication processing unit determines that verification is successful.

8. The three-dimensional authentication device according to claim 1, comprising:
a display device that displays the image acquired by the image processing unit; and
an imaging control unit that displays a predetermined guide pattern on the display device,
wherein the authentication target is a face of a person; and
the imaging control unit displays the guide pattern such that the face is imaged in a predetermined size, the face being the authentication target.

9. The three-dimensional authentication device according to claim 1,
wherein the authentication target includes a vein; and
when the authentication target is the vein, the space control unit makes the spacing narrower than at time of imaging another authentication target.

10. The three-dimensional authentication device according to claim 1,
wherein the imaging device is included on a portable information terminal.

11. A three-dimensional authentication system comprising:
the three-dimensional authentication device according to claim 1; and
a management server that performs security management based on an authentication result by the three-dimensional authentication device.

12. The three-dimensional authentication system according to claim 11,
wherein when both of the image authentication result and the distance authentication result in the three-dimensional authentication device are successful, the management server outputs an unlock signal that instructs unlock of a predetermined access gate.

13. A portable information terminal comprising the three-dimensional authentication device according to claim 1.

14. A three-dimensional authentication method in a three-dimensional authentication device including an imaging device that images an authentication target as a subject and an authentication controller that authenticates the authentication target imaged by the imaging device, the method comprising:

modulating, by a modulator including a first pattern, light intensity with the first pattern;

converting, by an image sensor, a light beam after the modulating into imaging data;

performing, to the imaging data, a reconstruction process and acquiring an image, the reconstruction process being reconstructed an image of the subject based on cross-correlation operation between the imaging data and pattern data having a second pattern, repeating the reconstruction process while changing a focus distance, acquiring the focus distance having a highest contrast in a predetermined measurement region as a distance from the imaging device to the subject in the measurement region;

changing, by a space control unit, a spacing between the modulator and the image sensor;

verifying authentication image data against registration image data stored in advance, setting a verified result as an image authentication result, the authentication image data being an image of the acquired authentication target; and verifying authentication distance data against registration distance data stored in advance, and setting a verified result as a distance authentication result, the authentication distance data being a distance of the acquired authentication target.

* * * * *